US012593035B2

(12) United States Patent
Lee et al.

(10) Patent No.: US 12,593,035 B2
(45) Date of Patent: Mar. 31, 2026

(54) IMAGE ENCODING/DECODING METHOD AND DEVICE

(71) Applicant: Dolby International AB, Amsterdam Zuidoost (NL)

(72) Inventors: Bae Keun Lee, Seongnam-si (KR); Dong San Jun, Changwon-si (KR)

(73) Assignee: DOLBY INTERNATIONAL AB, Dublin (IE)

( * ) Notice: Subject to any disclaimer, the term of this patent is extended or adjusted under 35 U.S.C. 154(b) by 0 days.

(21) Appl. No.: 18/652,697

(22) Filed: May 1, 2024

(65) Prior Publication Data

US 2024/0291973 A1     Aug. 29, 2024

Related U.S. Application Data

(63) Continuation of application No. 17/418,583, filed as application No. PCT/KR2019/018643 on Dec. 27, 2019, now Pat. No. 12,010,299.

(30) Foreign Application Priority Data

Dec. 27, 2018     (KR) ........................ 10-2018-0171320

(51) Int. Cl.
H04N 19/11          (2014.01)
H04N 19/105         (2014.01)
                (Continued)

(52) U.S. Cl.
CPC ........... H04N 19/11 (2014.11); H04N 19/105 (2014.11); H04N 19/176 (2014.11); H04N 19/186 (2014.11)

(58) Field of Classification Search
CPC .... H04N 19/11; H04N 19/105; H04N 19/176; H04N 19/186; H04N 19/109; H04N 19/119; H04N 19/122; H04N 19/51
See application file for complete search history.

(56) References Cited

U.S. PATENT DOCUMENTS

| | | | |
|---|---|---|---|
| 12,010,299 B2 | 6/2024 | Lee et al. | |
| 2012/0170649 A1* | 7/2012 | Chen ..................... | H04N 19/122 |
| | | | 375/240.18 |

(Continued)

FOREIGN PATENT DOCUMENTS

| | | |
|---|---|---|
| CN | 103096066 A | 5/2013 |
| CN | 105474639 A | 4/2016 |

(Continued)

OTHER PUBLICATIONS

Office Action for IN202117032865 by Intellectual Property India dated Feb. 10, 2023.

(Continued)

*Primary Examiner* — Shahan Ur Rahaman
(74) *Attorney, Agent, or Firm* — Fish & Richardson P.C.

(57)     ABSTRACT
The video encoding/decoding method and device according to the present invention can determine an intra prediction mode of a chroma block, specify a luminance area for inter-component reference of the chroma block, down-sample the specified luminance area, derive parameters for the inter-component reference of the chroma block, apply the parameters to the downsampled luminance area, and thereby predict the chroma block.

12 Claims, 36 Drawing Sheets

(51) Int. Cl.
  *H04N 19/176* (2014.01)
  *H04N 19/186* (2014.01)

(56) References Cited

U.S. PATENT DOCUMENTS

| | | | |
|---|---|---|---|
| 2012/0188612 A1* | 7/2012 | Campanelli | H04N 1/403 |
| | | | 358/3.22 |
| 2013/0249897 A1 | 9/2013 | Dunaisky et al. | |
| 2014/0355667 A1 | 12/2014 | Lei et al. | |
| 2018/0077426 A1* | 3/2018 | Zhang | H04N 19/157 |
| 2018/0176594 A1* | 6/2018 | Zhang | H04N 19/59 |
| 2020/0177878 A1* | 6/2020 | Choi | H04N 19/11 |
| 2020/0288135 A1 | 9/2020 | Laroche et al. | |
| 2020/0296380 A1 | 9/2020 | Aono et al. | |
| 2022/0070452 A1 | 3/2022 | Lee et al. | |

FOREIGN PATENT DOCUMENTS

| | | |
|---|---|---|
| KR | 10-2014-0110015 A | 9/2014 |
| KR | 10-2016-0105944 A | 9/2016 |
| KR | 10-2018-0037575 A | 4/2018 |
| WO | 2016/154008 A1 | 9/2016 |
| WO | 2018/053293 A1 | 3/2018 |

OTHER PUBLICATIONS

Laroche Guillaume el al., "CE3-5.1: On cross-component linear model simplification", Joint Video Experts Team (JVET) of ITU-T SG 16 WP 3 and ISO/IEC JTC 1/SC 29/WG 11, 2018, 4 pages, JVET-L0191.

Kai Zhang et al., "CE3-related: CCLM prediction with single-line neighbouring luma samples"; Joint Video Experts Team (JVET) of ITU-T SG 16 WP 3 and ISO/IEC JTC 1/SC 29/WG 11, 2018, 4 pages, JVET-L329-v2.

International Search Report of PCT/KR2019/018643 dated Apr. 14, 2020 [PCT/ISA/210].

Office Action for CN 201980092849.7 by China National Intellectual Property Administration dated Jun. 14, 2023.

International Preliminary Report on Patentability in International Appln. No. PCT/KR2019/018643, mailed on Jul. 8, 2021, 11 pages (Machine Translation).

Laroche et al., "Non-CE3: the On cross-component linear model simplification," Joint Video Experts Team (JVET) of ITU-T SG 16 WP3 and ISO/IEC JTC 1/SC 29/WG 11, JVET-K204, 11th Meeting: Ljubljana, SI, Jul. 10-18, 2018, 7 pages.

Written Opinion in International Appln. No. PCT/KR2019/018643, mailed on Apr. 14, 2020, 4 pages.

Zhang et al., "Enhanced Cross-component Linear Model Intra-prediction," Joint Video Exploration Team (JVET) of ITU-T SG 16 WP3 and ISO/IEC JTC 1/SC 29/WG11, JVET-D0110, 4th Meeting: Chengdu, CN, Oct. 15-21, 2016, 6 pages.

\* cited by examiner

FIG. 2

Rotation              Zoom-in

Zoom-out           Affine Traniorm

Representative sub-block (a)

Representative sub-block (b)

(a)

(b)

Reference
reference
sample
P_ref

One-
dimensional
reference
reference
sample
Ref_1D

FIG. 24

Determine intra prediction mode of chroma block — S3100

Specify luma region
for inter-component reference of chroma block — S3110

Downsample luma region — S3120

Derive parameter
for inter-component reference of chroma block — S3130

Predict chroma block
based on downsampled luma block and parameter — S3140

FIG. 40

IMAGE ENCODING/DECODING METHOD AND DEVICE

CROSS-REFERENCE TO RELATED APPLICATIONS

This application is a continuation application of U.S. patent application Ser. No. 17/418,583, filed on Jun. 25, 2021, which is a National Stage Entry of International Application No. PCT/KR2019/018643, filed on Dec. 27, 2019, which claims priority to Korean Patent Application No. 10-2018-0171320 filed on Dec. 27, 2018, the entire contents of which are hereby incorporated by references in its entirety.

TECHNICAL FIELD

The present disclosure relates to a method and a device for processing a video signal.

BACKGROUND ART

As a market demand for a high-resolution video has increased, a technology which may effectively compress a high resolution image is necessary. According to such a market demand, MPEG (Moving Picture Expert Group) of ISO/IEC and VCEG (Video Coding Expert Group) of ITU-T jointly formed JCT-VC (Joint Collaborative Team on Video Coding) to develop HEVC (High Efficiency Video Coding) video compression standards on January 2013 and has actively conducted research and development for next-generation compression standards.

Video compression is largely composed of intra prediction, inter prediction, transform, quantization, entropy coding and an in-loop filter. On the other hand, as a demand for a high resolution image has increased, a demand for stereoscopic image contents has increased as a new image service. A video compression technology for effectively providing high resolution and ultra high resolution stereo-scopic image contents has been discussed.

DISCLOSURE

Technical Problem

A purpose of the present disclosure is to provide a method and a device that a picture is adaptively partitioned.

A purpose of the present disclosure is to provide an intra prediction method and device.

A purpose of the present disclosure is to provide an inter prediction method and device.

A purpose of the present disclosure is to provide an inter-component reference-based prediction method and device.

Technical Solution

A video encoding/decoding method and device according to the present disclosure may determine an intra prediction mode of a chroma block, specify a luma region for inter-component reference of the chroma block, downsample the specified luma region, derive a parameter for the inter-component reference of the chroma block and predict the chroma block by using a luma block corresponding to the chroma block and the parameter.

In a video encoding/decoding method and device according to the present disclosure, the luma region may include at least one of a luma block corresponding to the chroma block or a neighboring region adjacent to the luma block.

In a video encoding/decoding method and device according to the present disclosure, an intra prediction mode of the chroma block may be derived based on an index and a predetermined group configured with inter-component reference-based prediction modes.

In a video encoding/decoding method and device according to the present disclosure, the inter-component reference-based prediction mode may include at least one of a first mode which refers to both a left and top region adjacent to the chroma block, a second mode which refers to a left region adjacent to the chroma block or a third mode which refers to a top region adjacent to the chroma block.

In a video encoding/decoding method and device according to the present disclosure, a neighboring region adjacent to the luma block may include at least one of a top neighboring region or a left neighboring region, the top neighboring region may include n pixel lines, and the left neighboring region may include m pixel lines.

In a video encoding/decoding method and device according to the present disclosure, downsampling a neighboring region adjacent to the luma block may be performed by using only a luma pixel at a specific position and a neighboring pixel of the luma pixel.

In a video encoding/decoding method and device according to the present disclosure, the specific position may be determined based on a position of a pixel selected among a plurality of pixels belonging to a neighboring region of the chroma block.

In a video encoding/decoding method and device according to the present disclosure, the selected pixel may be one or more pixels positioned at every predetermined interval in a neighboring region of the chroma block.

In a video encoding/decoding method and device according to the present disclosure, the neighboring pixel may be a pixel positioned in at least one of a left, right, top, bottom, top-left, bottom-left, top-right or bottom-right direction of the luma pixel.

In a video encoding/decoding method and device according to the present disclosure, deriving a parameter for the inter-component reference may include calculating the maximum value and the minimum value from a plurality of pixels obtained by downsampling a neighboring region of the luma block, and the parameter for the inter-component reference may be derived by using the calculated maximum value and minimum value.

A digital storage medium for storing a video stream, in which a video decoding program for executing a process is recorded, the process may comprise determining an intra prediction mode of a chroma block, specifying a luma region for inter-component reference of the chroma block, downsampling the specified luma region, deriving a parameter for the inter-component reference of the chroma block and predicting the chroma block by applying the parameter to the downsampled luma region.

Technical Effects

The present disclosure may improve encoding/decoding efficiency of a video signal by partitioning a picture in a predetermined unit and performing encoding/decoding.

The present disclosure may improve encoding efficiency of intra prediction by using a subdivided directional mode and/or a selective pixel line.

The present disclosure may improve encoding efficiency of inter prediction by using an affine mode or inter region motion information.

The present disclosure may improve inter-component reference-based prediction efficiency through downsampling/subsampling a luma region.

DESCRIPTION OF DIAGRAMS

FIG. 2 is a block diagram showing an image decoding device according to the present disclosure.

Figure 6:
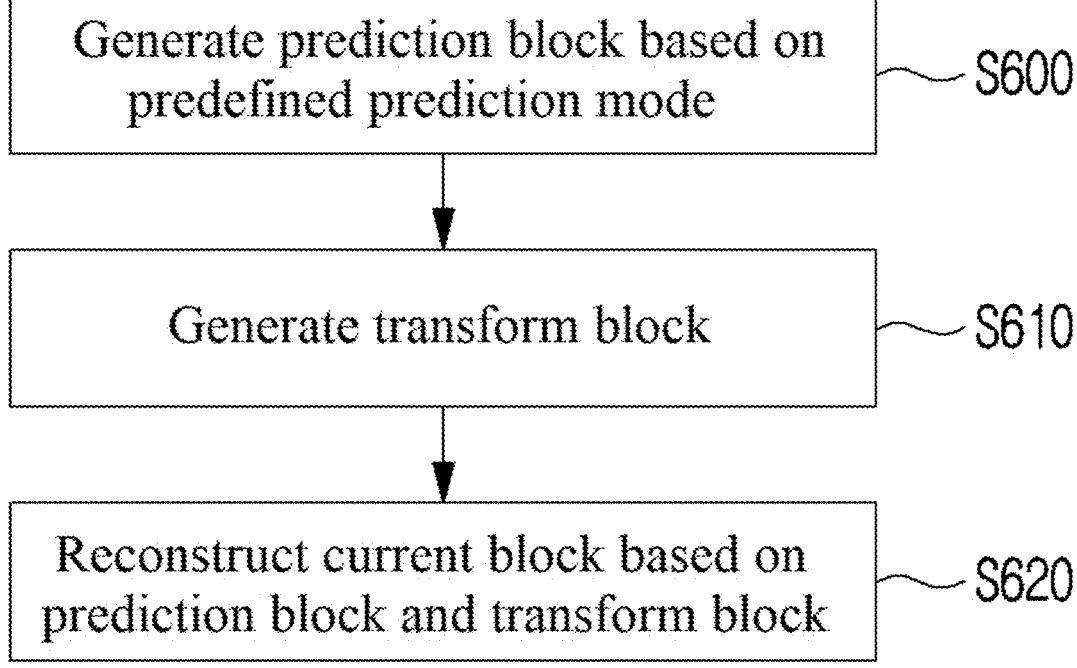

FIG. 6 roughly shows a process in which a current block is reconstructed as an embodiment to which the present disclosure is applied.

Figure 7:
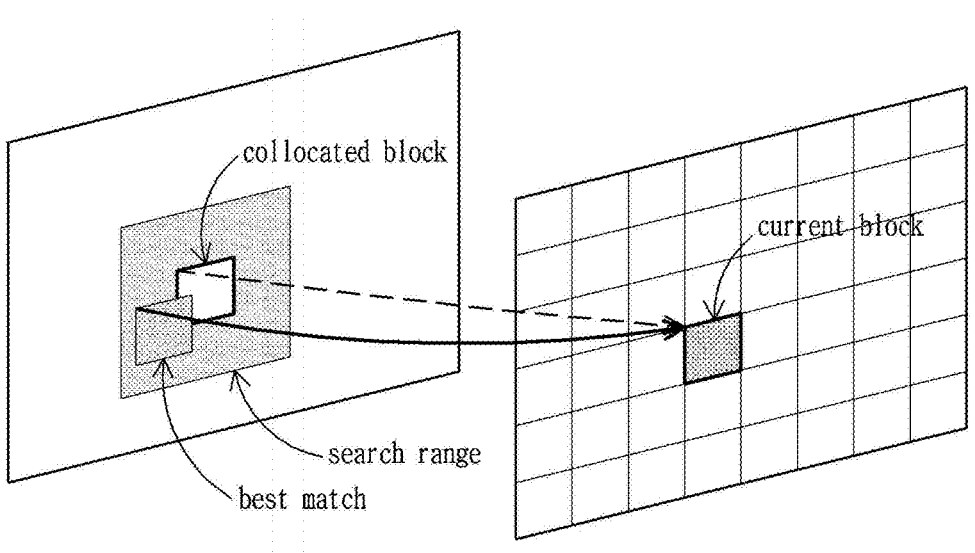

FIG. 7 shows an inter prediction method as an embodiment to which the present disclosure is applied.

Figure 8:
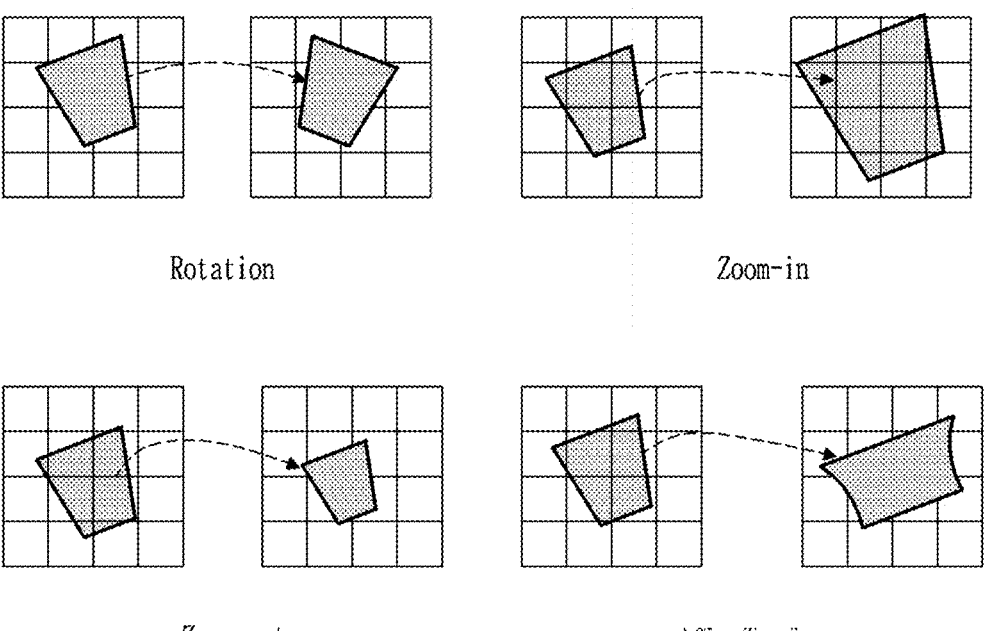
Figure 9:
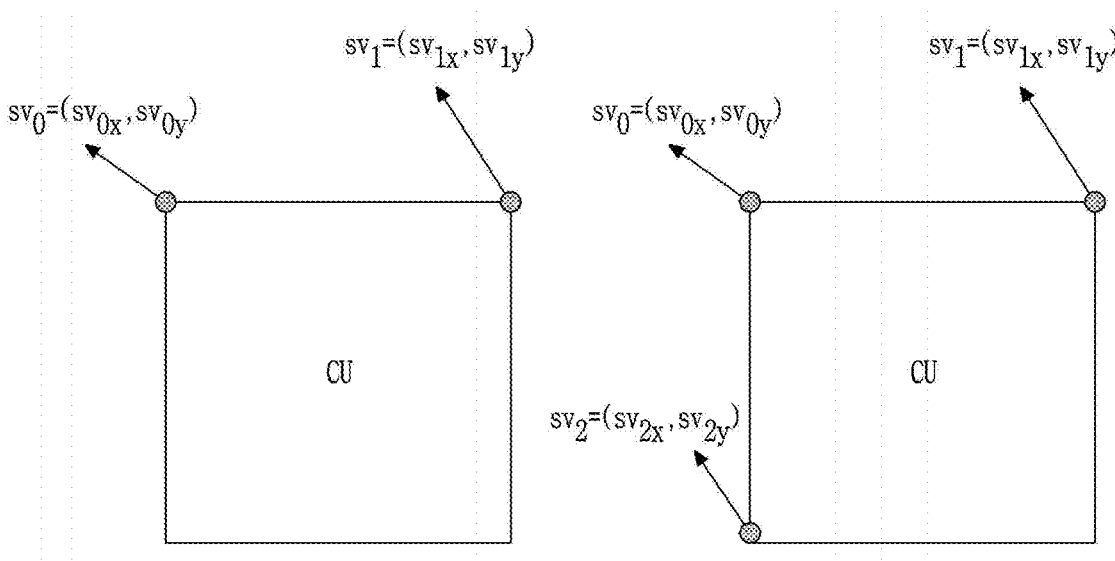
Figure 10:
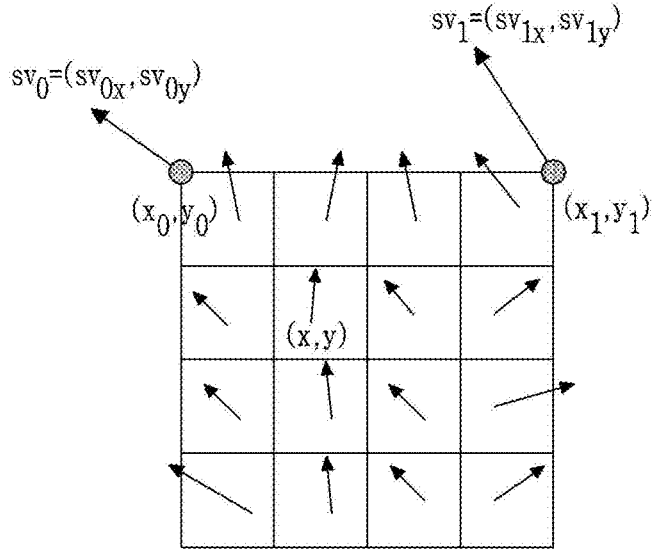

FIGS. 8 to 10 show an affine inter prediction method as an embodiment to which the present disclosure is applied.

Figure 11:
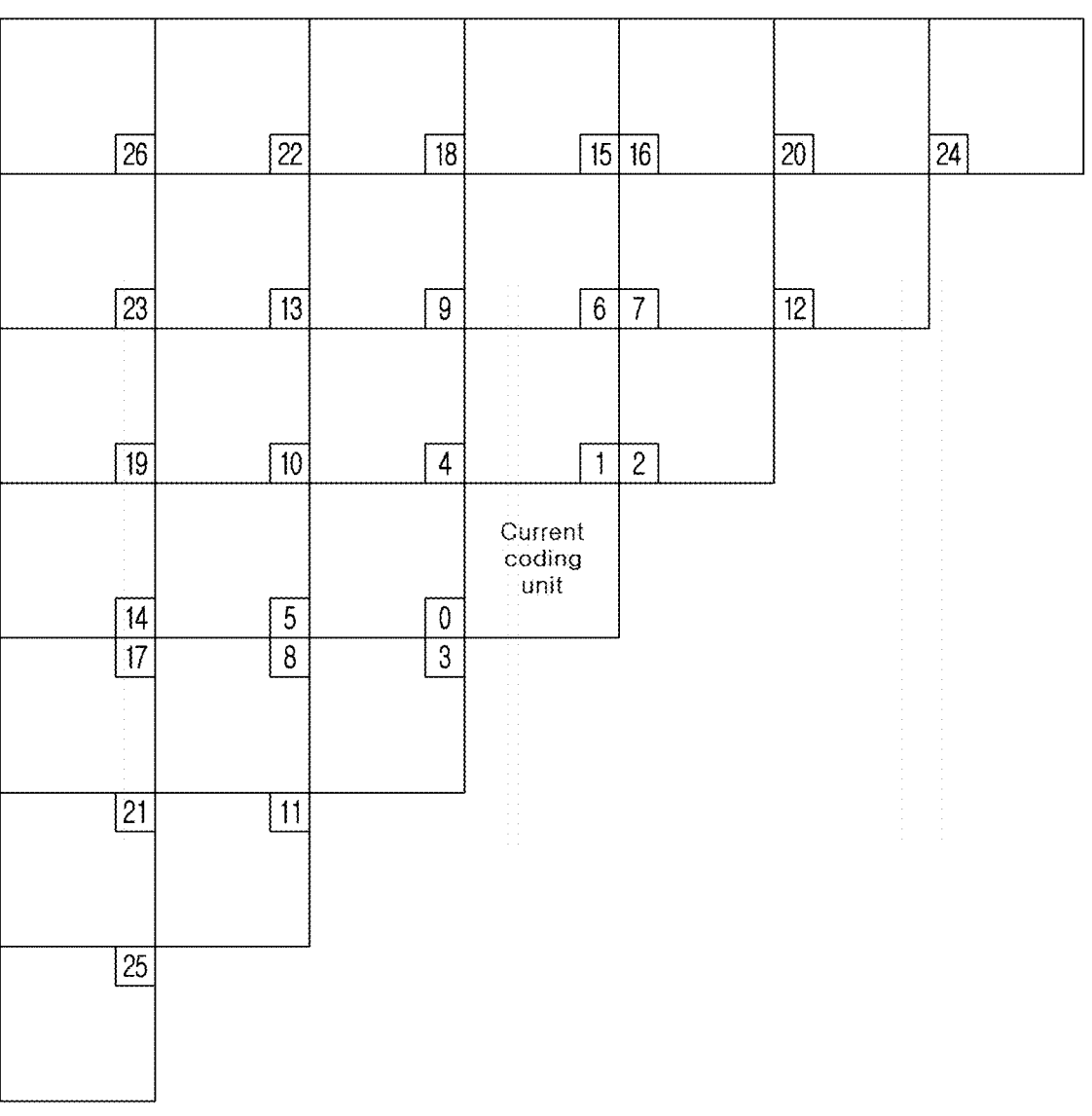

FIG. 11 shows a range of a spatial neighboring block for a merge mode as an embodiment to which the present disclosure is applied.

FIGS. 12 to 18 show a merge mode using motion information of an inter region as an embodiment to which the present disclosure is applied.

Figure 19:
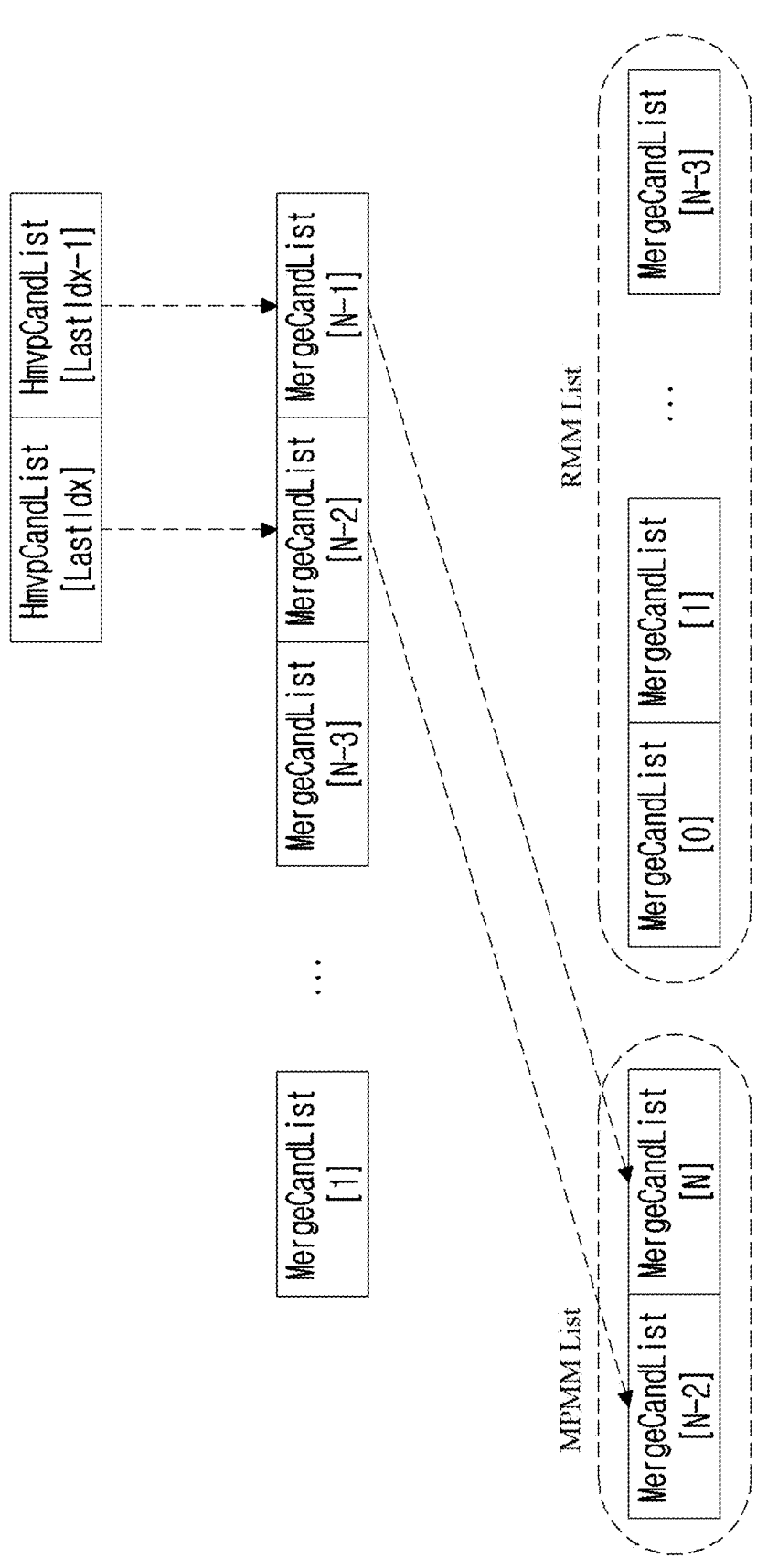
Figure 20:
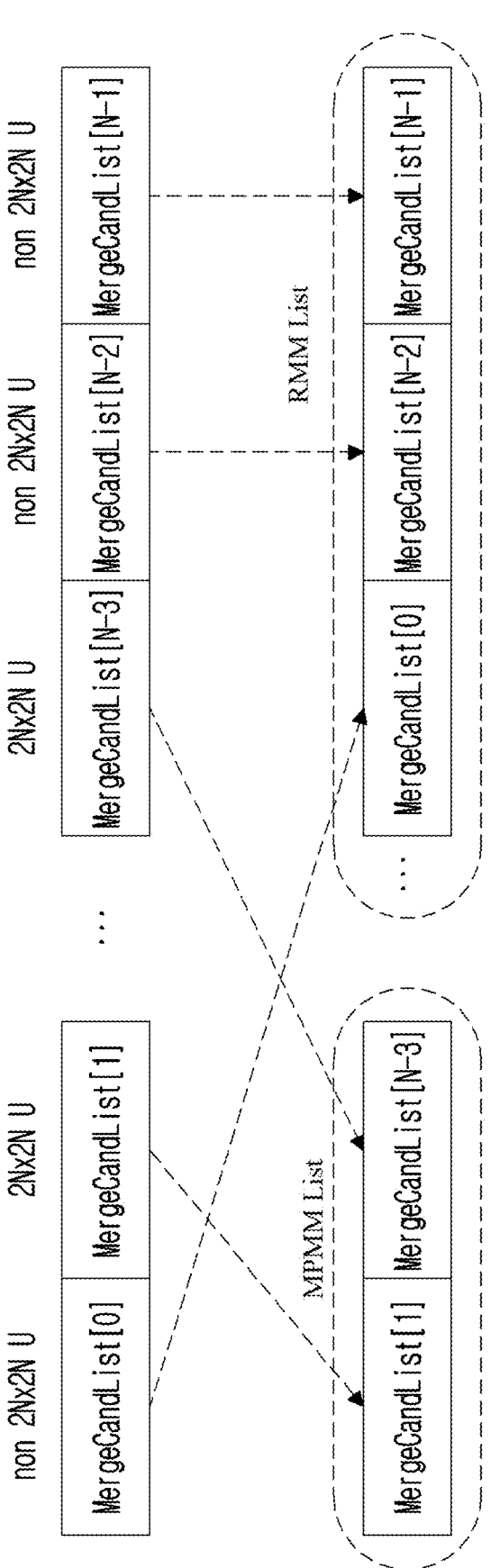

FIGS. 19 and 20 show a MPMM based merge mode as an embodiment to which the present disclosure is applied.

FIGS. 21 to 30 show an intra prediction method as an embodiment to which the present disclosure is applied.

Figure 31:
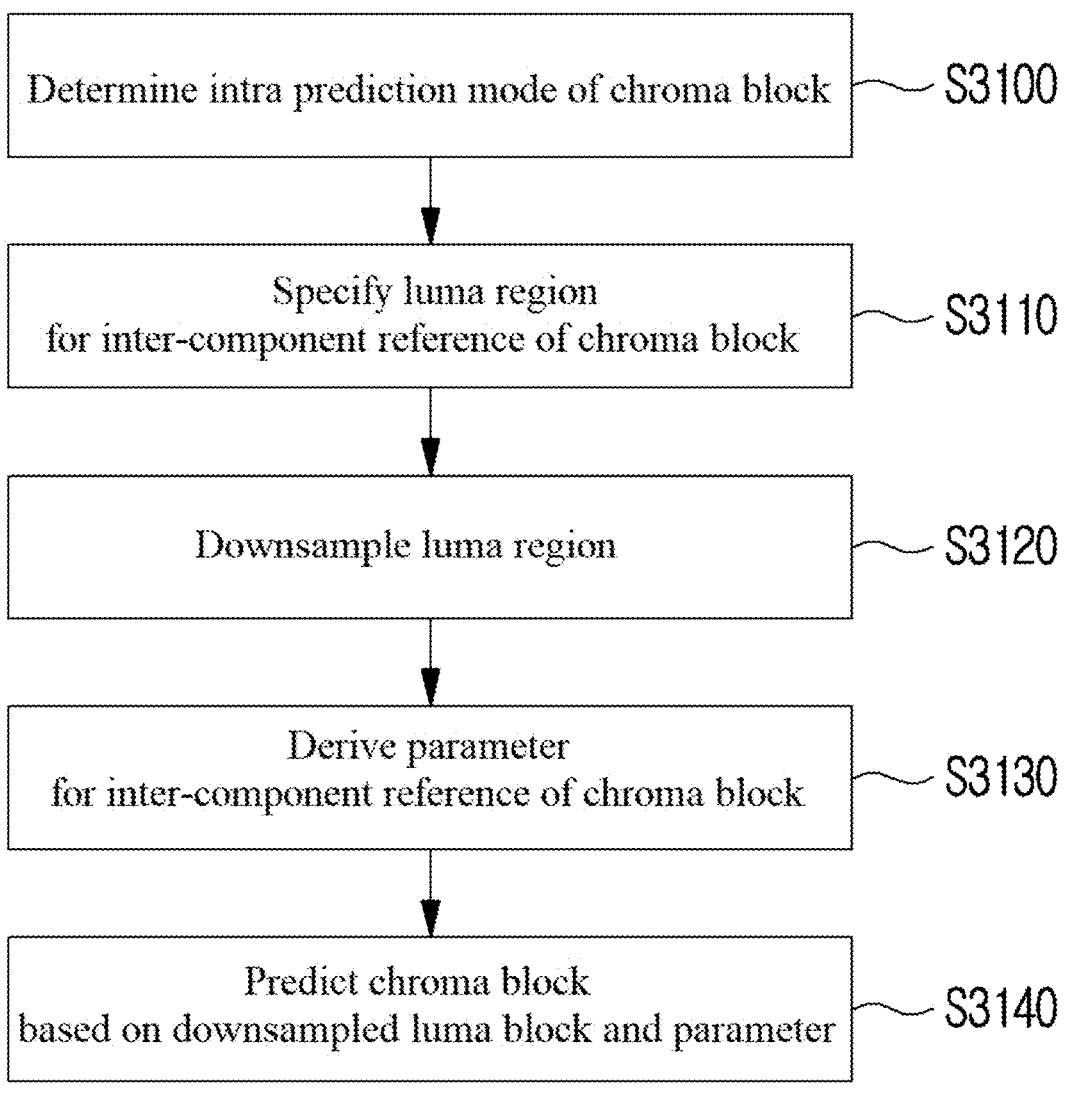

FIG. 31 shows an inter-component reference-based prediction method as an embodiment to which the present disclosure is applied.

FIGS. 32 to 38 show a method of downsampling a neighboring region of a luma block and deriving a parameter for inter-component reference.

Figure 39:
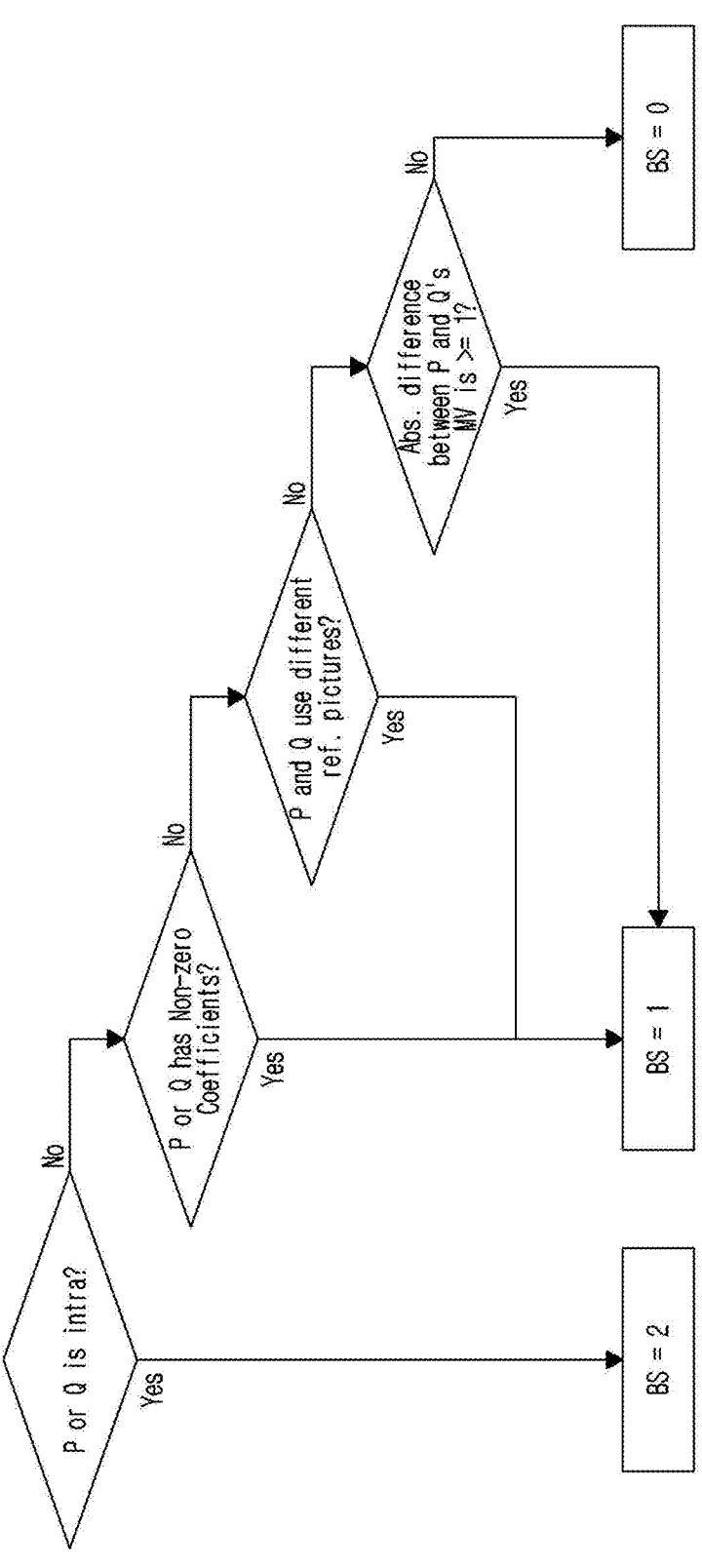
Figure 40:
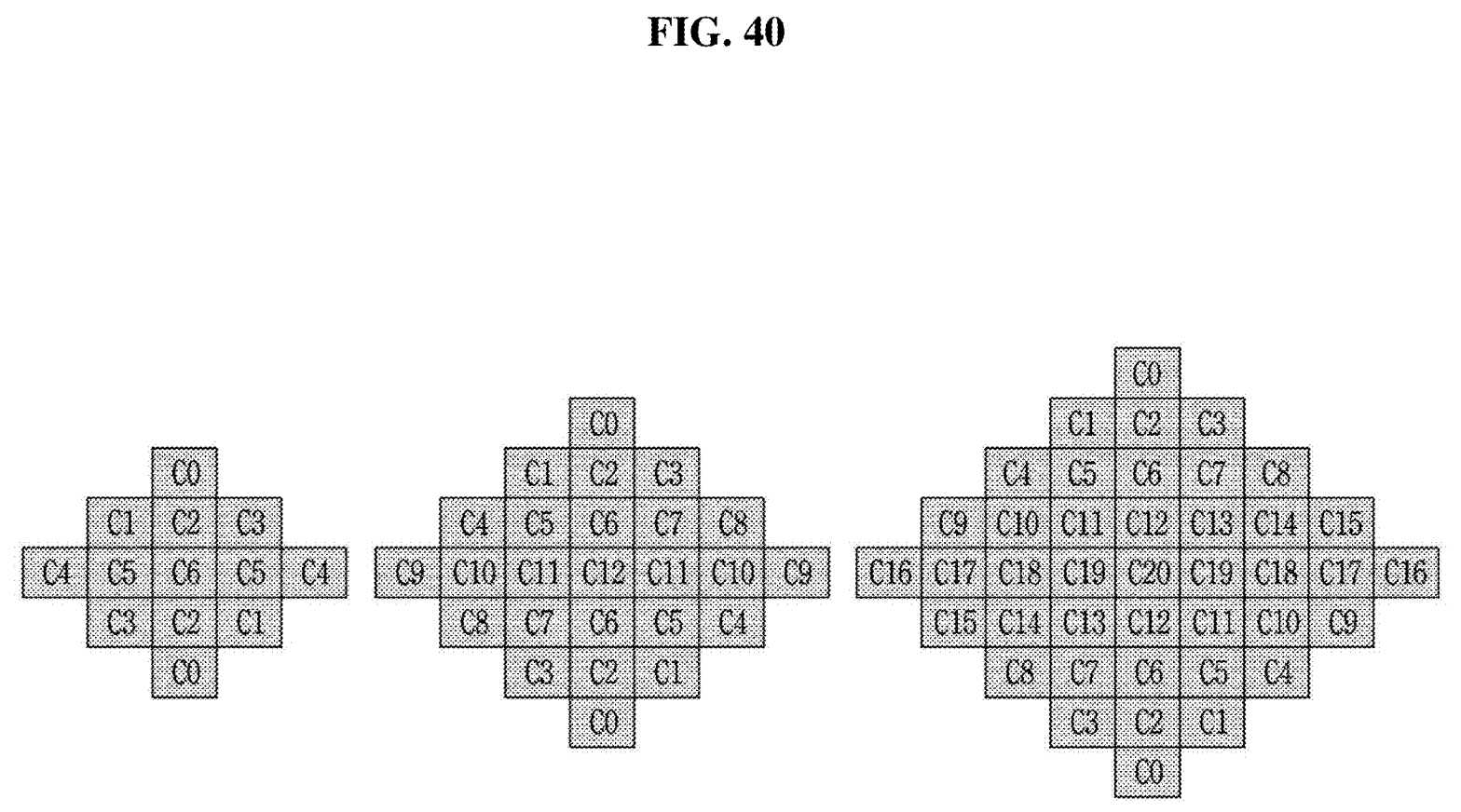

FIGS. 39 and 40 show a method in which an in-loop filter is applied to a reconstructed block as an embodiment to which the present disclosure is applied.

BEST MODE

A video encoding/decoding method and device according to the present disclosure may determine an intra prediction mode of a chroma block, specify a luma region for inter-component reference of the chroma block, downsample the specified luma region, derive a parameter for the inter-component reference of the chroma block and predict the chroma block by using a luma block corresponding to the chroma block and the parameter.

In a video encoding/decoding method and device according to the present disclosure, the luma region may include at least one of a luma block corresponding to the chroma block or a neighboring region adjacent to the luma block.

In a video encoding/decoding method and device according to the present disclosure, an intra prediction mode of the chroma block may be derived based on an index and a predetermined group configured with inter-component reference-based prediction modes.

In a video encoding/decoding method and device according to the present disclosure, the inter-component reference-based prediction mode may include at least one of a first mode which refers to both a left and top region adjacent to the chroma block, a second mode which refers to a left region adjacent to the chroma block or a third mode which refers to a top region adjacent to the chroma block.

In a video encoding/decoding method and device according to the present disclosure, a neighboring region adjacent to the luma block may include at least one of a top neighboring region or a left neighboring region, the top neighboring region may include n pixel lines, and the left neighboring region may include m pixel lines.

In a video encoding/decoding method and device according to the present disclosure, downsampling a neighboring region adjacent to the luma block may be performed by using only a luma pixel at a specific position and a neighboring pixel of the luma pixel.

In a video encoding/decoding method and device according to the present disclosure, the specific position may be determined based on a position of a pixel selected among a plurality of pixels belonging to a neighboring region of the chroma block.

In a video encoding/decoding method and device according to the present disclosure, the selected pixel may be one or more pixels positioned at every predetermined interval in a neighboring region of the chroma block.

In a video encoding/decoding method and device according to the present disclosure, the neighboring pixel may be a pixel positioned in at least one of a left, right, top, bottom, top-left, bottom-left, top-right or bottom-right direction of the luma pixel.

In a video encoding/decoding method and device according to the present disclosure, deriving a parameter for the inter-component reference may include calculating the maximum value and the minimum value from a plurality of pixels obtained by downsampling a neighboring region of the luma block, and the parameter for the inter-component reference may be derived by using the calculated maximum value and minimum value.

A digital storage medium for storing a video stream, in which a video decoding program for executing a process is recorded, the process may comprise determining an intra prediction mode of a chroma block, specifying a luma region for inter-component reference of the chroma block, downsampling the specified luma region, deriving a parameter for the inter-component reference of the chroma block and predicting the chroma block by applying the parameter to the downsampled luma region.

MODE FOR INVENTION

Referring to a diagram attached in this description, an embodiment of the present disclosure is described in detail so that a person with ordinary skill in the art to which the inventions pertain may easily carry it out. However, the present disclosure may be implemented in a variety of different shapes and is not limited to an embodiment which is described herein. In addition, a part irrelevant to description is omitted and a similar diagram code is attached to a similar part through the description to clearly describe the present disclosure in a diagram.

In this description, when a part is referred to as being 'connected to' other part, it includes a case that it is electrically connected while intervening another element as well as a case that it is directly connected.

In addition, in this description, when a part is referred to as 'including' a component, it means that other components may be additionally included without excluding other components, unless otherwise specified.

In addition, a term such as first, second, etc. may be used to describe various components, but the components should not be limited by the terms. The terms are used only to distinguish one component from other components.

In addition, in an embodiment on a device and a method described in this description, some configurations of the device or some steps of the method may be omitted. In addition, the order of some configurations of the device or some steps of the method may be changed. In addition, another configuration or another step may be inserted in some configurations of the device or some steps of the method.

In addition, some configurations or some steps in a first embodiment of the present disclosure may be added to a second embodiment of the present disclosure or may be replaced with some configurations or some steps in a second embodiment.

In addition, as construction units shown in an embodiment of the present disclosure are independently shown to represent different characteristic functions, it does not mean that each construction unit is configured in separate hardware or one software construction unit. In other words, each construction unit may be described by being enumerated as each construction unit for convenience of description, at least two construction units among each construction unit may be combined to configure one construction unit or one construction unit may be divided into a plurality of construction units to perform a function. Such an integrated embodiment and separated embodiment in each construction unit are also included in a scope of a right on the present disclosure as long as they are not beyond the essence of the present disclosure.

In this description, a block may be variously represented as a unit, a region, a unit, a partition, etc. and a sample may be variously represented as a pixel, a pel, a pixel, etc.

Hereinafter, referring to the attached drawings, an embodiment of the present disclosure will be described in more detail. In describing the present disclosure, overlapping description for the same component is omitted.

Figure 1:
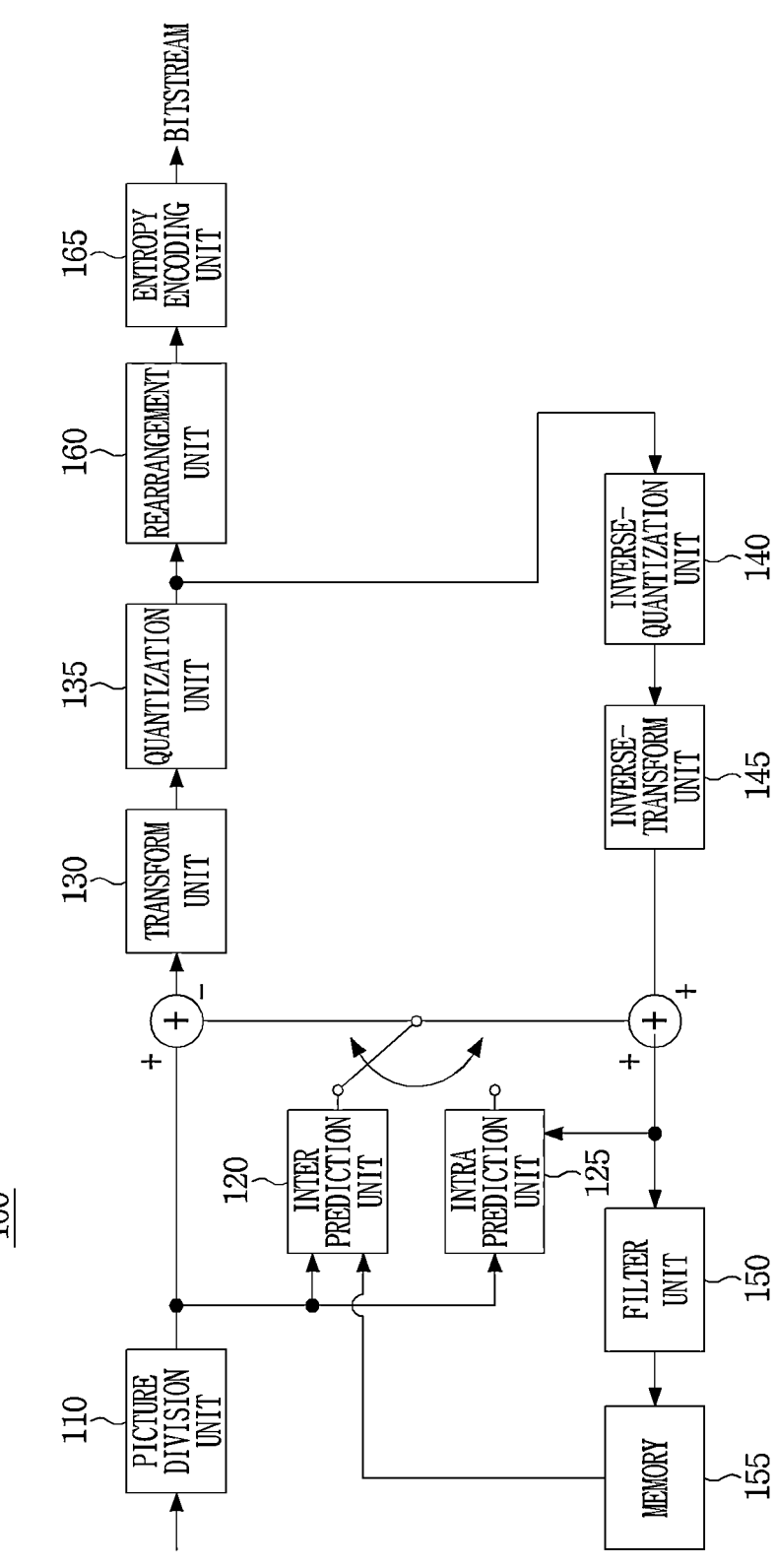
FIG. 1 is a block diagram showing an image encoding device according to the present disclosure.

FIG. 1 is a block diagram showing an image encoding device according to the present disclosure.

In reference to FIG. 1, a traditional image encoding device 100 may include a picture partition unit 110, a prediction unit 120 and 125, a transform unit 130, a quantization unit 135, a rearrangement unit 160, an entropy encoding unit 165, an inverse quantization unit 140, an inverse transform unit 145, a filter unit 150 and a memory 155.

A picture partition unit 110 may partition an input picture into at least one processing unit. In this case, a processing unit may be a prediction unit(PU), a transform unit(TU) or a coding unit(CU). Hereinafter, in an embodiment of the present disclosure, a coding unit may be used as a unit performing encoding and may be used as a unit performing decoding.

A prediction unit may be partitioned in at least one square shape or rectangular shape, etc. with the same size within one coding unit and may be partitioned so that any one prediction unit among prediction units partitioned in one coding unit will have a shape and/or size different from another prediction unit. When it is not a minimum coding unit in generating a prediction unit which performs intra prediction based on a coding unit, intra prediction may be performed without being partitioned into a plurality of prediction units, N×N.

A prediction unit 120 and 125 may include an inter prediction unit 120 performing inter prediction and an intra prediction unit 125 performing intra prediction. Whether to perform inter prediction or intra prediction for a prediction unit may be determined and concrete information according to each prediction method (e.g., an intra prediction mode, a motion vector, a reference picture, etc.) may be determined. A residual value (a residual block) between a generated prediction block and an original block may be input into a transform unit 130. In addition, prediction mode information, motion vector information, etc. used for prediction may be encoded in an entropy encoding unit 165 with a residual value and transmitted to a decoder.

An inter prediction unit 120 may predict a prediction unit based on information of at least one picture of a previous picture or a subsequent picture of a current picture or may predict a prediction unit based on information of some regions which are encoded in a current picture in some cases. An inter prediction unit 120 may include a reference picture interpolation unit, a motion prediction unit and a motion compensation unit.

In a reference picture interpolation unit, reference picture information may be provided from a memory 155 and pixel information of an integer pixel or less may be generated in a reference picture. For a luma pixel, a DCT-based 8-tap interpolation filter with a different filter coefficient may be used to generate pixel information of an integer pixel or less in a ¼ pixel unit. For a chroma signal, a DCT-based 4-tap interpolation filter with a different filter coefficient may be used to generate pixel information of an integer pixel or less in a ¼ pixel unit in a ⅛ pixel unit.

A motion prediction unit may perform motion prediction based on a reference picture interpolated by a reference picture interpolation unit. As a method for calculating a motion vector, various methods such as FBMA(Full search-based Block Matching Algorithm), TSS(Three Step Search), NTS(New Three-Step Search Algorithm), etc. may be used. A motion vector may have a motion vector value in a ½ or ¼ pixel unit based on an interpolated pixel. In a motion prediction unit, a current prediction unit may be predicted by making a motion prediction method different. For a motion prediction method, various methods such as a skip mode, a merge mode, a AMVP (Advanced Motion Vector Prediction) mode, an intra block copy mode, an affine mode, etc. may be used.

An intra prediction unit 125 may generate a prediction unit based on reference pixel information around a current block, pixel information in a current picture. When a reference pixel is a pixel which performed inter prediction because a neighboring block of a current prediction unit is a block which performed inter prediction, a reference pixel included in a block which performed inter prediction may be used by being substituted with reference pixel information of a block which performed neighboring intra prediction. In other words, when a reference pixel is unavailable, unavailable reference pixel information may be used by being substituted with at least one reference pixel of available reference pixels.

In addition, a residual block including information on a residual value which is a difference value between a prediction unit which performed prediction based on a prediction unit generated in a prediction unit 120 and 125 and an original block of the prediction unit, may be generated. A generated residual block may be input into a transform unit 130.

In a transform unit 130, an original block and a residual block including information on a residual value of a prediction unit generated in a prediction unit 120 and 125 may be transformed by using a transform method such as DCT (Discrete Cosine Transform), DST(Discrete Sine Transform) and KLT. Whether to apply DCT, DST or KLT to transform a residual block may be determined based on intra prediction mode information in a prediction unit used to generate a residual block.

A quantization unit 135 may quantize values which are transformed into a frequency domain in a transform unit 130. According to a block or according to image importance, quantized coefficients may be changed. Values calculated in a quantization unit 135 may be provided to an inverse quantization unit 140 and a rearrangement unit 160.

A rearrangement unit 160 may perform rearrangement of coefficient values for quantized residual values.

A rearrangement unit 160 may change two-dimensional block-shaped coefficients into a one-dimensional vector shape through a coefficient scanning method. For example, in a rearrangement unit 160, a DC coefficient to coefficients in a high frequency domain may be scanned by a zig-zag scanning method and may be changed into a one-dimensional vector shape. A vertical scan which scans two-dimensional block-shaped coefficients by column or a horizontal scan which scans two-dimensional block-shaped coefficients by row may be used instead of a zig-zag scan according to a size of a transform unit and an intra prediction mode. In other words, whether which scanning method among a zig-zag scan, a vertical directional scan and a horizontal directional scan will be used may be determined according to a size of a transform unit and an intra prediction mode.

An entropy encoding unit 165 may perform entropy encoding based on values calculated by a rearrangement unit 160. For example, entropy encoding may use various encoding methods such as Exponential Golomb, CAVLC(Context-Adaptive Variable Length Coding) and CABAC(Context-Adaptive Binary Arithmetic Coding). Regarding it, an entropy encoding unit 165 may encode residual value coefficient information in a coding unit from a rearrangement unit 160 and a prediction unit 120 and 125. In addition, according to the present disclosure, it is possible to signal and transmit information indicating that motion information is derived and used in the side of a decoder and information on a method used for deriving motion information.

In an inverse quantization unit 140 and an inverse transform unit 145, values quantized in a quantization unit 135 are inversely quantized and values transformed in a transform unit 130 are inversely transformed. A residual value generated in an inverse quantization unit 140 and an inverse transform unit 145 may generate a reconstructed block by being combined with a prediction unit which is predicted through a motion prediction unit, a motion compensation unit and an intra prediction unit included in a prediction unit 120 and 125.

A filter unit 150 may include at least one of a deblocking filter, an offset modification unit or ALF(Adaptive Loop Filter). A deblocking filter may remove block distortion generated by a boundary between blocks in a reconstructed picture. An offset modification unit may modify an offset with an original image in a pixel unit for an image on which deblocking has been performed. A method in which pixels included in an image are divided into the certain number of regions, a region which will perform an offset is determined and an offset is applied to the corresponding region or a method in which an offset is applied by considering edge information of each pixel may be used to perform offset modification for a specific picture. ALF (Adaptive Loop Filter) may be performed based on a value comparing a filtered reconstructed image with an original image. Pixels included in an image may be divided into a predetermined group, one filter which will be applied to the corresponding group may be determined and filtering may be performed discriminately per group.

A memory 155 may store a reconstructed block or picture calculated in a filter unit 150 and a stored reconstructed block or picture may be provided for a prediction unit 120 and 125 when inter prediction is performed.

Figure 2:
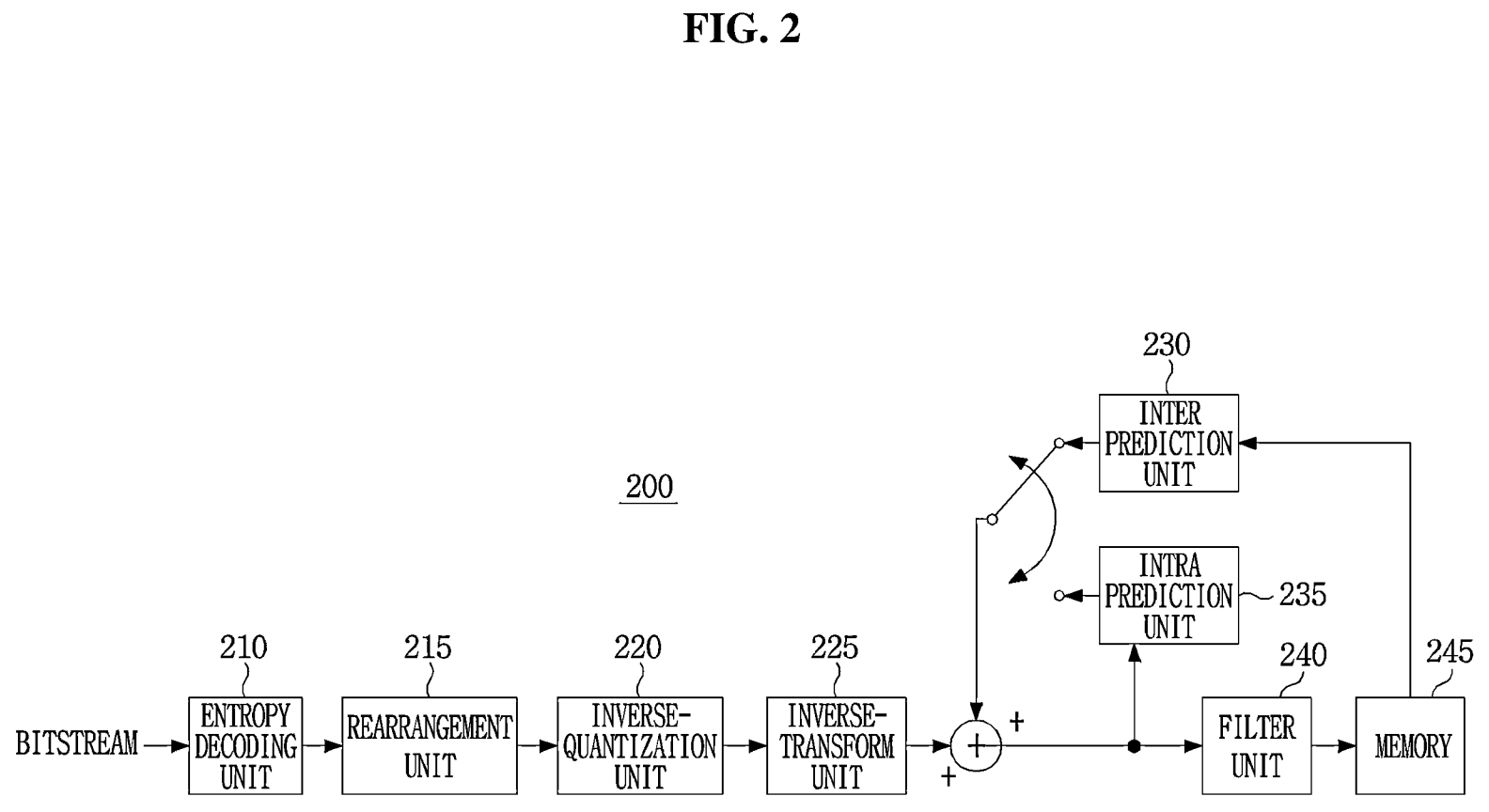

FIG. 2 is a block diagram showing an image decoding device according to the present disclosure.

In reference to FIG. 2, an image decoder 200 may include an entropy decoding unit 210, a rearrangement unit 215, an inverse quantization unit 220, an inverse transform unit 225, a prediction unit 230 and 235, a filter unit 240 and a memory 245.

When an image bitstream is input in an image encoder, an input bitstream may be decoded in a process opposite to that of an image encoder.

An entropy decoding unit 210 may perform entropy decoding in a process opposite to a process in which entropy encoding is performed in an entropy encoding unit of an image encoder. For example, corresponding to a method performed in an image encoder, various methods such as Exponential Golomb, CAVLC(Context-Adaptive Variable Length Coding) and CABAC(Context-Adaptive Binary Arithmetic Coding) may be applied.

In an entropy decoding unit 210, information related to intra prediction and inter prediction performed in an encoder may be decoded.

A rearrangement unit 215 may perform rearrangement for a bitstream entropy-decoded in an entropy decoding unit 210 based on a rearrangement method of an encoding unit. Coefficients represented in a one-dimensional vector shape may be reconstructed into coefficients in a two-dimensional block shape and may be rearranged.

An inverse quantization unit 220 may perform inverse quantization based on a quantization parameter provided in an encoder and a coefficient value of a rearranged block.

An inverse transform unit 225 may perform inverse DCT, inverse DST and inverse KLT, i.e., inverse transform for DCT, DST and KLT, i.e., transform performed in a transform unit for a result of quantization performed in an image encoder. Inverse transform may be performed based on a transmission unit determined in an image encoder. In the inverse transform unit 225 of an image decoder, a transform method (e.g., DCT, DST, KLT) may be selectively performed according to a plurality of information such as a prediction method, a size of a current block, a prediction direction, etc.

A prediction unit 230 and 235 may generate a prediction block based on information related to prediction block generation provided in an entropy decoding unit 210 and pre-decoded block or picture information provided in a memory 245.

As described above, when a size of a prediction unit is the same as that of a transform unit in performing intra prediction in the same manner as operation in an image encoder, intra prediction for a prediction unit may be performed based on a pixel at a left position of a prediction unit, a pixel at a top-left position of a prediction unit and a pixel at a top position of a prediction unit, but when a size of a prediction unit is different from that of a transform unit in performing intra prediction, intra prediction may be performed by using a reference pixel based on a transform unit. In addition, intra prediction using N×N partitions only for a minimum coding unit may be used.

A prediction unit 230 and 235 may include a prediction unit determination unit, an inter prediction unit and an intra prediction unit. A prediction unit determination unit may receive a variety of information such as prediction unit information, prediction mode information of an intra prediction method, information related to motion prediction of an inter prediction method, etc. which are input from an entropy decoding unit 210, classify a prediction unit in a current coding unit and determine whether a prediction unit performs inter prediction or intra prediction. On the other hand, if information indicating that motion information is derived and used in the side of a decoder and information on a method used for deriving motion information are transmitted in an encoding device 100 without transmitting motion prediction-related information for the inter prediction, the prediction unit determination unit may determine whether an inter prediction unit 230 performs prediction based on information transmitted from an encoder 100.

An inter prediction unit 230 may perform inter prediction on a current prediction unit based on information included in at least one picture of a previous picture or a subsequent picture of a current picture including a current prediction unit by using information necessary for inter prediction of a current prediction unit provided by an image encoder. To perform inter prediction, whether a motion prediction method in a prediction unit included in a corresponding coding unit based on a coding unit is a skip mode, a merge mode, a AMVP mode, an intra block copy mode or an affine mode may be determined.

An intra prediction unit 235 may generate a prediction block based on pixel information in a current picture. When a prediction unit is a prediction unit which performs intra prediction, intra prediction may be performed based on intra prediction mode information of a prediction unit provided by an image encoder.

An intra prediction unit 235 may include an adaptive intra smoothing (AIS) filter, a reference pixel interpolation unit and a DC filter. As a part performing filtering for a reference pixel of a current block, an AIS filter may be applied by determining whether a filter is applied according to a prediction mode of a current prediction unit. AIS filtering may be performed for a reference pixel of a current block by using a prediction mode of a prediction unit and AIS filter information provided by an image encoder. When a prediction mode of a current block is a mode where AIS filtering is not performed, an AIS filter may not be applied.

When a prediction mode of a prediction unit is a prediction unit in which intra prediction is performed based on a pixel value interpolating a reference pixel, a reference pixel interpolation unit may interpolate a reference pixel to generate a reference pixel in a pixel unit which is equal to or less than an integer value. When a prediction mode of a current prediction unit is a prediction mode which generates a prediction block without interpolating a reference pixel, a reference pixel may not be interpolated. A DC filter may generate a prediction block through filtering when a prediction mode of a current block is a DC mode.

A reconstructed block or picture may be provided to a filter unit 240. A filter unit 240 may include a deblocking filter, an offset modification unit and an ALF.

Information on whether a deblocking filter is applied to a corresponding block or picture and information on whether a strong filter or a weak filter is applied when a deblocking filter is applied may be provided by an image encoder. A deblocking filter of an image decoder may receive information related to a deblocking filter provided by an image encoder and perform deblocking filtering for a corresponding block in an image decoder.

An offset modification unit may perform offset modification on a reconstructed image based on a type of offset modification, offset value information, etc. applied to an image in encoding. An ALF may be applied to a coding unit based on information on whether an ALF is applied, ALF coefficient information, etc. provided by an encoder. Such ALF information may be provided by being included in a specific parameter set.

A memory 245 may store a reconstructed picture or block for use as a reference picture or a reference block and also provide a reconstructed picture to an output unit.

Figure 3:
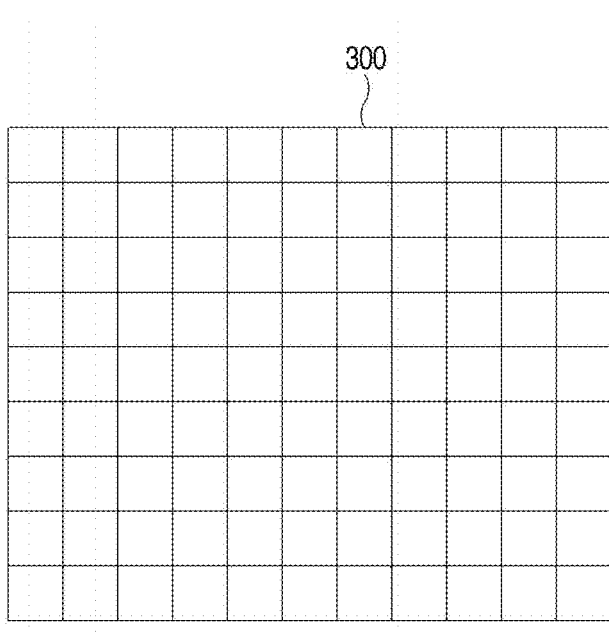
FIGS. 3 to 5 show a method in which a picture is partitioned into a plurality of blocks as an embodiment to which the present disclosure is applied.
Figure 4:
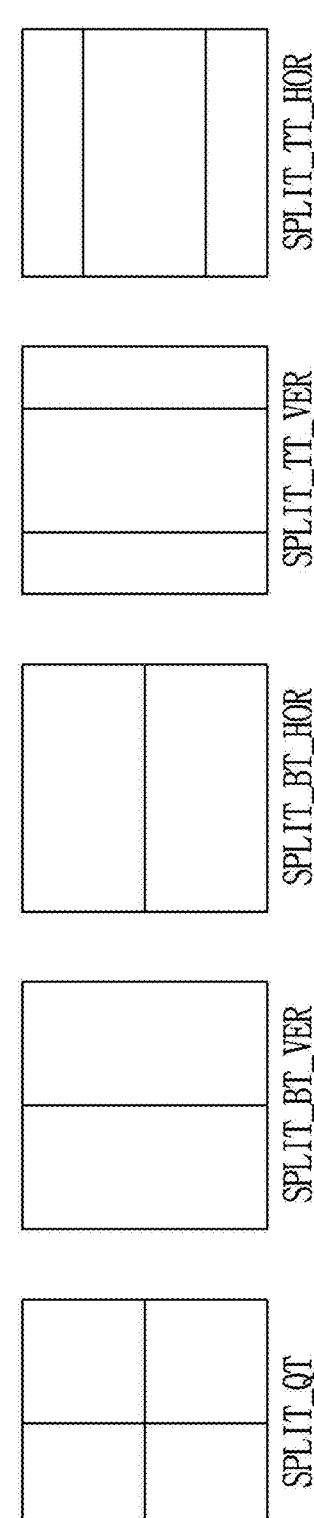
Figure 5:
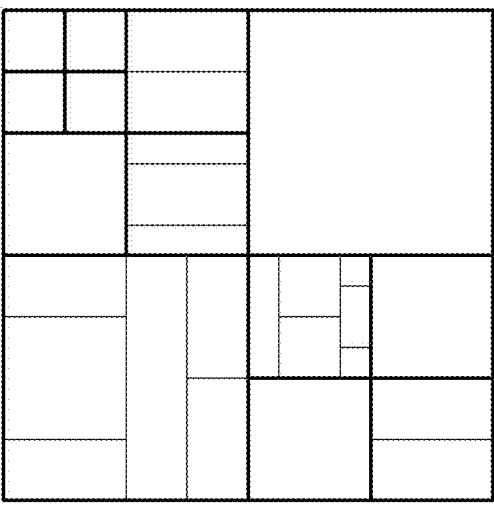

FIGS. 3 to 5 show a method in which a picture is partitioned into a plurality of blocks as an embodiment to which the present disclosure is applied.

In reference to FIG. 3, a picture 300 is partitioned into a plurality of base coding units (Coding Tree Unit, hereinafter, CTU).

A size of CTU may be regulated in a unit of a picture or a video sequence and each CTU is configured not to be overlapped with other CTU. For example, a CTU size may be set as 128x128 in the whole sequences and any one of 128x128 to 256x256 may be selected in a unit of a picture and used.

A coding block/a coding unit (hereinafter, CU) may be generated by hierarchically partitioning CTU. Prediction and transform may be performed in a unit of a coding unit and it becomes a base unit which determines a prediction encoding mode. A prediction encoding mode may represent a method of generating a prediction image and consider intra prediction, inter prediction or combined prediction, etc. as an example. Concretely, for example, a prediction block may be generated by using a prediction encoding mode of at least any one of intra prediction, inter prediction or combined prediction in a unit of a coding unit. When a reference picture indicates a current picture in an inter prediction mode, a prediction block may be generated based on a region in a current picture which has been already decoded. It may be included in inter prediction because a prediction block is generated by using a reference picture index and a motion vector. Intra prediction is a method in which a prediction block is generated by using information of a current picture, inter prediction is a method in which a prediction block is generated by using information of other picture which has been already decoded and combined prediction is a method in which inter prediction and intra prediction are combined and used. Combined prediction may encode/decode some regions of a plurality of sub-regions configuring one coding block with inter prediction and may encode/decode other regions with intra prediction. Alternatively, combined prediction may primarily perform inter prediction for a plurality of sub-regions and secondarily perform intra prediction. In this case, a prediction value of a coding block may be derived by performing a weighted average for a prediction value according to inter prediction and a prediction value according to intra prediction. The number of sub-regions configuring one coding block may be 2, 3, 4 or more and a shape of a sub-region may be a quadrangle, a triangle or other polygons.

In reference to FIG. 4, CTU may be partitioned in a shape of quad tree, binary tree or triple tree. A partitioned block may be additionally partitioned in a shape of quad tree, binary tree or triple tree. A method in which a current block is partitioned into 4 square partitions is referred to as quad tree partitioning, a method in which a current block is partitioned into 2 square or non-square partitions is referred to as binary tree partitioning and a method in which a current block is partitioned into 3 partitions is defined as binary tree partitioning.

Binary partitioning in a vertical direction (SPLIT_BT_VER in FIG. 4) is referred to as vertical binary tree partitioning and binary tree partitioning in a horizontal direction (SPLIT_BT_HOR in FIG. 4) is referred to as horizontal binary tree partitioning.

Triple partitioning in a vertical direction (SPLIT_TT_VER in FIG. 4) is referred to as vertical triple tree partitioning and triple tree partitioning in a horizontal direction (SPLIT_TT_HOR in FIG. 4) is referred to as horizontal triple tree partitioning.

The number of partitions may be referred to as a partitioning depth and the maximum value of a partitioning depth may be differently set per sequence, picture, sub-picture, slice or tile and it may be set to have a different partitioning depth according to a partitioning tree shape (quad tree/binary tree/triple tree) and a syntax representing it may be signaled.

A coding unit of a leaf node may be configured by additionally partitioning a partitioned coding unit in a method such as quad tree partitioning, binary tree partitioning or other multi-tree partitioning (e.g., ternary tree partitioning), or a coding unit of a leaf node may be configured without the additional partitioning.

In reference to FIG. 5, a coding unit may be set by hierarchically partitioning one CTU and a coding unit may be partitioned by using at least any one of binary tree partitioning, quad tree partitioning/triple tree partitioning. Such a method is referred to as multi tree partitioning.

A coding unit generated by partitioning an arbitrary coding unit whose partitioning depth is k is referred to as a lower coding unit and a partitioning depth becomes (k+1). A coding unit with a partitioning depth of k which includes a lower coding unit whose partitioning depth is (k+1) is referred to as a higher coding unit.

A partitioning type of a current coding unit may be limited according to a partitioning type of a higher coding unit and/or a partitioning type of a coding unit around a current coding unit.

In this case, a partitioning type represents an indicator which indicates which partitioning of binary tree partitioning, quad tree partitioning/triple tree partitioning is used.

FIG. 6 roughly shows a process in which a current block is reconstructed as an embodiment to which the present disclosure is applied.

In reference to FIG. 6, a prediction block of a current block may be generated based on a predefined prediction mode in an encoding/decoding device S600.

A prediction image may be generated by a plurality of methods in encoding/decoding a video and a method of generating a prediction image is referred to as a prediction encoding mode.

A prediction encoding mode may be configured with an intra prediction encoding mode, an inter prediction encoding mode, a current picture reference encoding mode or a combined encoding mode(combined prediction), etc.

An inter prediction encoding mode is referred to as a prediction encoding mode which generates a prediction block (a prediction image) of a current block by using information of a previous picture and an intra prediction encoding mode is referred to as a prediction encoding mode which generates a prediction block by using a sample neighboring a current block. A prediction block may be generated by using a pre-reconstructed image of a current picture, which is referred to as a current picture reference mode or an intra block copy mode.

A prediction block may be generated by using at least 2 or more prediction encoding modes of an inter prediction encoding mode, an intra prediction encoding mode or a current picture reference encoding mode, which is referred to as a combined encoding mode (combined prediction).

An inter prediction encoding mode will be described in detail by referring to FIGS. 7 to 20 and an intra prediction encoding mode will be described in detail by referring to FIGS. 21 to 38.

In reference to FIG. 6, a transform block of a current block may be generated through predetermined transform S610.

An image subtracting a prediction image from an original image is referred to as a residual image or a transform block.

A residual image may be decomposed into a two-dimensional frequency component through two-dimensional transform such as DCT(Discrete cosine transform). There is a feature that visual distortion is not generated significantly though a high-frequency component is removed from an image. When a value corresponding to high frequency is set to be small or 0, compression efficiency may be improved without significant visual distortion.

DST (Discrete sine transform) may be used according to a size of a prediction block or a prediction mode. Concretely, for example, when it is an intra prediction mode and a size of a prediction block/a coding block is less than N×N, DST transform may be set to be used and DCT transform may be set to be used for other prediction block/coding block.

DCT is a process in which an image is decomposed (transformed) into two-dimensional frequency components by using cos transform and frequency components in this case are represented as a base image. For example, when DCT transform is performed in a N×N block, $N^2$ basic pattern components may be obtained. Performing DCT transform means that a size of each basic pattern component included in an original pixel block is found. A size of each basic pattern component is referred to as a DCT coefficient.

Generally, in an image where many non-zero components are distributed at low frequencies, DCT (Discrete Cosine Transform) is mainly used, and in an image where many high frequency components are distributed, DST (Discrete Sine Transform) may be used.

DST represents a process in which an image is decomposed (transformed) into two-dimensional frequency components by using sin transform. A two-dimensional image may be decomposed (transformed) into two-dimensional frequency components by using a transform method excluding DCT or DST transform, which is referred to as two-dimensional image transform.

Two-dimensional image transform may not be performed in a specific block of a residual image, which is referred to as a transform skip. After a transform skip, quantization may be applied.

DCT or DST or two-dimensional image transform may be applied to an arbitrary block in a two-dimensional image, and transform used in this case is referred to as first transform. Transform may be re-performed in some regions of a transform block after first transform is performed, which is referred to as second transform.

First transform may use one of a plurality of transform cores. Concretely, for example, any one of DCT2, DCT8 or DST7 may be selected and used in a transform block. Alternatively, a different transform core may be used in transform in a horizontal direction and in transform in a vertical direction in a transform block.

A unit of a block performing first transform and second transform may be differently set. Concretely, for example, after first transform is performed in an 8×8 block of a residual image, second transform may be performed respectively per 4×4 sub-block. In another example, after first transform is performed in each 4×4 block, second transform may be performed respectively in an 8×8 sized block.

A residual image to which first transform is applied is referred to as a first transform residual image. DCT or DST or two-dimensional image transform may be applied to a first transform residual image, and transform used in this case is referred to as second transform. A two-dimensional image to which second transform is applied is referred to as a second transform residual image.

A sample value in a block after performing first transform and/or second transform is referred to as a transform coefficient. Quantization refers to a process in which a transform coefficient is divided by a predefined value to reduce energy of a block. A value defined to apply quantization to a transform coefficient is referred to as a quantization parameter.

A predefined quantization parameter may be applied in a unit of a sequence or a block. Generally, a quantization parameter may be defined as a value from 1 to 51.

After performing transform and quantization, a residual reconstructed image may be generated by performing inverse quantization and inverse transform. A first reconstructed image may be generated by adding a prediction image to a residual reconstructed image.

A transform block may be generated based on at least one of n transform types which are predefined in an encoding/decoding device. n may be an integer such as 1, 2, 3, 4 or more. DCT2, DCT8, DST7, a transform skip mode, etc. may be used for the transform type. Only one same transform type may be applied in a vertical/horizontal direction of one block or a different transform type may be applied in a vertical/horizontal direction, respectively. For it, a flag representing whether one same transform type is applied may be used. The flag may be signaled in an encoding device.

In addition, the transform type may be determined based on information signaled in an encoding device or may be determined based on a predetermined encoding parameter. In this case, an encoding parameter may mean at least one of a size or a shape of a block, an intra prediction mode or a component type (e.g., luma, chroma). A size of a block may be represented as a width, a height, a ratio of a width and a height, a multiplication of a width and a height, a sum/a difference of a width and a height, etc. For example, when a size of a current block is greater than a predetermined threshold value, a transform type in a horizontal direction may be determined as a first transform type (e.g., DCT2) and a transform type in a vertical direction may be determined as a second transform type (e.g., DST7). The threshold value may be an integer such as 0, 4, 8, 16, 32 or more.

On the other hand, a residual coefficient according to the present disclosure may be obtained by performing second transform after first transform. Second transform may be performed for a residual coefficient of some regions in a current block. In this case, a decoding device may obtain a transform block of a current block by performing the second inverse transform for the some regions and performing first inverse transform for a current block including the inversely-transformed some regions.

In reference to FIG. 6, a current block may be reconstructed based on a prediction block and a transform block S620.

A predetermined in-loop filter may be applied to a reconstructed current block. An in-loop filter may include at least one of a deblocking filter, a SAO(sample adaptive offset) filter or an ALF (adaptive loop filter), which will be described by referring to FIGS. 39 and 40.

FIG. 7 shows an inter prediction method as an embodiment to which the present disclosure is applied.

A method in which a prediction block (a prediction image) of a block in a current picture is generated by using information of a previous picture is referred to as an inter prediction encoding mode or an inter mode.

For example, a prediction image may be generated based on a corresponding block (a collocated block/a co-located block) of a previous picture or a prediction block (a prediction image) may be generated based on a specific block of a previous picture.

In this case, a specific block may be derived from a motion vector. A collocated block represents a block of a corresponding picture that a position and a size of a top-left sample are the same as a current block as in FIG. 7. A corresponding picture may be specified by the same syntax as a reference picture reference.

A prediction block may be generated by considering a motion of an object in an inter prediction encoding mode. For example, if knowing in which direction and how much an object in a previous picture moves, a prediction block (a prediction image) may be generated by subtracting a block considering a motion from a current block, which is referred to as a motion prediction block.

A residual block may be generated by subtracting a motion prediction block or the corresponding prediction block from a current block. When a motion is generated in an object, energy of a residual block decreases if a motion prediction block rather than the corresponding prediction block is used, so compression performance may be improved. As such, a method of using a motion prediction block is referred to as motion compensation prediction and motion compensation prediction is used for most inter prediction encoding.

A value representing in which direction and how much an object in a previous picture moves is referred to as a motion vector. As a motion vector, a motion vector with different pixel precision may be used in a unit of a sequence, a picture, a sub-picture, a slice, a tile, a CTU or a CU. For example, pixel precision of a motion vector in a specific block may be at least any one of $\frac{1}{16}$, $\frac{1}{8}$, $\frac{1}{4}$, $\frac{1}{2}$, 1, 2, 4 or 8. A type and/or number of available pixel precision candidates may be different per inter prediction encoding mode which is described after. For example, for an affine inter prediction method, k pixel precision is available and for an inter prediction method using a translation motion, i pixel precision is unavailable. For a current picture reference mode, j pixel precision is available. In this case, k, i and j may be a natural number such as 1, 2, 3, 4, 5 or more. However, k may be less than i and i may be less than j. An affine inter prediction method may use at least one pixel precision of $\frac{1}{16}$, $\frac{1}{4}$ or 1 and an inter prediction method using a translation motion (e.g., a merge mode, an AMVP mode) may use at least one pixel precision of $\frac{1}{4}$, $\frac{1}{2}$, 1 or 4. A current picture reference mode may use at least one pixel precision of 1, 4 or 8.

For an inter prediction mode, an inter prediction method using a translation motion and an affine inter prediction method using an affine motion may be selectively used. As an inter prediction method using a translation motion, a merge mode or an AMVP mode may be used.

FIGS. 8 to 10 show an affine inter prediction method as an embodiment to which the present disclosure is applied.

In a video, a lot of cases occur in which a motion of a specific object does not appear linearly. For example, as in FIG. 8, when only a translation motion vector is used for a motion of an object in an image that an affine motion such as zoom-in, zoom-out, rotation, affine transform which makes transform in an arbitrary shape possible, etc. is used, a motion of an object may not be effectively represented and encoding performance may be reduced.

An affine motion may be represented as in the following Equation 1.

$$v_x = ax - by + e \qquad \text{[Equation 1]}$$
$$v_y = cx + dy + f$$

When an affine motion is represented by using a total of 6 parameters, it is effective for an image with a complex motion, but lots of bits are used to encode an affine motion parameter, so encoding efficiency may be reduced.

Therefore, an affine motion may be simplified and represented with 4 parameters, which is referred to as a 4-parameter affine motion model. Equation 2 represents an affine motion with 4 parameters.

$$v_x = ax - by + e \qquad \text{[Equation 2]}$$
$$v_y = bx + ay + f$$

A 4-parameter affine motion model may include motion vectors at 2 control points of a current block. A control point may include at least one of a top-left corner, a top-right corner or a bottom-left corner of a current block. In an example, a 4-parameter affine motion model may be determined by a motion vector sv0 at a top-left sample (x0, y0) of a coding unit and a motion vector sv1 at a top-right sample (x1, y1) of a coding unit as in the left of FIG. 9 and $sv_0$ and $sv_1$ are referred to as an affine seed vector. Hereinafter, it is assumed that an affine seed vector $sv_0$ at a top-left position is a first affine seed vector and an affine seed vector $sv_1$ at a top-right position is a second affine seed vector. It is also possible to replace one of a first and second seed vector with an affine seed vector at a bottom-left position and use it in a 4-parameter affine motion model.

A 6-parameter affine motion model is an affine motion model that a motion vector $sv_2$ of a residual control point (e.g., a sample at a bottom-left position (x2, y2)) is added to a 4-parameter affine motion model as in the right picture of FIG. 9. Hereinafter, it is assumed that an affine seed vector $sv_0$ at a top-left position is a first affine seed vector, an affine seed vector $sv_1$ at a top-right position is a second affine seed vector and an affine seed vector $sv_2$ at a bottom-left position is a third affine seed vector.

Information on the number of parameters for representing an affine motion may be encoded in a bitstream. For example, a flag representing whether a 6-parameter is used and a flag representing whether a 4-parameter is used may be encoded in a unit of at least one of a picture, a sub-picture, a slice, a tile group, a tile, a coding unit or a CTU. Accordingly, any one of a 4-parameter affine motion model or a 6-parameter affine motion model may be selectively used in a predetermined unit.

A motion vector may be derived per sub-block of a coding unit by using an affine seed vector as in FIG. 10, which is referred to as an affine sub-block vector.

An affine sub-block vector may be derived as in the following Equation 3. In this case, a base sample position of a sub-block (x, y) may be a sample positioned at a corner of a block (e.g., a top-left sample) or may be a sample that at least one of a x-axis or a y-axis is at the center (e.g., a central sample).

$$\begin{cases} v_x = \dfrac{(sv_{1x} - sv_{0x})}{(x_1 - x_0)}(x - x_0) - \dfrac{(sv_{1y} - sv_{0y})}{(x_1 - x_0)}(y - y_0) + sv_{0x} \\ v_y = \dfrac{(sv_{1y} - sv_{0y})}{(x_1 - x_0)}(x - x_0) - \dfrac{(sv_{1x} - sv_{0x})}{(x_1 - x_0)}(y - y_0) + sv_{0y} \end{cases} \qquad \text{[Equation 3]}$$

Motion compensation may be performed in a unit of a coding unit or in a unit of a sub-block in a coding unit by using an affine sub-block vector, which is referred to as an affine inter prediction mode. In Equation 3, $(x_1-x_0)$ may have the same value as a width of a coding unit.

FIG. 11 shows a range of a spatial neighboring block for a merge mode as an embodiment to which the present disclosure is applied.

Motion information of a current coding unit (a motion vector, a reference picture index, etc.) may be derived from motion information of a neighboring block, without being encoded. Motion information of any one of neighboring blocks may be set as motion information of a current coding unit, which is referred to as a merge mode.

In reference to FIG. 11, a neighboring block used for a merge mode may be a block adjacent to a current coding unit such as an index 0 to 4 (a block touching a boundary of a current coding unit) or may be a block which is not adjacent to a current coding unit such as an index 5 to 26 of FIG. 11.

A merge mode may configure a merge candidate list including at least one of the neighboring blocks. Based on a merge index, any one of a plurality of merge candidates belonging to a merge candidate list may be specified and motion information of a specified merge candidate may be set as motion information of a current coding unit.

FIGS. 12 to 18 show a merge mode using motion information of an inter region as an embodiment to which the present disclosure is applied.

Motion information of a coding unit which is already encoded by inter prediction in a current picture (a motion vector and a reference picture index) may be stored in a list (buffer) in a pre-defined size, which is referred to as an inter region motion information list.

Motion information in an inter region motion information list (at least one of a motion vector or a reference picture index) is referred to as an inter region motion candidate.

An inter region motion candidate may be used as a merge candidate of a current coding unit and for it, at least one of inter region motion candidates may be added to a merge candidate list of a current coding unit. Such a method is referred to as an inter region merge method.

The inter region motion information list may be initialized in a unit of any one of a picture, a slice, a tile, a CTU row or a CTU. Initialization may mean a state that the list is empty. Motion information from some regions of a picture which is encoded and/or decoded may be added to an inter region motion information list. An initial inter region motion candidate of an inter region motion information list may be also signaled in at least one level of a sequence, a picture, a sub-picture, a slice or a tile.

Figure 12:
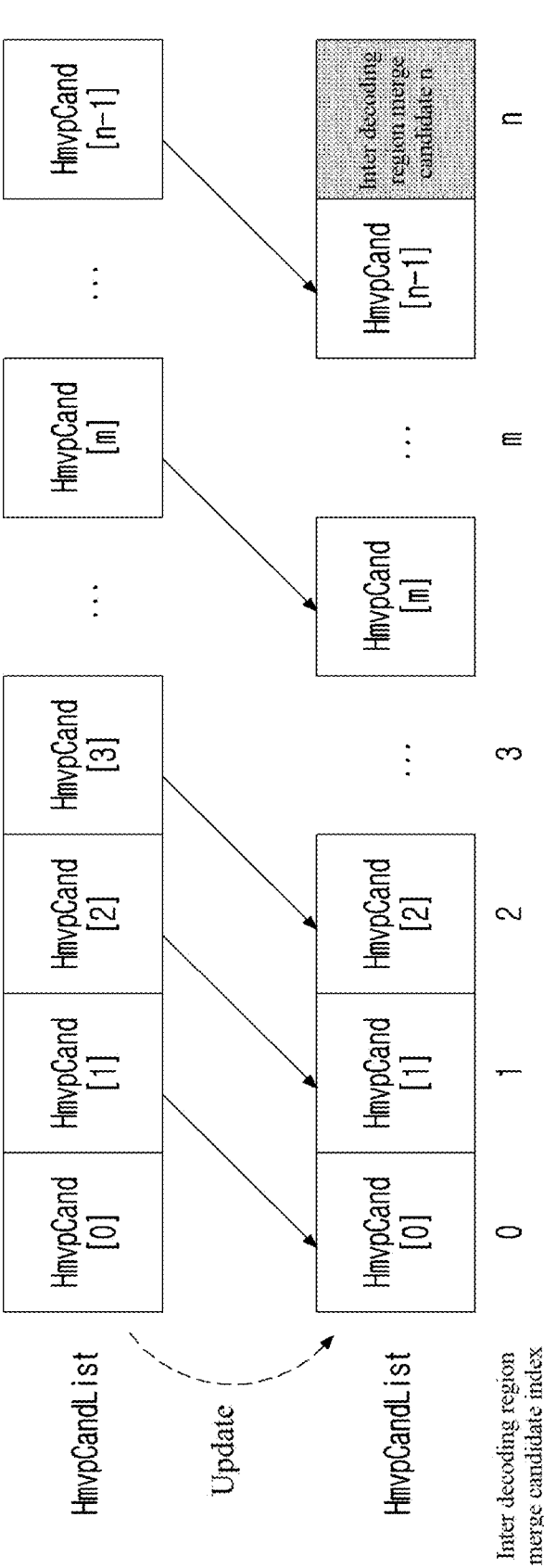

When a coding unit is encoded/decoded by inter prediction, motion information of the coding unit may be updated in an inter region motion information list as in FIG. 12. When the number of inter region motion candidates in an inter region motion information list is the maximum value, an index with the smallest value among the indexes of an inter region motion information list (motion information which is first added to an inter region motion information list) may be removed and motion information in an inter region which is most recently encoded/decoded may be added to an inter region motion information list.

When most recent motion information is the same as pre-added motion information, most recent motion information may not be added to a list. Alternatively, the same motion information as most recent motion information may be removed from a list and most recent motion information may be added. In this case, most recent motion information may be added to the last position of a list.

A motion vector mvCand of a decoded coding unit, may be updated in an inter region motion information list HmvpCandList. In this case, when motion information of a decoded coding unit is the same as any one of motion information in an inter region motion information list (when both a motion vector and a reference index are the same), an inter region motion information list may not be updated or a motion vector mvCand of a decoded coding unit may be stored in the last of an inter region motion information list as in FIG. 14. In this case, when an index of HmvpCandList having the same motion information as a mvCand is hIdx, HMVPCandList[i] may be set as HVMPCandList[i−1] for every i greater than hIdx as in FIG. 14. When a sub-block merge candidate is used in a coding unit which is currently decoded, motion information of a representative sub-block in a coding unit may be stored in an inter region motion information list.

Figure 13:
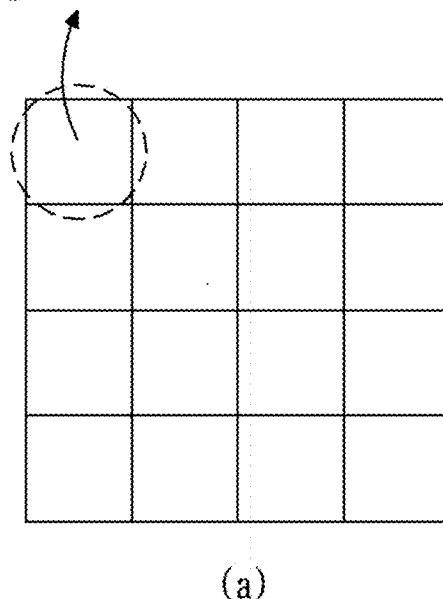
Figure 13:
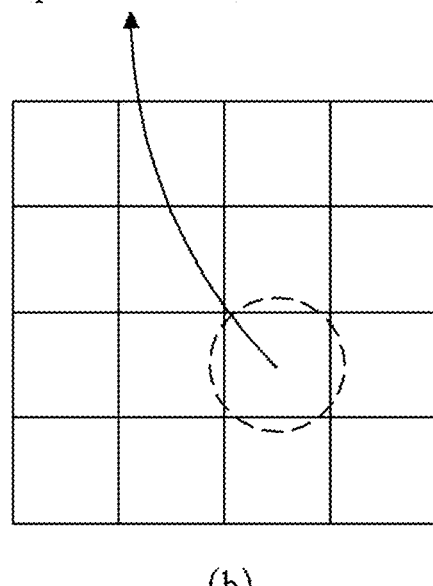
Figure 14:
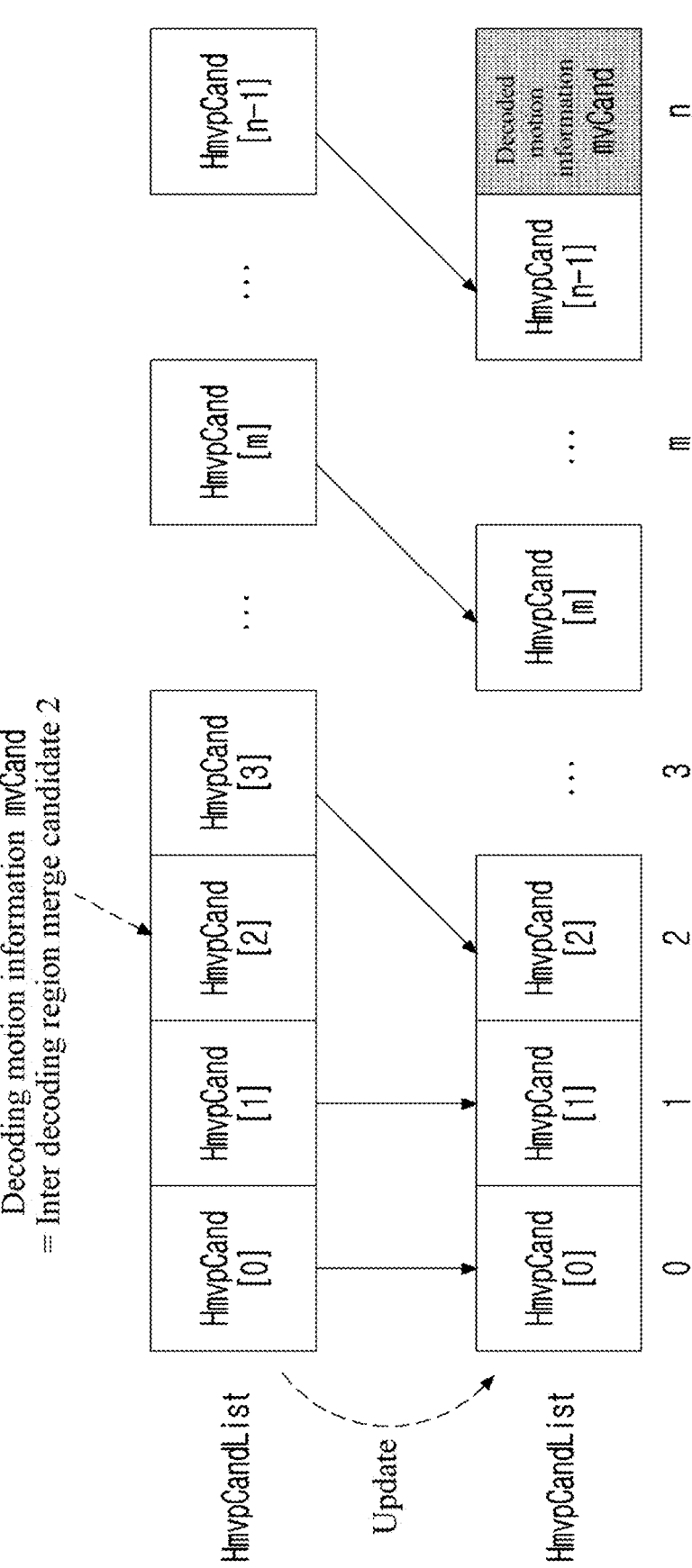

In an example, a representative sub-block in a coding unit may be set as a top-left sub-block in a coding unit or may be set as an intermediate sub-block in a coding unit as in FIG. 13.

A merge candidate in a unit of a sub-block may be derived as in the following process.

1. An initial shift vector (shVector) may be derived from a motion vector of a neighboring merge candidate block of a current block. In this case, a neighboring merge candidate block may be any one of a left, top, bottom-left, top-right or top-left block of a current block. Alternatively, only a left block or a top block of a current block may be set to be fixedly used. 2. As in Equation 4, a shift sub-block that a position of a top-left sample is (xColSb, yColSb) may be derived by adding an initial shift vector to a top-left sample (xSb,ySb) of a sub-block in a coding unit.

$$(xColSb, yColSb) = (xSb + shVector[0] \gg 4,$$
$$ySb + shVector[1] \gg 4) \qquad \text{[Equation 4]}$$

3. A motion vector of a collocated block corresponding to a center position of a sub-block including (xColSb, yColSb) may be derived as a motion vector of a sub-block including a top-left sample (xSb,ySb).

Total NumHmvp motion information may be stored in an inter region motion information list and NumHmvp is referred to as a size of an inter region motion information list.

A size of an inter region motion information list may use a pre-defined value. A size of an inter region motion information list may be signaled in a sequence, a picture, a sub-picture, a slice header and/or a tile header. In an example, a size of an inter region motion information list may be defined as 16 or may be defined as 4, 5, 6, or the like.

When an encoded/decoded coding unit is inter prediction and has an affine motion vector, it may not be included in an inter region motion information list.

Alternatively, when an encoded/decoded coding unit is inter prediction and has an affine motion vector, an affine sub-block vector may be added to an inter region motion information list. In this case, a position of a sub-block may be set as a top-left or top-right, central sub-block, or the like. Alternatively, a motion vector average value of each control point may be added to an inter region motion candidate list.

When a motion vector MV0 derived by encoding/decoding a specific coding unit is the same as any one of inter region motion candidates, a MV0 may not be added to an inter region motion information list. Alternatively, the existing inter region motion candidate having the same motion vector as a MV0 may be deleted and a MV0 may be newly included in an inter region motion information list to update an index assigned to a MV0.

Except for an inter region motion information list, HmvpLTList, an inter region motion information long-term list, may be configured. An inter region motion information long-term list size may be set as a value which is the same as or different from a size of an inter region motion information list.

An inter region motion information long-term list may be configured with an inter region merge candidate which is added first to a start position of a tile group. An inter region motion information list may be configured after an inter region motion information long-term list is configured with all available values or motion information in an inter region motion information list may be set as motion information of an inter region motion information long-term list.

In this case, an inter region motion information long-term list which was configured before may be set not to be updated, or set to be re-updated when decoded regions of a tile group are more than half of the whole tile group, or set to be updated per m CTU lines. An inter region motion information list may be set to be updated whenever it is decoded into an inter region or set to be updated in a unit of a CTU line.

Motion information and partition information or a shape of a coding unit may be stored in an inter region motion information list. An inter region merge method may be performed by using only an inter region motion candidate whose partition information and shape is similar to a current coding unit.

Alternatively, an inter region motion information list may be separately configured according to a block shape. In this case, one of a plurality of inter region motion information lists may be selected and used according to a shape of a current block.

Figure 15:
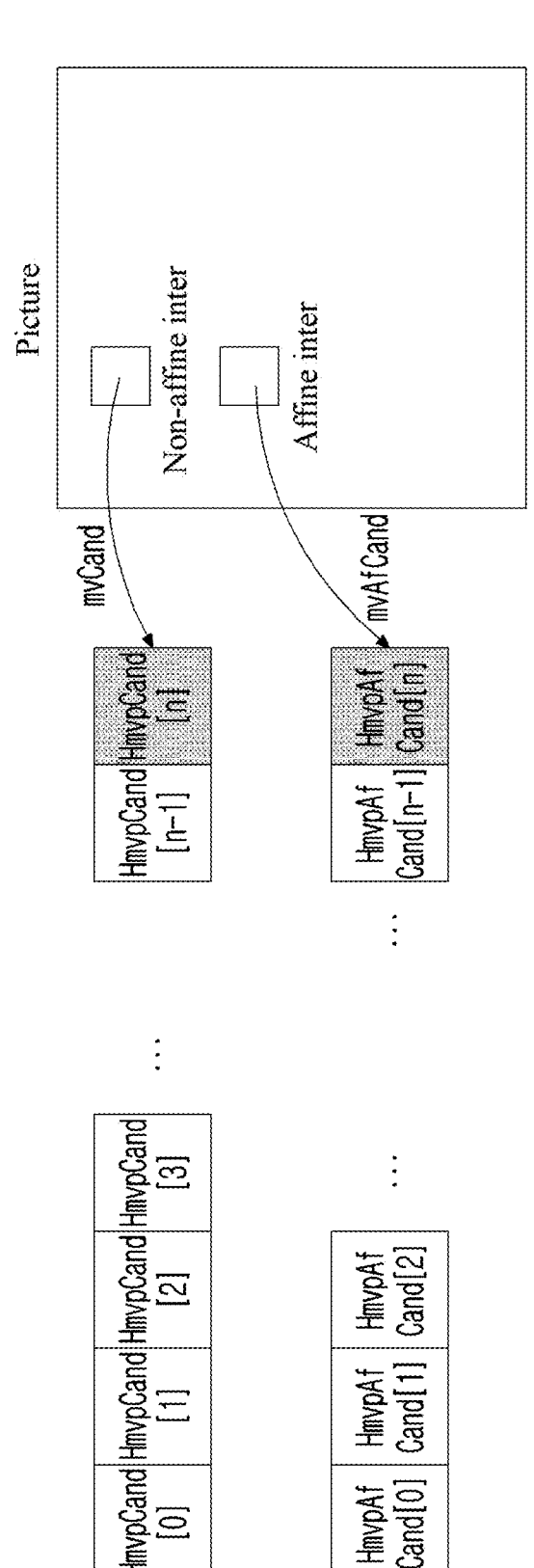

As in FIG. 15, it may be configured with an inter region affine motion information list and an inter region motion information list. When a decoded coding unit is an affine inter or affine merge mode, a first affine seed vector and a second affine seed vector may be stored in an inter region affine motion information list HmvpAfCandList. Motion information in an inter region affine motion information list is referred to as an inter region affine merge candidate.

A merge candidate which may be used in a current coding unit may be configured as follows and may have the same search order as a configuration order.

1. Spatial merge candidate (A1, B1, B0, A0)
2. Temporal merge candidate (a merge candidate derived from a previous reference picture)
3. Spatial merge candidate (B2)
4. Inter region merge candidate
5. Inter region affine merge candidate
6. Zero motion merge candidate First, a merge candidate list mergeCandList may be configured with a spatial merge candidate and a temporal merge candidate. The number of available spatial merge candidates and temporal merge candidates is referred to as the number of available merge candidates (NumMerge-Cand). When the number of available merge candidates is less than the maximum allowable number of merges, a motion candidate of an inter region motion information list may be added to a merge candidate list mergeCandList as an inter region merge candidate.

When an inter region motion information list HmvpCan-dList is added to a merge candidate list mergeCandList, whether motion information of an inter region motion candidate in an inter region motion information list is the same as motion information of the existing merge candidate list mergeCandList may be checked. An inter region merge candidate may not be added to a merge list mergeCandList when the motion information is the same, and it may be added to a merge list mergeCandList when the motion information is not the same.

In an example, when motion information which is most recently updated of HmvpCandList (HmvpCandList [n]) is added to a merge candidate list (mergeCandList), a redundance check may be performed only for any L candidates in mergeCandList. In this case, L is a positive integer greater than 0 and for example, when Lis 2, a redundance check may be performed only for first and second motion information of mergeCandList.

In an example, a redundance check between HmvpCan-dList and mergeCandList may be performed only for part of merge candidates of mergeCandList and part of motion candidates of HmvpCandList. In this case, part of merge-CandList may include a left block and a top block of spatial merge candidates. However, it is not limited thereto, and it may be limited to a block of any one of a spatial merge candidate or may additionally include at least one of a bottom-left block, a top-right block, a top-left block or a temporal merge candidate. On the other hand, part of Hmvp-CandList may mean K inter region motion candidates which are most recently added to HmvpCandList. In this case, K may be 1, 2, 3 or more and may be a fixed value which is pre-promised in an encoding/decoding device. It is assumed that 5 inter region motion candidates are stored in Hmvp-CandList and 1 to 5 indexes are assigned to each inter region motion candidate. As an index is greater, it means an inter region motion candidate which is recently stored. In this case, a redundance check between inter region motion candidates having index 5, 4 and 3 and merge candidates of the mergeCandList may be performed. Alternatively, a redundance check between inter region motion candidates having index 5 and 4 and merge candidates of the merge-CandList may be performed. Alternatively, excluding an inter region motion candidate of index 5 which is most recently added, a redundance check between merge candidates of the mergeCandList and inter region motion candidates having index 4 and 3 may be performed. As a result of a redundance check, when there is at least one same inter region motion candidate, a motion candidate of HmvpCan-dList may not be added to mergeCandList. On the other hand, when there is no same inter region motion candidate, a motion candidate of HmvpCandList may be added to the last position of an inter region motion information list. In this case, it may be added to mergeCandList in an order of a motion candidate which is recently stored in HmvpCan-dList (i.e., in an order from a large index to a small index). However, there may be a limit that a motion candidate which is most recently stored in HmvpCandList (a motion information with the largest index) is not added to mergeCan-dList.

Among inter region motion candidates, one with a large index may be first added to a merge candidate list merge-CandList, and the following process may be used.

Figure 16:
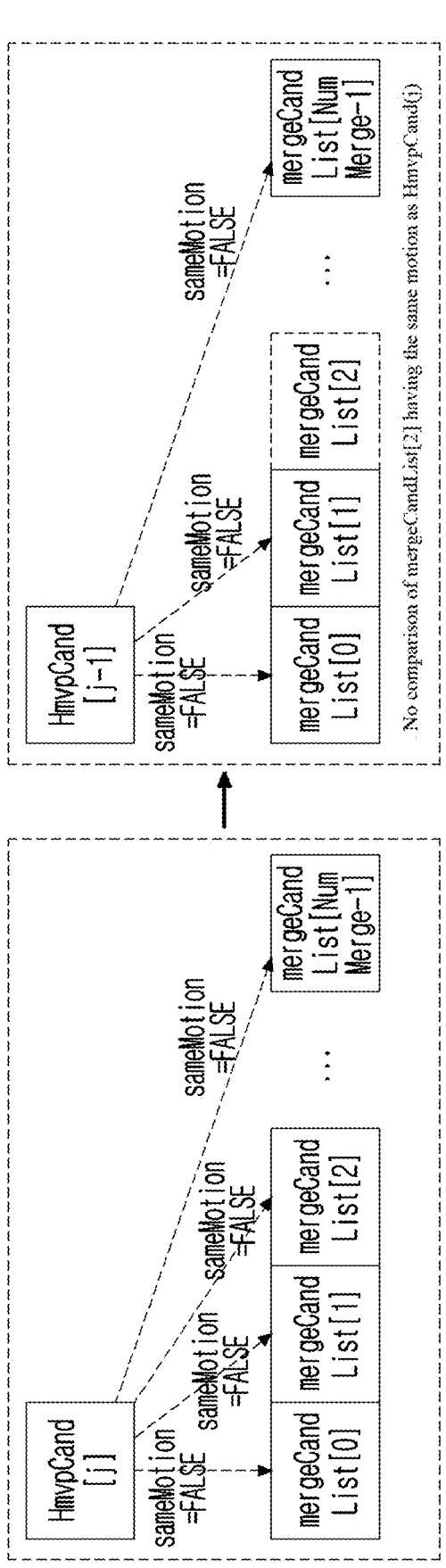
Figure 17:
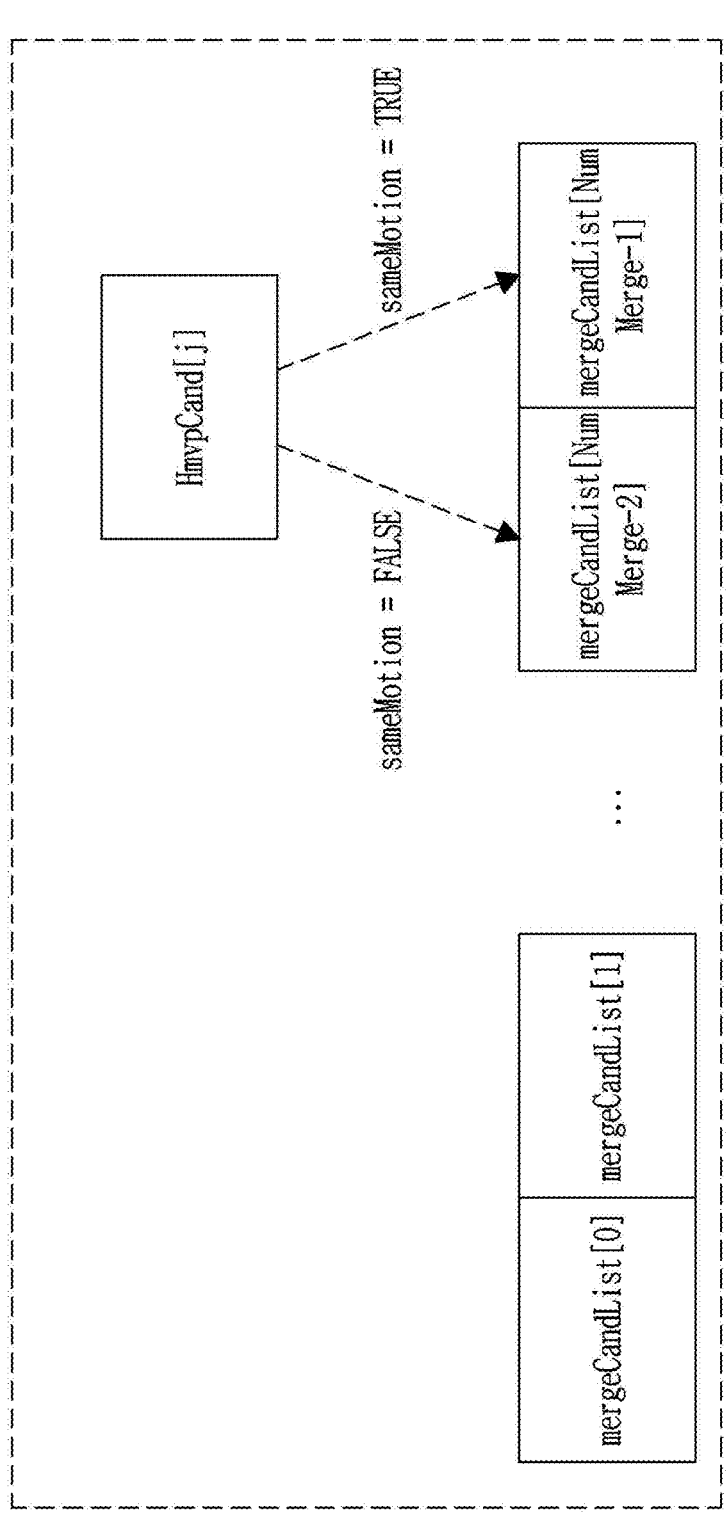

For each candidate in HMVPCandList with index HMVPIdx=1 . . . numCheckedHMVPCand, the following ordered steps are repeated until combStop is equal to true
  sameMotion is set to false
    If HMVPCandList[NumHmvp-HMVPIdx] have the same motion vectors and the same reference indices with any mergeCandList[i] with i being 0 . . . numOrigMerge-Cand−1 and HasBeenPruned[i] equal to false, sameMotion is set to true
    If sameMotion is equal to false, mergeCandList[num-CurrMergeCand++] is set to HMVPCandList[NumHmvp-HMVPIdx]
    If numCurrMergeCand is equal to (MaxNumMerge-Cand−1), hmvpStop is set to TRUE When an inter region motion candidate HmvpCandList[i] whose index is i is the same as motion information of a merge candidate list mergeCandList[j] whose index is j, mergeCandList[j] may be set not to be compared when comparing whether motion information of HmvpCandList [i−1] is the same as in FIG. 16.

Alternatively, only whether motion information of an inter region motion candidate in HmvpCandList is the same as that of a merge candidate in a merge candidate list may be compared. In an example, whether motion information of N merge candidates with the largest index in a merge candidate list is the same as that of an inter region motion candidate may be compared as in FIG. 17.

Figure 18:
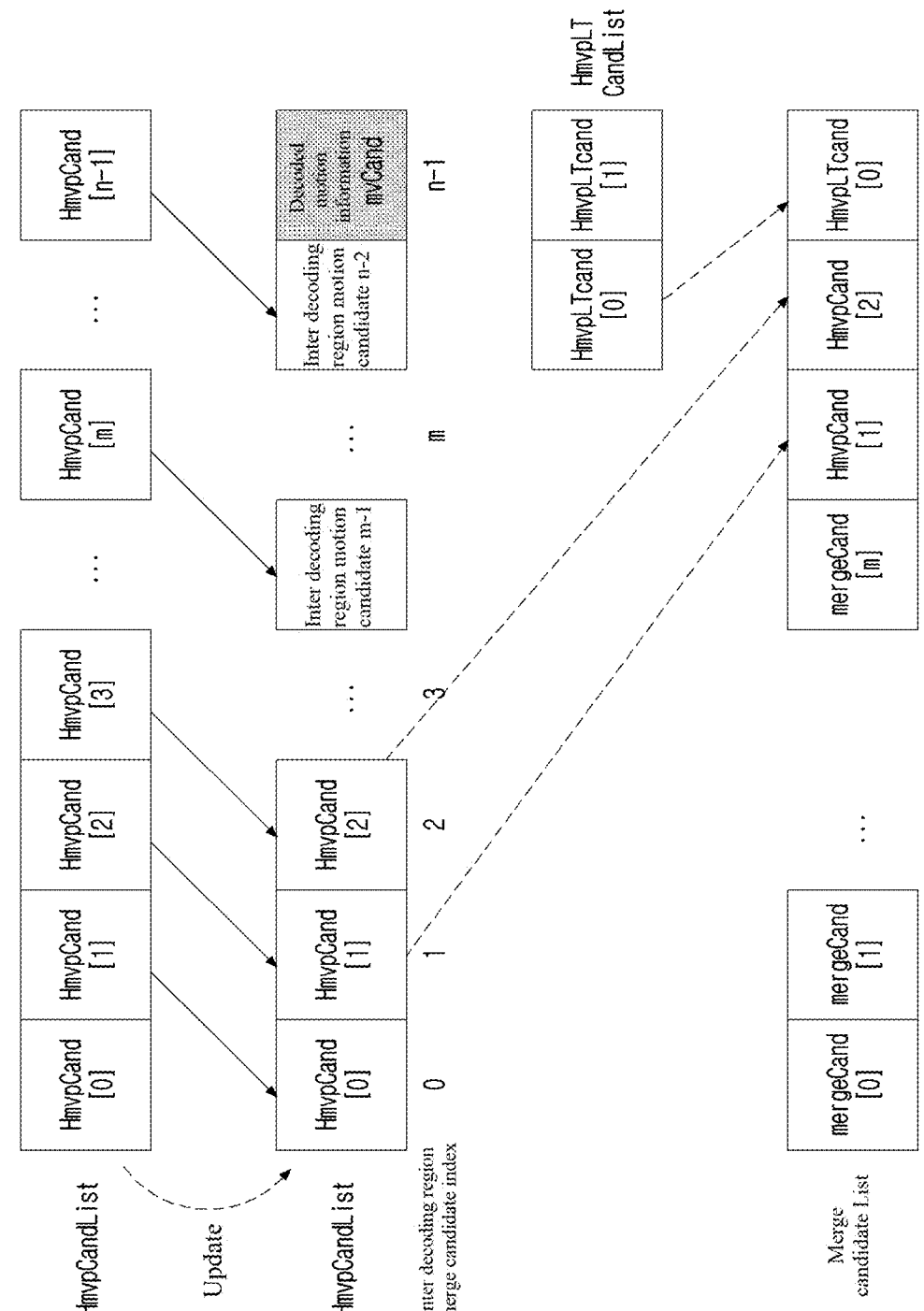

When it is less than the maximum number of merges allowed in a tile group (hereinafter, the maximum allowable number of merges) though an inter region motion information list is added to a merge candidate list, an inter region motion information long-term list may be used as in FIG. 18 and the following process may be used.

For each candidate in HMVPCandList with index HMVPLTIdx=1 . . . numHMVPLTcand, the following ordered steps are repeated until combStop is equal to true
  sameMotion is set to FALSE
    if hmvpStop is equal to FALSE and numCurrMergecand is less than (MaxNumMergeCand−1), hvmpLT is set to TRUE
    If HMVPLTCandList[NumLTHmvp−HMVPLTIdx] have the same motion vectors and the same reference indices with any mergeCandList[i] with i being 0 . . . num-OrigMergeCand−1 and HasBeenPruned[i] equal to false, sameMotion is set to true
    If sameMotion is equal to false, mergeCandList[num-CurrMergeCand++] is set to HMVPLTCandList[NumLTHmvp−HMVPLTIdx]
    If numCurrMergeCand is equal to (MaxNumMerge-Cand−1), hmvpLTStop is set to TRUE An inter region motion candidate may be used as a motion vector predictor (MVP) of a current coding unit and such a method is referred to as an inter region motion information prediction method.

An inter region affine motion candidate may be used as a motion vector predictor (MVP) of a current coding unit and such a method is referred to as an inter region motion information affine prediction method.

A motion vector predictor candidate which may be used in a current coding unit may be configured as follows and may have the same search order as a configuration order.

1. Spatial motion predictor candidate (the same as a merge candidate adjacent to a coding block and a merge candidate non-adjacent to a coding block)

2. Temporal motion predictor candidate (a motion predictor candidate derived from a previous reference picture)

3. Inter region motion predictor candidate

4. Inter region affine motion predictor candidate

5. Zero motion predictor candidate

FIGS. 19 and 20 show a MPMM based merge mode as an embodiment to which the present disclosure is applied.

It is highly likely that motion information of a current coding unit is similar to that of a neighboring coding unit. In addition, it is highly likely that merge mode information of a current coding unit is similar to that of a neighboring coding unit or it is more likely that motion information of a neighboring coding unit close to a current coding unit is used as a merge candidate of a current coding unit.

A Most Probable Merge Mode(MPMM) list configured with a merge candidate or motion information of a neighboring coding unit may be derived, and for a size of a MPMM list, M may be set differently per tile set or per sequence or may be set as a predefined value.

Among merge candidates in a merge candidate list Merge-CandList, merge candidates which do not belong to a MPMM list are referred to as a Remaining Merge Mode (RMM) list.

A flag mpmm_flag representing whether a merge candidate of a current coding unit belongs to merge candidates in a MPM list may be signaled.

When a merge candidate of a current coding unit is at least any one of a MPMM list (i.e., when a value of mpmm_flag is 1), a MPMM index (an index which is pre-defined in a MPMM list, mpmm_index) may be signaled. When a merge candidate of a current coding unit does not belong to a MPMM, an index in a RMM list (rmm_index) may be signaled and a syntax table as in Table 1 may be used.

TABLE 1

| | Descriptor |
|---|---|
| coding_unit ( x0, y0, cbWidth, cbHeight, treeType ) { | |
| .... | |
| } else { /* MODE_INTER */ | |
| if ( cu_skip_flag [ x0 ] [ y0 ] ) { | |
| if ( MaxNumSubblockMergeCand > 0 & & cbWidth >= 8 && cbHeight >= 8 ) | |
| merge_subblock_flag[ x0 ] [ y0 ] | ae (v) |
| if ( merge_subblock_flag[ x0 ] [ y0 ] = = 0 && MaxNumMergeCand > 1 ) | |
| mpmm_flag[ x0 ] [ y0 ] | ae (v) |
| if (mpmm_flag[x0] [y0] ==1) { | |
| mpmm_index[x0] [y0] | ae (v) |
| } else { | |
| rmm_index[x0] [y0] | ae (v) |
| } | |
| if ( merge_subblock_flag[ x0 ][ y0 ] = = 1 && MaxNumSubblockMergeCand > 1 ) | |
| merge_subblock_idx[ x0 ] [ y0 ] | ae (v) |

TABLE 1-continued

| | Descriptor |
|---|---|
| } else { | |
| merge_flag[ x0 ] [ y0 ] | ae (v) |
| if ( merge_flag[ x0 ] [ y0 ] ) { | |
| if ( MaxNumSubblockMergeCand > 0 && cbWidth >= 8 && cbHeight >= 8 ) | |
| merge_subblock_flag[ x0 ] [ y0 ] | ae (v) |
| if ( merge_subblock_flag[ x0 ][ y0 ] = = 0 && MaxNumMergeCand > 1 ) | |
| mpmm_flag [ x0 ] [ y0 ] | ae (v) |
| if (mpmm_flag[x0] [y0] == 1) { | |
| mpmm_index[x0] [y0] | ae (v) |
| } else { | |
| rmm_index[x0] [y0] | ae (v) |
| } | |
| if ( merge_subblock_flag[ x0 ] [ y0 ] = = 1 && MaxNumSubblockMergeCand > 1 ) | |
| merge_subblock_idx[ x0 ] [ y0 ] | ae (v) |
| ... | |
| } | |

For example, as in FIG. 19, a MPMM list may be configured with HmvpCandList[LastIdx] to HmvPCandList [LastIdx-M+1] having an encoding/decoding order close to a current coding unit among inter coding units which are decoded in a previous coding unit. A RMM may be derived from the existing mergeCandList, but may be removed from a RMM list if there is the same motion information in a MPMM list. A merge candidate in mergeCandList derived from HmvpCandList[LastIdx] to HmvPCandList[LastIdx-M+1] may not be added to a RMM list.

In another example, mergeCandList derived from a previous coding unit in the same shape as a current coding unit may be set as a MPMM. For example, when a current coding unit has a square shape as in FIG. 20, a merge candidate derived from a square coding unit may be added to a MPMM list.

In another example, a merge candidate derived from a neighboring coding unit using a merge mode/a skip mode may be added to a MPMMM list and a merge candidate derived from a coding unit by using an AMVP mode may be added to a RMM list.

FIGS. 21 to 30 show an intra prediction method as an embodiment to which the present disclosure is applied.

Figure 21:
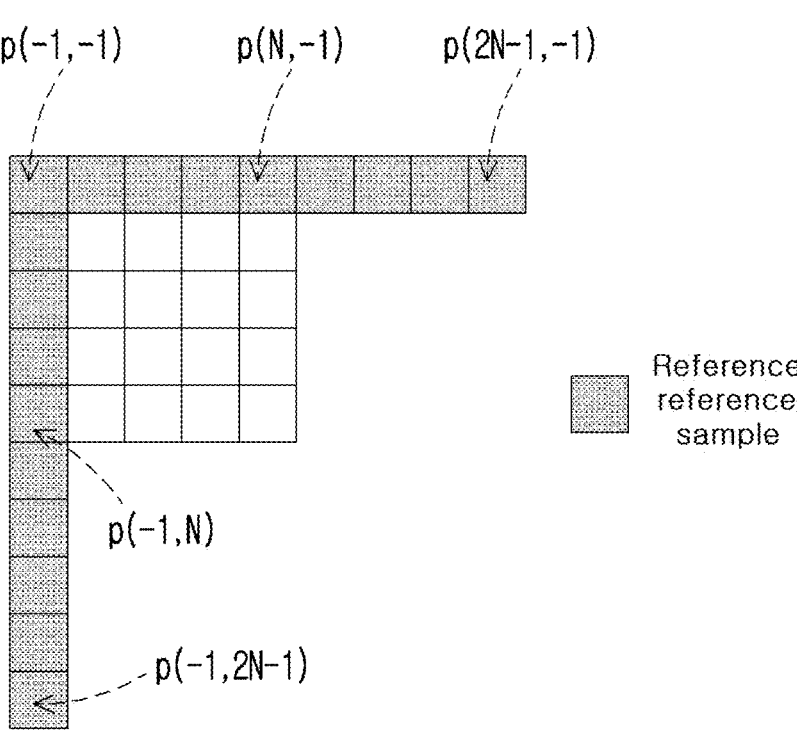

For intra prediction, as in FIG. 21, a pre-encoded boundary sample around a current block is used to generate intra prediction, which is referred to as an intra reference sample.

Intra prediction may be performed by setting an average value of an intra reference sample as values of all samples of a prediction block (a DC mode), by generating a prediction sample by performing weighted prediction of a prediction sample in a horizontal direction and a prediction sample in a vertical direction after generating a prediction sample in a horizontal direction generated by performing weighted prediction of reference samples in a horizontal direction and a prediction sample in a vertical direction generated by performing weighted prediction of reference samples in a vertical direction (a Planar mode), by using a directional intra prediction mode, or the like.

Figure 22:
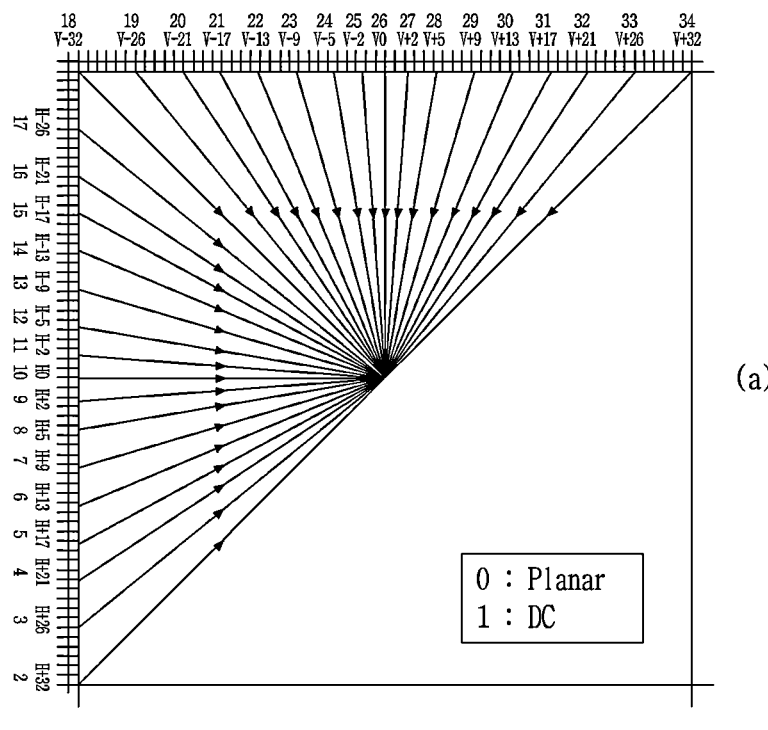
Figure 22:
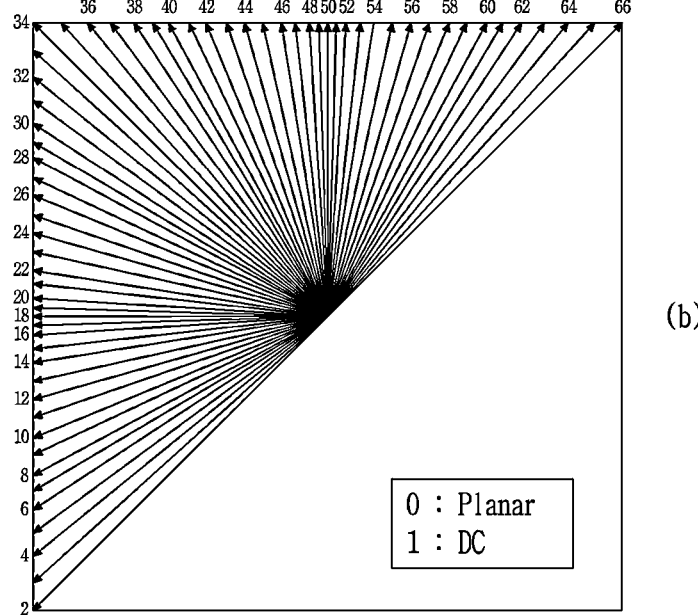

Intra prediction may be performed by using 33 directions (a total of 35 intra prediction modes) as in the left picture of FIG. 22 or by using 65 directions (a total of 67 intra prediction modes) as in the right picture. When directional intra prediction is used, an intra reference sample (a reference sample) may be generated by considering directivity of an intra prediction mode and hereupon, intra prediction may be performed.

An intra reference sample at a left position of a coding unit is referred to as a left intra reference sample and an intra reference sample at a top position of a coding unit is referred to as a top intra reference sample.

When directional intra prediction is performed, an intra directional parameter (intraPredAng), a parameter representing a prediction direction (or a prediction angle), may be set according to an intra prediction mode as in Table 2. The following Table 2 is just an example which is based on a directional intra prediction mode having a value of 2 to 34 when 35 intra prediction modes are used. It is natural that as a prediction direction (or a prediction angle) of a directional intra prediction mode is more subdivided, 33 or more directional intra prediction modes may be used.

TABLE 2

| PredModeIntra | 1 | 2 | 3 | 4 | 5 | 6 | 7 |
|---|---|---|---|---|---|---|---|
| IntraPredAng | — | 32 | 26 | 21 | 17 | 13 | 9 |
| PredModeIntra | 8 | 9 | 10 | 11 | 12 | 13 | 14 |
| IntraPredAng | 5 | 2 | 0 | −2 | −5 | −9 | −13 |
| PredModeIntra | 15 | 16 | 17 | 18 | 19 | 20 | 21 |
| IntraPredAng | −17 | −21 | −26 | −32 | −26 | −21 | −17 |
| PredModeIntra | 22 | 23 | 24 | 25 | 26 | 27 | 28 |
| IntraPredAng | −13 | −9 | −5 | −2 | 0 | 2 | 5 |
| PredModeIntra | 29 | 30 | 31 | 32 | 33 | 34 | |
| IntraPredAng | 9 | 13 | 17 | 21 | 26 | 32 | |

Figure 23:
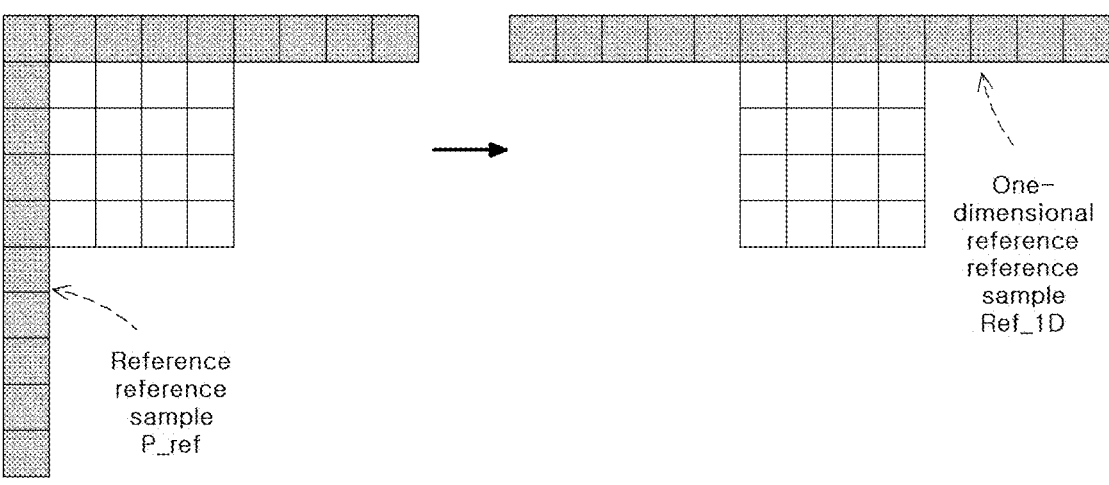

When intraPredAng is a negative number (e.g., an intra prediction mode index is between 11 and 25), a left intra reference sample and a top intra reference sample of a current block may be reconfigured as an one-dimensional reference sample (Ref_1D) configured with 1D according to an angle of an intra prediction mode as in FIG. 23.

Figure 24:
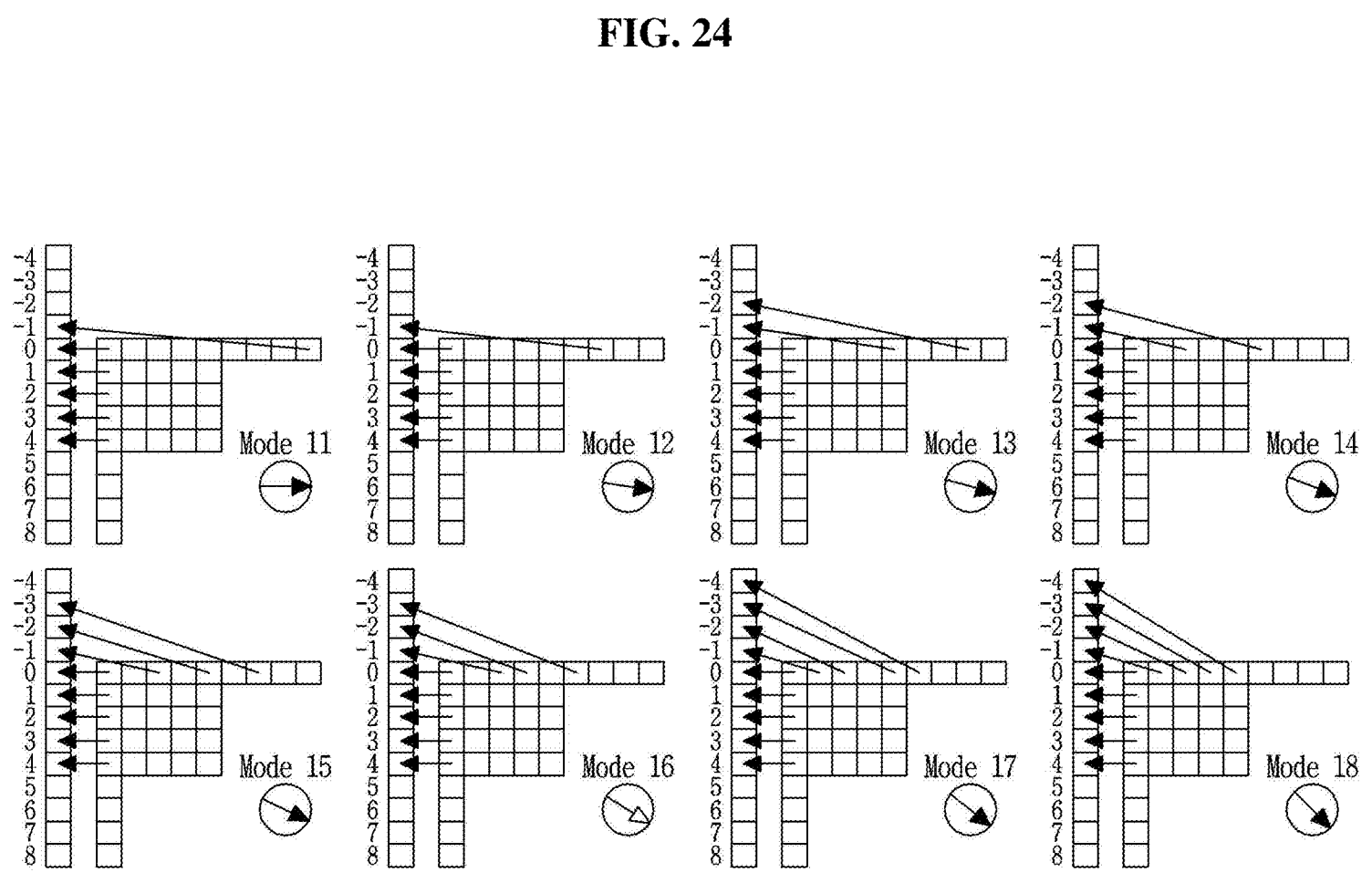

When an intra prediction mode index is between 11 and 18, an one-dimensional reference sample may be generated in a counterclockwise direction from an intra reference sample positioned at the right of a top side of a current block to an intra reference sample positioned at the bottom of a left side of a current block as in FIG. 24.

In other modes, an one-dimensional reference sample may be generated by using only an intra reference sample on a top side or an intra reference sample on a left side.

Figure 25:
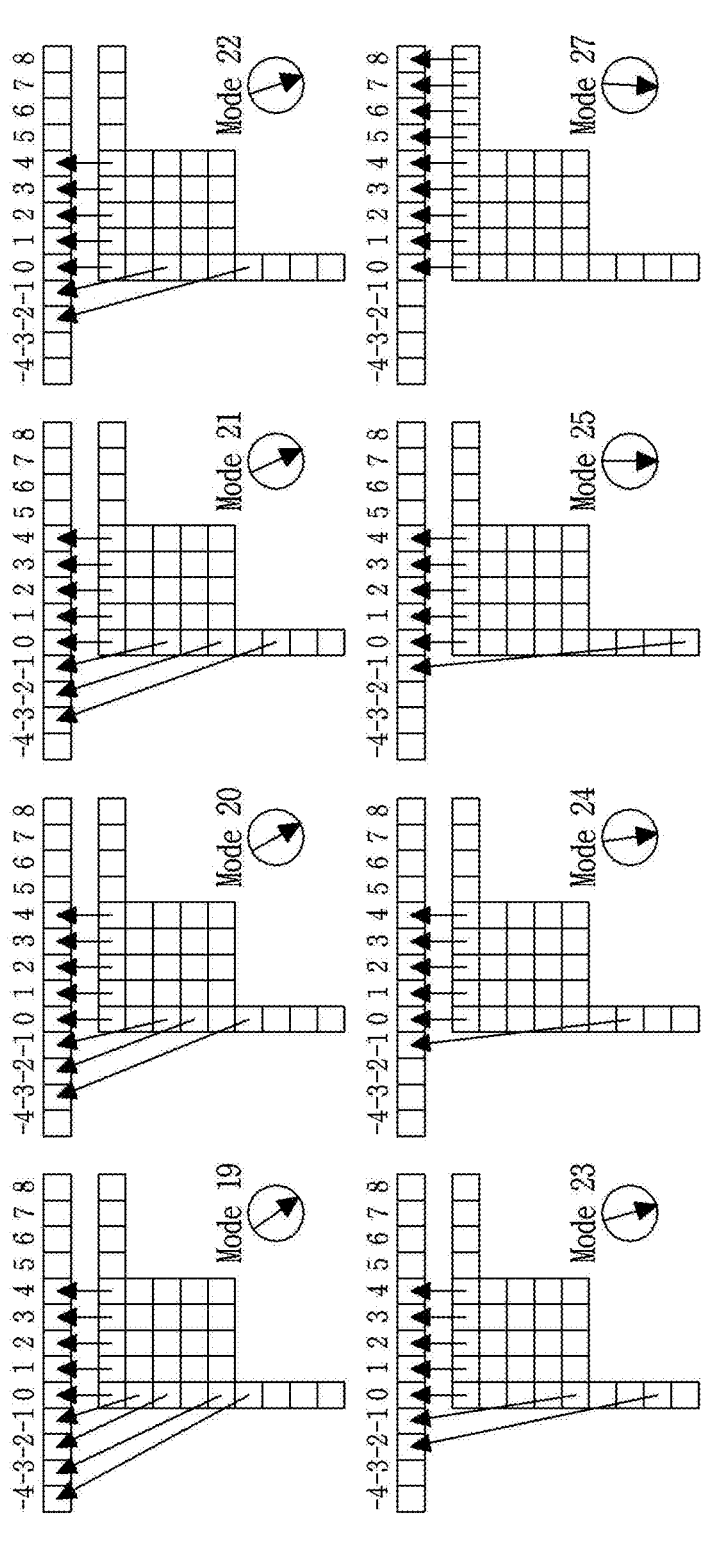

When an intra prediction mode index is between 19 and 25, an one-dimensional reference sample may be generated in a clockwise direction from an intra reference sample positioned at the bottom of a left side of a current block to an intra reference sample positioned at the right of a top side as in FIG. 25.

A reference sample determination index $i_{Idx}$ and a weight-related parameter $i_{fact}$ applied to at least one reference sample determined based on an $i_{Idx}$ may be derived as in the following Equation 5. an $i_{Idx}$ and $i_{fact}$ may be variably determined according to a slope of a directional intra prediction mode and a reference sample specified by an $i_{Idx}$ may correspond to an integer pel.

$$i_{Idx} = (y + 1) * P_{ang}/32 \qquad \text{[Equation 5]}$$

$$i_{fact} = [(y + 1) * P_{ang}] \& 31$$

A prediction image may be derived by specifying at least one or more one-dimensional reference samples per prediction sample. For example, a position of an one-dimensional reference sample which may be used to generate a prediction sample may be specified by considering a slope value of a directional intra prediction mode. Each prediction sample may have a different directional intra prediction mode. A plurality of intra prediction modes may be used for one prediction block. A plurality of intra prediction modes may be represented by a combination of a plurality of nondirectional intra prediction modes, may be represented by a combination of one nondirectional intra prediction mode and at least one directional intra prediction mode or may be represented by a combination of a plurality of directional intra prediction modes. A different intra prediction mode may be applied per predetermined sample group in one prediction block. A predetermined sample group may be configured with at least one sample. The number of samples groups may be variably determined according to a size/the number of samples of a current prediction block or may be the fixed number which is preset in an encoder/a decoder independently from a size/the number of samples of a prediction block.

Concretely, for example, a position of an one-dimensional reference sample may be specified by using a reference sample determination index $i_{Idx}$.

When a slope of an intra prediction mode may not be represented only by one one-dimensional reference sample according to a slope of an intra prediction mode, a first prediction image may be generated by interpolating an adjacent one-dimensional reference sample as in Equation 6. When an angular line according to a slope/an angle of an intra prediction mode does not pass a reference sample positioned at an integer pel, a first prediction image may be generated by interpolating a reference sample adjacent to the left/right or the top/bottom of a corresponding angular line. A filter coefficient of an interpolation filter used in this case may be determined based on $i_{fact}$. For example, a filter coefficient of an interpolation filter may be derived based on a distance between a fractional-pel positioned on an angular line and a reference sample positioned at the integer-pel.

$$P(x, y) = ((32 - i_{fact})/32) * \text{Ref\_1D}(x + i_{Idx} + 1) + \qquad \text{[Equation 6]}$$

$$(i_{fact}/32) * \text{Ref\_1D}(x + i_{Idx} + 2)$$

When a slope of an intra prediction mode may be represented by only one one-dimensional reference sample (when a value of $i_{fact}$ is 0), a first prediction image may be generated as in the following Equation 7.

$$P(x, y) = \text{Ref\_1D}(x + i_{Idx} + 1) \qquad \text{[Equation 7]}$$

Figure 26:
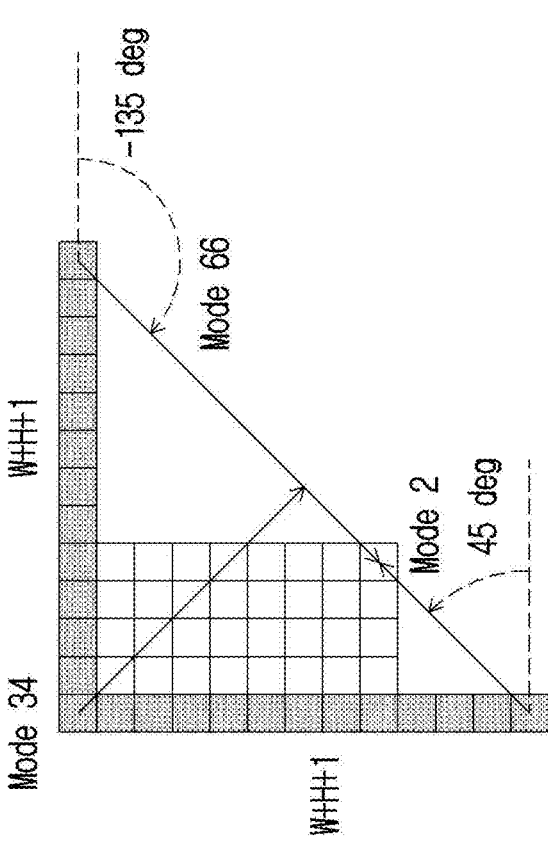
Figure 26:
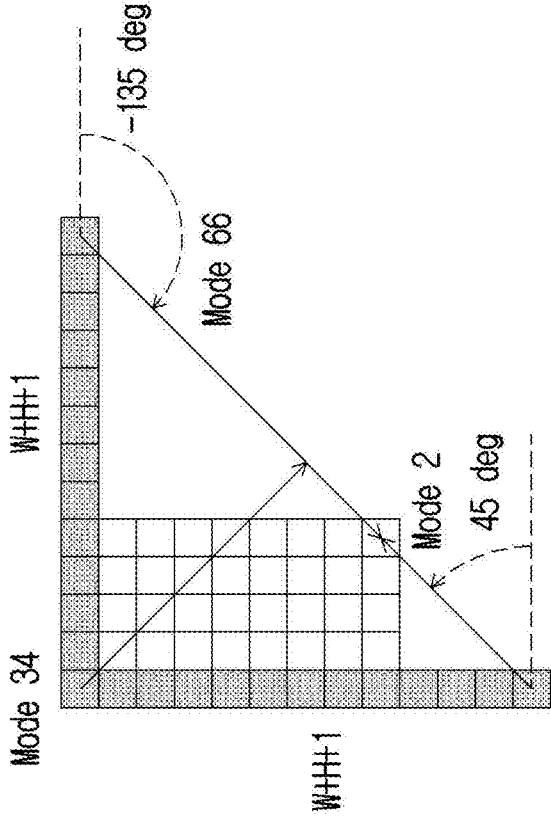

A prediction angle of a directional intra prediction mode may be set between 45 degrees and −135 degrees as in FIG. 26.

When an intra prediction mode is performed in a non-square coding unit, a disadvantage that a current sample is predicted in an intra reference sample distant from a current sample instead of an intra reference sample close to a current sample may be generated due to a predefined prediction angle.

For example, as in the left picture of FIG. 27, for a coding unit that a width of a coding unit is greater than a height of a coding unit (hereinafter, a coding unit in a horizontal direction), intra prediction may be performed in a distant sample L instead of a close sample T. In another example, as in the right picture, for a coding unit that a height of a coding unit is greater than a width of a coding unit (hereinafter, a coding unit in a vertical direction), intra prediction may be performed in a distant sample T instead of a close sample L.

In a non-square coding unit, intra prediction may be performed at a prediction angle wider than a pre-defined prediction angle, which is referred to as a wide-angle intra prediction mode.

A wide-angle intra prediction mode may have a prediction angle of 45-α to −135-β and a prediction angle out of an angle used in the existing intra prediction mode is referred to as a wide-angle angle.

Figure 27:
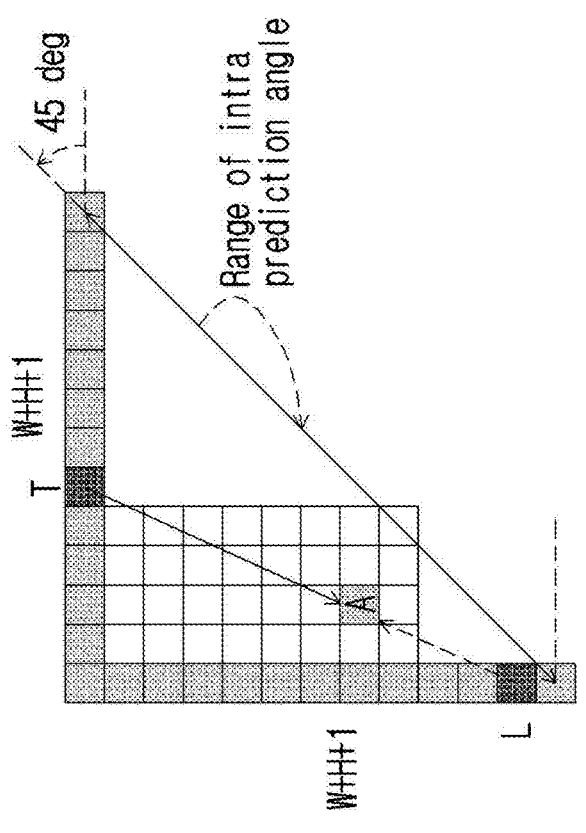
Figure 27:
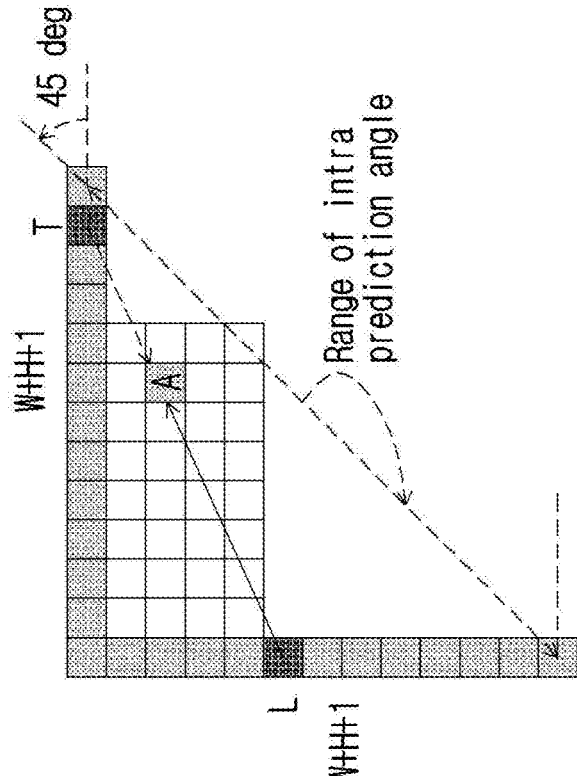

In the left picture of FIG. 27, sample A in a coding unit in a horizontal direction may perform prediction from intra reference sample T by using a wide-angle intra prediction mode. In the right picture of FIG. 27, sample A in a coding unit in a vertical direction may perform prediction from intra reference sample L by using a wide-angle intra prediction mode.

N+M intra prediction modes may be defined by adding M wide-angle angles to N existing intra prediction modes. Concretely, for example, a total of 95 intra prediction modes may be defined by adding 67 intra modes and 28 wide-angle angles as in Table 3. An intra prediction mode which may be used by a current block may be determined according to a shape of a current block. In an example, 65 directional intra prediction modes of 95 directional intra prediction modes may be selected based on at least one of a size of a current block, an aspect ratio (e.g., a ratio of a width and a height) or a reference line index.

be encoded as intra prediction mode 2, a wide-angle replaced mode, and wide-angle intra prediction mode 36 may be encoded as intra prediction mode 3, a wide-angle replaced mode.

Replaced modes and the number of the replaced modes may be differently set according to a shape of a coding block or a ratio of a height and a width of a coding block. Concretely, for example, replaced modes and the number of the replaced modes may be differently set according to a shape of a coding block as in Table 4. Table 4 represents intra prediction replaced modes used according to a ratio of a width and a height of a coding block.

TABLE 4

| Aspect ratio | Replaced intra prediction modes |
|---|---|
| W/H == 16 | Modes 12, 13, 14, 15 |
| W/H == 8 | Modes 12, 13 |
| W/H == 4 | Modes 2, 3, 4, 5, 6, 7, 8, 9, 10, 11 |
| W/H == 2 | Modes 2, 3, 4, 5, 6, 7, |
| W/H == 1 | None |
| W/H == ½ | Modes 61, 62, 63, 64, 65, 66 |
| W/H == ¼ | Mode 57, 58, 59, 60, 61, 62, 63, 64, 65, 66 |
| W/H == ⅛ | Modes 55, 56 |
| W/H == 1/16 | Modes 53, 54, 55, 56 |

Figure 30:
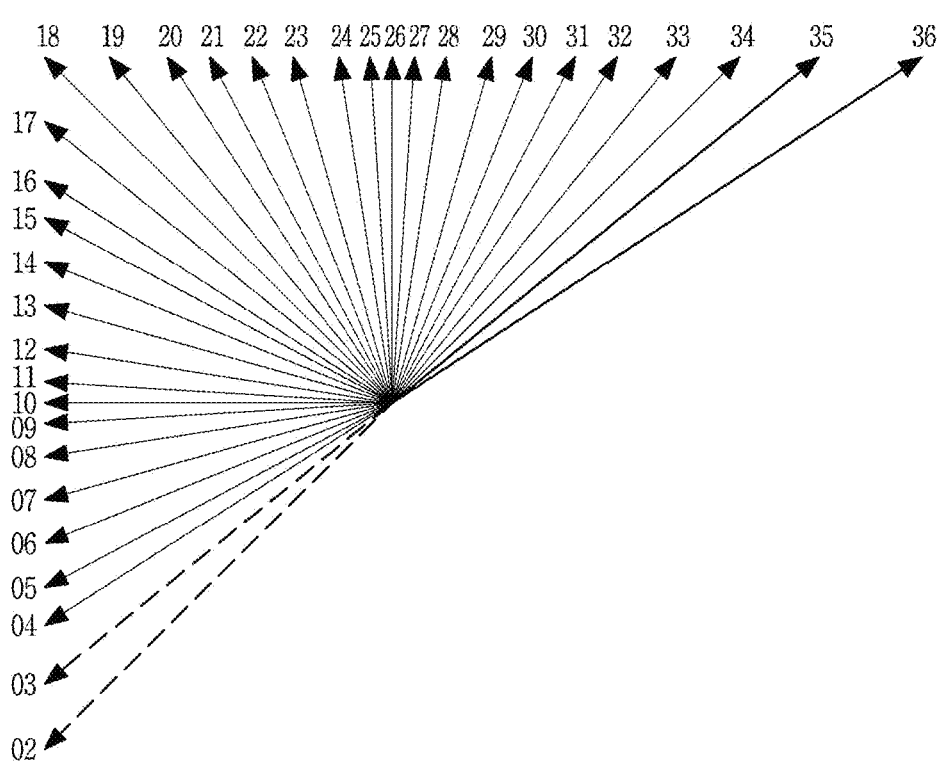

In reference to FIG. 30, intra prediction may be performed by using at least one of a plurality of intra reference lines.

TABLE 3

| predModeIntra | −14 | −13 | −12 | −11 | −10 | −9 | −8 | −7 | −6 | −5 | −4 | −3 | −2 | −1 | 2 | 3 | 4 |
|---|---|---|---|---|---|---|---|---|---|---|---|---|---|---|---|---|---|
| intraPredAngle | 512 | 341 | 256 | 171 | 128 | 102 | 86 | 73 | 64 | 57 | 51 | 45 | 39 | 35 | 32 | 29 | 26 |
| predModeIntra | 5 | 6 | 7 | 8 | 9 | 10 | 11 | 12 | 13 | 14 | 15 | 16 | 17 | 18 | 19 | 20 | 21 |
| intraPredAngle | 23 | 20 | 18 | 16 | 14 | 12 | 10 | 8 | 6 | 4 | 3 | 2 | 1 | 0 | −1 | −2 | −3 |
| predModeIntra | 22 | 23 | 24 | 25 | 26 | 27 | 28 | 29 | 30 | 31 | 32 | 33 | 34 | 35 | 36 | 37 | 38 |
| intraPredAngle | −4 | −6 | −8 | −10 | −12 | −14 | −16 | −18 | −20 | −23 | −26 | −29 | −32 | −29 | −26 | −23 | −20 |
| predModeIntra | 39 | 40 | 41 | 42 | 43 | 44 | 45 | 46 | 47 | 48 | 49 | 50 | 51 | 52 | 53 | 54 | 55 |
| intraPredAngle | −18 | −16 | −14 | −12 | −10 | −8 | −6 | −4 | −3 | −2 | −1 | 0 | 1 | 2 | 3 | 4 | 6 |
| predModeIntra | 56 | 57 | 58 | 59 | 60 | 61 | 62 | 63 | 64 | 65 | 66 | 67 | 68 | 69 | 70 | 71 | 72 |
| intraPredAngle | 8 | 10 | 12 | 14 | 16 | 18 | 20 | 23 | 26 | 29 | 32 | 35 | 39 | 45 | 51 | 57 | 64 |
| predModeIntra | 73 | 74 | 75 | 76 | 77 | 78 | 79 | 80 | | | | | | | | | |
| intraPredAngle | 73 | 86 | 102 | 128 | 171 | 256 | 341 | 512 | | | | | | | | | |

An intra prediction mode angle shown in Table 3 may be adaptively determined based on at least one of a shape of a current block or a reference line index. In an example, intraPredAngle of Mode 15 may be set to have a greater value when a current block is square than when a current block is non-square. Alternatively, intraPredAngle of Mode 75 may be set to have a greater value when a non-adjacent reference line is selected than when an adjacent reference line is selected.

Figure 28:
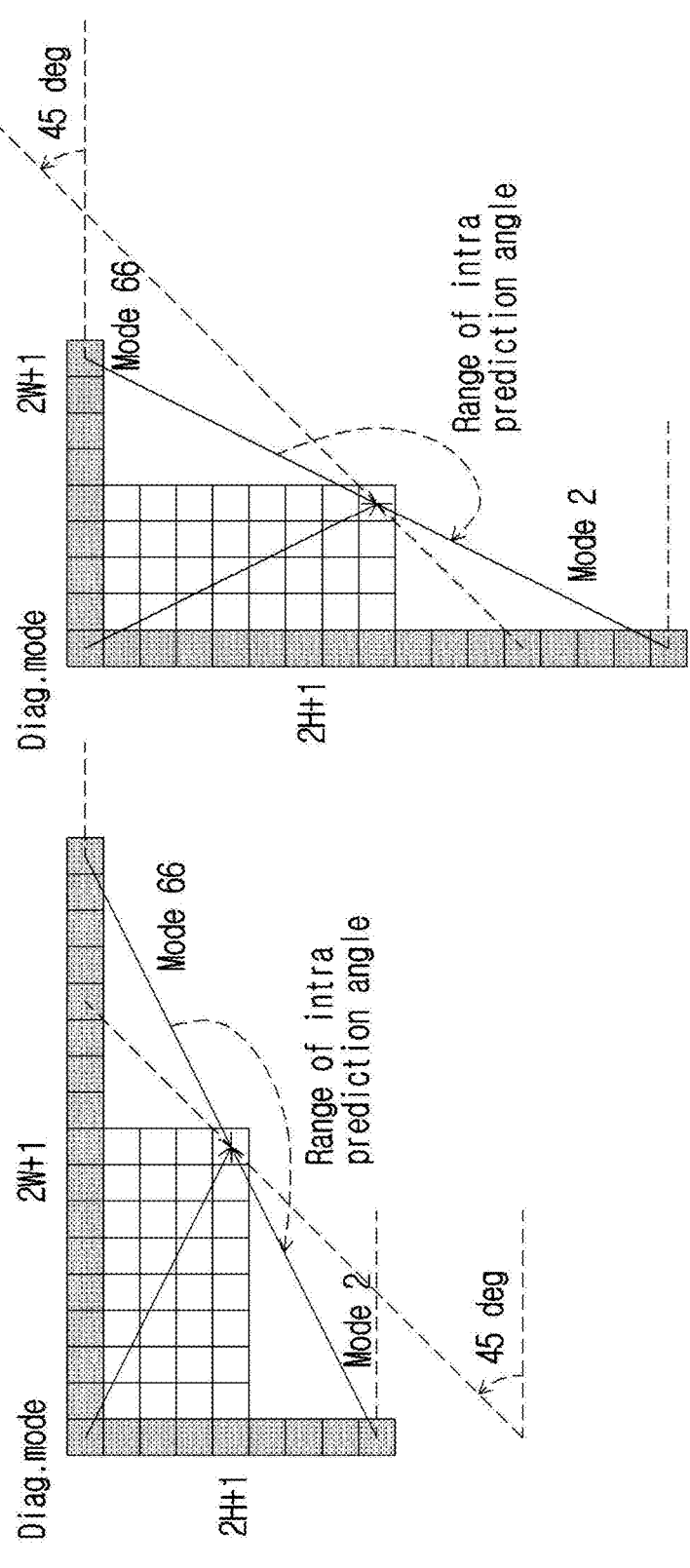

When a wide-angle intra prediction mode is used, a length of a top intra reference sample may be set as 2W+1 and a length of a left intra reference sample may be set as 2H+1 as in FIG. 28.

When an intra prediction mode of a wide-angle intra prediction mode is encoded in using wide-angle intra prediction, the number of intra prediction modes increases, so encoding efficiency may be reduced. A wide-angle intra prediction mode may be encoded by being replaced with the existing intra prediction mode which is not used in wide-angle intra and a replaced prediction mode is referred to as a wide-angle replaced mode. A wide-angle replaced mode may be an intra prediction mode in a direction opposite to a wide-angle intra prediction mode.

Figure 29:
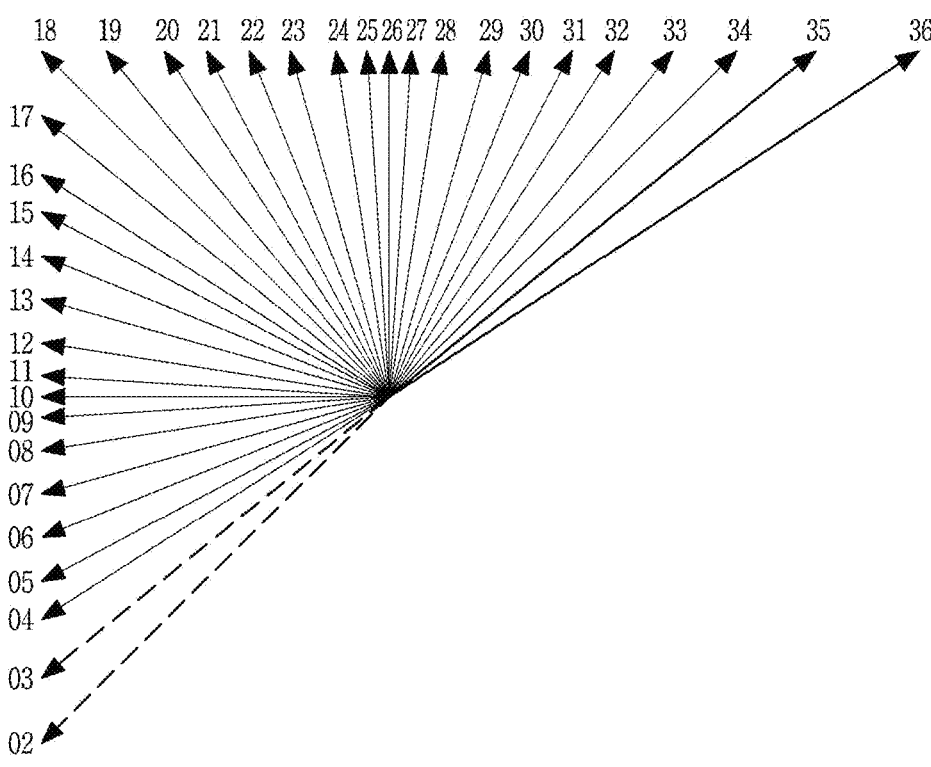

Concretely, for example, when 35 intra prediction are used as in FIG. 29, wide-angle intra prediction mode 35 may In an example, intra prediction may be performed by selecting any one of a plurality of intra reference lines configured with an adjacent intra reference line and a non-adjacent intra reference line, which is referred to as a multi-line intra prediction method. A non-adjacent intra reference line may include at least one of a first non-adjacent intra reference line (non-adjacent reference line index 1), a second non-adjacent intra reference line (non-adjacent reference line index 2) or a third non-adjacent intra reference line (non-adjacent reference line index 3). Only part of non-adjacent intra reference lines may be used. In an example, only a first non-adjacent intra reference line and a second non-adjacent intra reference line may be used or only a first non-adjacent intra reference line and a third non-adjacent intra reference line may be used.

An intra reference line index (intra_luma_ref_idx), a syntax specifying a reference line used for intra prediction, may be signaled in a unit of a coding unit.

Concretely, when an adjacent intra reference line, a first non-adjacent intra reference line and a third non-adjacent intra reference line are used, intra_luma_ref_idx may be defined as in the following Table 5.

US 12,593,035 B2

27

28

TABLE 5

| intra_luma_ref_idx[ x0 ] [ y0 ] | Reference Line used for Intra Prediction |
|---|---|
| 0 | Adjacent Intra Reference Line |
| 1 | First Non-adjacent Reference Line |
| 2 | Third Non-adjacent Reference Line |

Alternatively, according to a size or a shape of a current block or an intra prediction mode, a position of a non-adjacent reference line may be specified. For example, a line index of 0 may represent an adjacent intra reference line and a line index of 1 may represent a first non-adjacent intra reference line. On the other hand, according to a size or a shape of a current block or an intra prediction mode, a line index of 2 may represent a second non-adjacent intra reference line or a third non-adjacent intra reference line.

According to an intra mode, an available non-adjacent reference line may be determined. For example, when intra prediction in a diagonal mode is used, only an adjacent reference line, a first non-adjacent reference line and a third non-adjacent reference line may be used, and an adjacent reference line, a first non-adjacent reference line and a second non-adjacent reference line may be set to be used in a vertical or horizontal intra prediction mode.

When a non-adjacent intra reference line is used, a nondirectional intra prediction mode may be set not to be used. In other words, when a non-adjacent intra reference line is used, there may be a limit that a DC mode or a planar mode is not used.

In another example, when a non-adjacent intra reference line is used, there may be a limit that at least one of a nondirectional intra prediction mode or a specific directional intra prediction mode is not used. A nondirectional intra prediction mode may include at least one of a DC mode or a planar mode, and a specific directional intra prediction mode may include at least one of a horizontal directional mode (INTRA_MODE18), a vertical directional mode (INTRA_MODE50), a diagonal directional mode (INTRA_MODE2, 66) or a wide-angle mode.

The number of samples belonging to a non-adjacent intra reference line may be set to be greater than the number of samples of an adjacent intra reference line. In addition, the number of samples of the (i+1)-th non-adjacent intra reference line may be set to be greater than the number of samples of the i-th non-adjacent intra reference line. A difference between the number of top samples of the i-th non-adjacent intra reference line and the number of top samples of the (i−1)-th non-adjacent intra reference line may be represented as an offset offsetX[i] for the number of reference samples. offsetX[1] represents a difference value between the number of top samples of a first non-adjacent intra reference line and the number of top samples of an adjacent intra reference line. A difference between the number of left samples of the i-th non-adjacent intra reference line and the number of left samples of the (i-1)-th non-adjacent intra reference line may be represented as an offset offsetY[i] for the number of reference samples. offsetY[1] represents a difference value between the number of left samples of a first non-adjacent intra reference line and the number of left samples of an adjacent intra reference line.

A non-adjacent intra reference line that an intra reference line index is i may be configured with a top non-adjacent reference line refW+offsetX[i], a left non-adjacent reference line refH+offsetY[i] and a top-left sample, and the number of samples belonging to a non-adjacent intra reference line may be configured with refW+refH+offsetX[i]+offsetY[i]+1.

$$refW = (nTbW * 2)$$ [Equation 8]
$$refH = (nTbH * 2)$$

In Equation 8, nTbW may represent a width of a coding unit, nTbH may represent a height of a coding unit, and whRatio may be defined as in the following Equation 9.

$$whRatio = \log2(nTbW/nTbH)$$ [Equation 9]

In a multi-line intra prediction encoding method, a wide-angle intra mode may be set not to be used when a non-adjacent intra reference line is used. Alternatively, when a MPM mode of a current coding unit is a wide-angle intra mode, a multi-line intra prediction encoding method may be set not to be used. In this case, a non-adjacent intra reference line that an intra reference line index is i may be configured with a top non-adjacent reference line W+H+offsetX[i], a left non-adjacent reference line H+W+offsetY[i] and a top-left sample, the number of samples belonging to a non-adjacent intra reference line may be configured with 2W+2H+offsetX[i]+offsetY[i]+1, and values of offsetX[i] and offsetY[i] may vary according to a value of whRatio. For example, when a value of whRatio is greater than 1, a value of offsetX[i] may be set to be 1 and a value of offsetY[i] may be set to be 0, and when a value of whRatio is less than 1, a value of offsetX[i] may be set to be 0 and a value of offsetY[i] may be set to be 1.

FIG. 31 shows an inter-component reference-based prediction method as an embodiment to which the present disclosure is applied.

A current block may be classified into a luma block and a chroma block according to a component type. A chroma block may be predicted by using a pixel of a pre-reconstructed luma block, which is referred to as inter-component reference. In this embodiment, it is assumed that a chroma block has a size of (nTbW×nTbH) and a luma block corresponding to a chroma block has a size of (2*nTbW× 2*nTbH).

In reference to FIG. 31, an intra prediction mode of a chroma block may be determined S3100.

A predefined intra prediction mode for a chroma block may be classified into a first group and a second group. In this case, a first group may be configured with inter-component reference-based prediction modes and a second group may be configured with all or part of intra prediction modes shown in FIG. 22.

An encoding/decoding device, as an inter-component reference-based prediction mode, may define at least one of INTRA_LT_CCLM, INTRA_L_CCLM or INTRA_T_C-CLM. INTRA_LT_CCLM may be a mode which refers to both a left and top region adjacent to a luma/chroma block, INTRA_L_CCLM may be a mode which refers to a left region adjacent to a luma/chroma block, and INTRA_T_C-CLM may be a mode which refers to a top region adjacent to a luma/chroma block.

An intra prediction mode of a chroma block may be derived by selectively using any one of the first group or the second group. The selection may be performed based on a predetermined first flag. The first flag may represent whether an intra prediction mode of a chroma block is derived based on a first group or is derived based on a second group.

For example, when the first flag is a first value, an intra prediction mode of a chroma block may be determined as any one of inter-component reference-based prediction modes belonging to a first group. A predetermined index may be used to select any one of the inter-component reference-based prediction modes. The index may be information specifying any one of INTRA_LT_CCLM, INTRA_L_CCLM or INTRA_T_CCLM. An index assigned to an inter-component reference-based prediction mode and each prediction mode is shown in the following Table 6.

TABLE 6

| Idx | Inter-component reference-based prediction mode |
|-----|------------------------------------------------|
| 0 | INTRA_LT_CCLM |
| 1 | INTRA_L_CCLM |
| 2 | INTRA_T_CCLM |

Table 6 is just an example of an index assigned to each prediction mode and it is not limited thereto. In other words, as in Table 6, an index may be assigned in a priority of INTRA_LT_CCLM, INTRA_L_CCLM and INTRA_T_C-CLM, or an index may be assigned in a priority of INTRA_LT_CCLM, INTRA_T_CCLM and INTRA_L_C-CLM. Alternatively, INTRA_LT_CCLM may have a priority lower than INTRA_T_CCLM or INTRA_L_CCLM.

On the other hand, when the first flag is a second value, an intra prediction mode of a chroma block may be determined as any one of a plurality of intra prediction modes belonging to a second group. In an example, a second group may be defined as in Table 7, and an intra prediction mode of a chroma block may be derived based on information signaled in an encoding device (intra_chroma_pred_mode) and an intra prediction mode of a luma block (IntraPred-ModeY).

TABLE 7

| intra_chroma_pred_ mode[ xCb ] [ yCb ] | IntraPredModeY[ xCb + cbWidth/2 ] [ yCb + cbHeight / 2 ] | | | | |
|---|---|---|---|---|---|
| | 0 | 50 | 18 | 1 | X ( 0 <= X <= 66 ) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |

The first flag may be selectively signaled based on information representing whether inter-component reference is allowed. For example, if a value of the information is 1, the first flag may be signaled, and otherwise, the first flag may not be signaled. In this case, information may be determined as 0 or 1 based on the after-mentioned predetermined conditions.

(Condition 1) When a second flag representing whether inter-component reference-based prediction is allowed is 0, the information may be set to be 0. The second flag may be signaled in at least one of a video parameter set(VPS), a sequence parameter set(SPS), a picture parameter set(PPS) or a slice header.

(Condition 2) When at least one of the following sub-conditions is satisfied, the information may be set to be 1.

When a value of qtbtt_dual_tree_intra_flag is 0

When a slice type is not I slice

When a size of a coding tree block is less than 64×64

In the condition 2, qtbtt_dual_tree_intra_flag may represent whether a coding tree block is implicitly partitioned into a 64×64 sized coding block and a 64×64 sized coding block is partitioned by a dual tree. The dual tree may mean a method in which a luma component and a chroma component are partitioned with a partitioning structure which is independent each other. A size of the coding tree block (CtbLog2Size) may be a predefined size in an encoding/decoding device (e.g., 64×64, 128×128, 256×256) or may be encoded and signaled in an encoding device.

(Condition 3) When at least one of the following sub-conditions is satisfied, the information may be set to be 1.

When a width and a height of a first higher block are 64

When a depth of a first higher block is the same as (CtbLog2Size-6), a first higher block is partitioned by Horizontal BT, and a second higher block is 64×32

When a depth of a first higher block is greater than (CtbLog2Size-6)

When a depth of a first higher block is the same as (CtbLog2Size-6), a first higher block is partitioned by Horizontal BT, and a second higher block is partitioned by Vertical BT In the condition 3, a first higher block may be a block including a current chroma block as a lower block. For example, when a depth of a current chroma block is k, a depth of a first higher block may be (k-n) and n may be 1,2,3,4 or more. A depth of the first higher block may mean only a depth according to quad tree based partitioning or may mean a depth according to partitioning of at least one of quad tree, binary tree or ternary tree. As a lower block belonging to a first higher block, the second higher block may have a depth less than a current chroma block and greater than a first higher block. For example, when a depth of a current chroma block is k, a depth of a second higher block may be (k-m) and m may be a natural number less than n.

When even any one of the above-described conditions 1 to 3 is not satisfied, the information may be set to be 0.

However, even if at least one of condition 1 to 3 is satisfied, the information may be reset to be 0 when at least one of the following sub-conditions is satisfied.

When a first higher block is 64×64 and the above-described prediction in a unit of a sub-block is performed When at least one of a width or a height of a first higher block is less than 64 and a depth of a first higher block is the same as (CtbLog2Size-6)

In reference to FIG. 31, a luma region for inter-component reference of a chroma block may be specified S3110.

The luma region may include at least one of a luma block or a neighboring region adjacent to a luma block. In this case, a luma block may be defined as a region including a pixel pY[x][y] (x=0 . . . nTbW*2-1, y=0 . . . nTbH*2-1). The pixel may mean a reconstruction value before an in-loop filter is applied.

The neighboring region may include at least one of a left neighboring region, a top neighboring region or a top-left neighboring region. The left neighboring region may be set as a region including a pixel pY[x][y] (x=−1 . . . −3, y=0 . . . 2*numSampL−1). The setting may be performed only when a value of numSampL is greater than 0. The top neighboring region may be set as a region including a pixel pY[x][y] (x=0 . . . 2*numSampT−1, y=−1 . . . −3). The setting may be performed only when a value of numSampT is greater than 0. The top-left neighboring region may be set as a region including a pixel pY[x][y] (x=−1, y=−1,−2). The setting may be performed only when a top-left region of a luma block is available.

The above-described numSampL and numSampT may be determined based on an intra prediction mode of a current block. In this case, a current block may mean a chroma block.

For example, when an intra prediction mode of a current block is INTRA_LT_CCLM, it may be derived as in the following Equation 10. In this case, INTRA_LT_CCLM may mean a mode that inter-component reference is performed based on a region adjacent to a left and a top of a current block.

$$numSampT = availT \ ? \ nTbW: 0 \qquad \text{[Equation 10]}$$

$$numSampL = availL \ ? \ nTbH: 0$$

According to Equation 10, if a top neighboring region of a current block is available, numSampT may be derived as nTbW, and otherwise, it may be derived as 0. Likewise, if a left neighboring region of a current block is available, numSampL may be derived as nTbH, and otherwise, it may be derived as 0.

On the other hand, when an intra prediction mode of a current block is not INTRA_LT_CCLM, it may be derived as in the following Equation 11.

$$numSampT = \qquad \text{[Equation 11]}$$

$$(availT \ \&\& \ predModeIntra == INTRA\_T\_CCLM)?(nTbW +$$

$$numTopRight): 0$$

$$numSampL =$$

$$(availL \ \&\& \ predModeIntra == INTRA\_L\_CCLM)?(nTbH +$$

$$numLeftBelow): 0$$

In Equation 11, INTRA_T_CCLM may mean a mode that inter-component reference is performed based on a region adjacent to the top of a current block, and INTRA_L_CCLM may mean a mode that inter-component reference is performed based on a region adjacent to the left of a current block. numTopRight may mean the number of all or part of pixels belonging to a region adjacent to the top-right of a chroma block. Some pixels may mean an available pixel among pixels belonging to the lowest pixel line (row) of a corresponding region. For determination on availability, whether a pixel is available is sequentially determined from a left direction to a right direction, which may be performed until an unavailable pixel is found. numLeftBelow may mean the number of all or part of pixels belonging to a region adjacent to the bottom-left of a chroma block. Some pixels may mean an available pixel among pixels belonging to the rightmost pixel line (column) of a corresponding region. For determination on availability, whether a pixel is available is sequentially determined from a top direction to a bottom direction, which may be performed until an unavailable pixel is found.

In reference to FIG. 31, downsampling a luma region specified in S3110 may be performed S3120.

The downsampling may include at least one of 1. downsampling a luma block, 2. downsampling a left neighboring region of a luma block or 3. downsampling a top neighboring region of a luma block, and it will be described in detail as follows.

1. Downsampling a Luma Block

Embodiment 1

A pixel pDsY[x][y] (x=0 . . . nTbW−1, y=0 . . . nTbH−1) of a downsampled luma block may be derived based on a corresponding pixel pY[2*x][2*y] of a luma block and a neighboring pixel. A neighboring pixel may mean a pixel which is adjacent to a corresponding pixel in at least one of a left, right, top or bottom direction. For example, a pixel pDsY[x][y] may be derived as in the following Equation 12.

$$pDsY[x][y] = (pY[2*x][2*y-1] + \qquad \text{[Equation 12]}$$

$$pY[2*x-1][2*y] + 4*pY[2*x][2*y] +$$

$$pY[2*x+1][2*y] + pY[2*x][2*y+1] + 4) \gg 3$$

However, there may be a case in which a left/top neighboring region of a current block is unavailable. When a left neighboring region of a current block is unavailable, a pixel pDsY[0][y] (y=1 . . . nTbH−1) of a downsampled luma block may be derived based on a corresponding pixel pY[0][2*y] of a luma block and a neighboring pixel. A neighboring pixel may mean a pixel which is adjacent to a corresponding pixel in at least one of a top or bottom direction. For example, a pixel pDsY[0][y] (y=1 . . . nTbH−1) may be derived as in the following Equation 13.

$$pDsY[0][y] = (pY[0][2*y-1] + \qquad \text{[Equation 13]}$$

$$2*pY[0][2*y] + pY[0][2*y+1] + 2) \gg 2$$

When a top neighboring region of a current block is unavailable, a pixel pDsY[x][0] (x=1 . . . nTbW−1) of a downsampled luma block may be derived based on a corresponding pixel pY[2*x][0] of a luma block and a neighboring pixel. A neighboring pixel may mean a pixel which is adjacent to a corresponding pixel in at least one of a left or right direction. For example, a pixel pDsY[x][0] (x=1 . . . nTbW−1) may be derived as in the following Equation 14.

$$pDsY[x][0] = (pY[2*x-1][0] + \qquad \text{[Equation 14]}$$

$$2*pY[2*x][0] + pY[2*x+1][0] + 2) \gg 2$$

On the other hand, a pixel pDsY[0][0] of a downsampled luma block may be derived based on a corresponding pixel pY[0][0] of a luma block and/or a neighboring pixel. A position of a neighboring pixel may be differently determined according to whether a left/top neighboring region of a current block is available.

For example, when a left neighboring region is available and a top neighboring region is unavailable, pDsY[0][0] may be derived as in the following Equation 15.

$$pDsY[0][0] = \qquad \text{[Equation 15]}$$

-continued $$(pY[-1][0] + 2 * pY[0][0] + pY[1][0] + 2) \gg 2$$

On the other hand, when a left neighboring region is unavailable and a top neighboring region is available, pDsY[0][0] may be derived as in the following Equation 16.

$$pDsY[0][0] = \qquad \text{[Equation 16]}$$
$$(pY[0][-1] + 2 * pY[0][0] + pY[0][1] + 2) \gg 2$$

On the other hand, when both a left and top neighboring region are unavailable, pDsY[0][0] may be set as a corresponding pixel pY[0][0] of a luma block.

Embodiment 2

A pixel pDsY[x][y] (x=0 . . . nTbW−1, y−0 . . . nTbH−1) of a downsampled luma block may be derived based on a corresponding pixel pY[2*x][2*y] of a luma block and a neighboring pixel. A neighboring pixel may mean a pixel which is adjacent to a corresponding pixel in at least one of a bottom, left, right, bottom-left or bottom-right direction. For example, a pixel pDsY[x][y] may be derived as in the following Equation 17.

$$pDsY[x][y] = (pY[2*x-1][2*y] + pY[2*x-1][2*y+1] + \qquad \text{[Equation 17]}$$
$$2 * pY[2*x][2*y] + 2 * pY[2*x][2*y+1] +$$
$$pY[2*x+1][2*y] + pY[2*x+1][2*y+1] + 4) \gg 3$$

However, when a left neighboring region of a current block is unavailable, a pixel pDsY[0][y] (y=0 . . . nTbH−1) of a downsampled luma block may be derived based on a corresponding pixel pY[0][2*y] of a luma block and a bottom neighboring pixel. For example, a pixel pDsY[0][y] (y=0 . . . nTbH−1) may be derived as in the following Equation 18.

$$pDsY[0][y] = (pY[0][2*y] + pY[0][2*y+1] + 1) \gg 1 \qquad \text{[Equation 18]}$$

Downsampling a luma block may be performed based on any one of the above-described embodiments 1 and 2. In this case, any one of embodiment 1 or 2 may be selected based on a predetermined flag. In this case, a flag may represent whether a downsampled luma pixel has the same position as an original luma pixel. For example, when the flag is a first value, a downsampled luma pixel has the same position as an original luma pixel. On the other hand, when the flag is a second value, a downsampled luma pixel has the same position as an original luma pixel in a horizontal direction, but it has a position shifted by a half-pel in a vertical direction.

2. Downsampling a left neighboring region of a luma block

Embodiment 1

A pixel pLeftDsY[y] (y=0 . . . numSampL−1) of a downsampled left neighboring region may be derived based on a corresponding pixel pY[−2][2*y] of a left neighboring region and a neighboring pixel. A neighboring pixel may mean a pixel which is adjacent to a corresponding pixel in at least one of a left, right, top or bottom direction. For example, a pixel pLeftDsY[y] may be derived as in the following Equation 19.

$$pLeftDsY[y] = \qquad \text{[Equation 19]}$$
$$(pY[-2][2*y-1] + pY[-3][2*y] + 4 * pY[-2][2*y] +$$
$$pY[-1][2*y] + pY[-2][2*y+1] + 4) \gg 3$$

However, when a top-left neighboring region of a current block is unavailable, a pixel pLeftDsY[0] of a downsampled left neighboring region may be derived based on a corresponding pixel pY[−2][0] of a left neighboring region and a neighboring pixel. A neighboring pixel may mean a pixel which is adjacent to a corresponding pixel in at least one of a left or right direction. For example, a pixel pLeftDsY[0] may be derived as in the following Equation 20.

$$pLeftDsY[0] = \qquad \text{[Equation 20]}$$
$$(pY[-3][0] + 2 * pY[-2][0] + pY[-1][0] + 2) \gg 2$$

Embodiment 2

A pixel pLeftDsY[y] (y=0 . . . numSampL−1) of a downsampled left neighboring region may be derived based on a corresponding pixel pY[−2][2*y] of a left neighboring region and a neighboring pixel. A neighboring pixel may mean a pixel which is adjacent to a corresponding pixel in at least one of a bottom, left, right, bottom-left or bottom-right direction. For example, a pixel pLeftDsY[y] may be derived as in the following Equation 21.

$$pLeftDsY[y] = \qquad \text{[Equation 21]}$$
$$(pY[-1][2*y] + pY[-1][2*y+1] + 2 * pY[-2][2*y] +$$
$$2 * pY[-2][2*y+1] + pY[-3][2*y] +$$
$$pY[-3][2*y+1] + 4) \gg 3$$

Likewise, downsampling a left neighboring region may be performed based on any one of the above-described embodiments 1 and 2. In this case, any one of embodiment 1 or 2 may be selected based on a predetermined flag. The flag may represent whether a downsampled luma pixel has the same position as an original luma pixel, which is the same as described above.

On the other hand, downsampling a left neighboring region may be performed only when a value of numSampL is greater than 0. When a value of numSampL is greater than 0, it may mean a case in which a left neighboring region of a current block is available and an intra prediction mode of a current block is INTRA_LT_CCLM or INTRA_L_CCLM.

3. Downsampling a Top Neighboring Region of a Luma Block

Embodiment 1

A pixel pTopDsY[x] (x=0 . . . numSampT−1) of a downsampled top neighboring region may be derived by considering whether a top neighboring region belongs to a CTU different from a luma block.

When a top neighboring region belongs to the same CTU as a luma block, a pixel pTopDsY[x] of a downsampled top neighboring region may be derived based on a corresponding pixel pY[2*x][−2] of a top neighboring region and a neighboring pixel. A neighboring pixel may mean a pixel which is adjacent to a corresponding pixel in at least one of a left, right, top or bottom direction. For example, a pixel pTopDsY[x] may be derived as in the following Equation 22.

$$pTopDsY[x] = \hspace{3cm} \text{[Equation 22]}$$
$$(pY[2*x][-3] + pY[2*x-1][-2] + 4*pY[2*x][-2] +$$
$$pY[2*x+1][-2] + pY[2*x][-1] + 4) \gg 3$$

On the other hand, when a top neighboring region belongs to a CTU different from a luma block, a pixel pTopDsY[x] of a downsampled top neighboring region may be derived based on a corresponding pixel pY[2*x][−1] of a top neighboring region and a neighboring pixel. A neighboring pixel may mean a pixel which is adjacent to a corresponding pixel in at least one of a left or right direction. For example, a pixel pTopDsY[x] may be derived as in the following Equation 23.

$$pTopDsY[x] = (pY[2*x-1][-1] + \hspace{1cm} \text{[Equation 23]}$$
$$2*pY[2*x][-1] + pY[2*x+1][-1] + 2) \gg 2$$

Alternatively, when a top-left neighboring region of a current block is unavailable, the neighboring pixel may mean a pixel which is adjacent to a corresponding pixel in at least one of a top or bottom direction. For example, a pixel pTopDsY[0] may be derived as in the following Equation 24.

$$pTopDsY[0] = \hspace{3cm} \text{[Equation 24]}$$
$$(pY[0][-3] + 2*pY[0][-2] + pY[0][-1] + 2) \gg 2$$

Alternatively, when a top-left neighboring region of a current block is unavailable and a top neighboring region belongs to a CTU different from a luma block, a pixel pTopDsY[0] may be set as a pixel pY[0][−1] of a top neighboring region.

Embodiment 2 a pixel pTopDsY[x] (x=0 . . . numSampT−1) of a downsampled top neighboring region may be derived by considering whether a top neighboring region belongs to a CTU different from a luma block.

When a top neighboring region belongs to the same CTU as a luma block, a pixel pTopDsY[x] of a downsampled top neighboring region may be derived based on a corresponding pixel pY[2*x][−2] of a top neighboring region and a neighboring pixel. A neighboring pixel may mean a pixel which is adjacent to a corresponding pixel in at least one of a bottom, left, right, bottom-left or bottom-right direction. For example, a pixel pTopDsY[x] may be derived as in the following Equation 25.

$$pTopDsY[x] = \hspace{3cm} \text{[Equation 25]}$$
$$(pY[2*x-1][-2] + pY[2*x-1][-1] + 2*pY[2*x][-2] +$$
$$2*pY[2*x][-1] + pY[2*x+1][-2] +$$
$$pY[2*x+1][-1] + 4) \gg 3$$

On the other hand, when a top neighboring region belongs to a CTU different from a luma block, a pixel pTopDsY[x] of a downsampled top neighboring region may be derived based on a corresponding pixel pY[2*x][−1] of a top neighboring region and a neighboring pixel. A neighboring pixel may mean a pixel which is adjacent to a corresponding pixel in at least one of a left or right direction. For example, a pixel pTopDsY[x] may be derived as in the following Equation 26.

$$pTopDsY[x] = (pY[2*x-1][-1] + \hspace{1cm} \text{[Equation 26]}$$
$$2*pY[2*x][-1] + pY[2*x+1][-1] + 2) \gg 2$$

Alternatively, when a top-left neighboring region of a current block is unavailable, the neighboring pixel may mean a pixel which is adjacent to a corresponding pixel in at least one of a top or bottom direction. For example, a pixel pTopDsY[0] may be derived as in the following Equation 27.

$$pTopDsY[0] = (pY[0][-2] + pY[0][-1] + 1) \gg 1 \hspace{0.5cm} \text{[Equation 27]}$$

Alternatively, when a top-left neighboring region of a current block is unavailable and a top neighboring region belongs to a CTU different from a luma block, a pixel pTopDsY[0] may be set as a pixel pY[0][−1] of a top neighboring region.

Likewise, downsampling a top neighboring region may be performed based on any one of the above-described embodiments 1 and 2. In this case, any one of embodiment 1 or 2 may be selected based on a predetermined flag. The flag represents whether a downsampled luma pixel has the same position as an original luma pixel, which is the same as described above.

On the other hand, downsampling a top neighboring region may be performed only when a value of numSampT is greater than 0. When a value of numSampT is greater than 0, it may mean a case in which a top neighboring region of a current block is available and an intra prediction mode of a current block is INTRA_LT_CCLM or INTRA_T_CCLM.

Downsampling at least one of a left or top neighboring region of the above-described luma block (hereinafter, a luma reference region) may be performed by using a corresponding pixel only pY[−2][2*y] at a specific position and a neighboring pixel. In this case, a specific position may be determined based on a position of a pixel which is selected among a plurality of pixels belonging to at least one of a left or top neighboring region of a chroma block (hereinafter, a chroma reference region).

The selected pixel may be an odd-numbered pixel or an even-numbered pixel in a chroma reference region. Alternatively, the selected pixel may be a start pixel and one or more pixels positioned at every predetermined interval from a start pixel. In this case, a start pixel may be a pixel positioned first, second or third in a chroma reference region. The interval may be 1, 2, 3, 4 or more sample intervals. For example, when the interval is 1 sample interval, a selected pixel may include the n-th pixel, the (n+2)-th pixel, etc. The number of selected pixels may be 2, 4, 6, 8 or more.

The number of the selected pixels, a start pixel and an interval may be variably determined based on at least one of a length of a chroma reference region (i.e., numSampL and/or numSampT) or an intra prediction mode of a chroma block. Alternatively, the number of selected pixels may be the fixed number (e.g., 4) which is pre-promised in an encoding/decoding device regardless of a length of a chroma reference region and an intra prediction mode of a chroma block.

In reference to FIG. 31, a parameter for inter-component reference of a chroma block may be derived S3130.

The parameter may include at least one of a weight or an offset. The parameter may be determined by considering an intra prediction mode of a current block. The parameter may be derived by using a selected pixel of a chroma reference region and a pixel obtained by downsampling a luma reference region.

Concretely, n pixels may be classified into 2 groups by comparing a size between n pixels obtained by downsampling a luma reference region. For example, a first group may be a group of pixels which have relatively large values among n pixels and a second group may be a group of other pixels excluding pixels of a first group among n samples. In other words, a second group may be a group of pixels which have relatively small values. In this case, n may be 4, 8, 16 or more. An average value of pixels belonging to a first group may be set as the maximum value (MaxL) and an average value of pixels belonging to a second group may be set as the minimum value (MinL).

A selected pixel of a chroma reference region may be grouped according to grouping for n pixels obtained by downsampling the luma reference region. A first group for a chroma reference region may be configured by using a pixel of a chroma reference region corresponding to a pixel of a first group for a luma reference region and a second group for a chroma reference region may be configured by using a pixel of a chroma reference region corresponding to a pixel of a second group for a luma reference region. Likewise, an average value of pixels belonging to a first group may be set as the maximum value (MaxC) and an average value of pixels belonging to a second group may be set as the minimum value (MinC).

A weight and/or an offset of the parameter may be derived based on the calculated maximum value (MaxL, MaxC) and minimum value (MinL, MaxC).

A chroma block may be predicted based on a downsampled luma block and a parameter S3140.

A chroma block may be predicted by applying at least one of a pre-derived weight or offset to a pixel of a downsampled luma block.

However, FIG. 31 is just an example of a downsampling method for a neighboring region of a luma block and other downsampling/subsampling method may be applied, which will be described in detail by referring to FIGS. 32 to 38.

FIGS. 32 to 38 show a method of downsampling a neighboring region of a luma block and deriving a parameter for inter-component reference.

A prediction image may be generated as in Equation 28 by linearly predicting a neighboring sample of a current coding unit based on an image which performs at least one of downsampling or subsampling.

$$Pred_c(i, j) = (\alpha * rec_1'(i, j) \gg S) + \beta \qquad \text{[Equation 28]}$$

In Equation 28, $rec_i'$ may mean a reconstructed sample of a downsampled luma block and $Pred_c$ may mean a prediction sample of a chroma block generated by linear chroma prediction.

Figure 32:
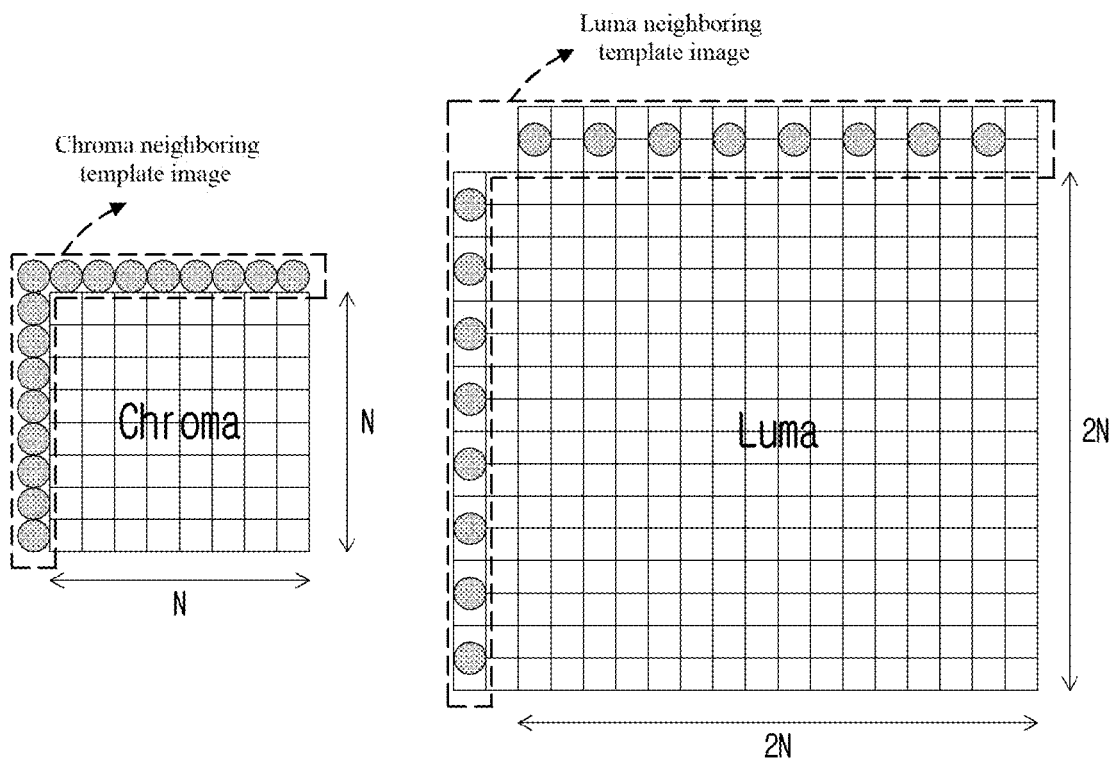

A neighboring sample of a current coding unit may be configured with a sample on a left boundary and a top boundary of a current coding unit as in the right picture of FIG. 32, which may be downsampled (downsampled into a gray sample in the right picture of FIG. 32) and is referred to as a luma neighboring template image.

In this case, values of linear chroma prediction parameters $\alpha$ and $\beta$ which make the least prediction errors in Equation 28 may be derived as in the following Equation 29.

$$\alpha = (y_B - y_A)/(x_B - x_A) \qquad \text{[Equation 29]}$$
$$\beta = y_A - \alpha * x_A$$

Figure 33:
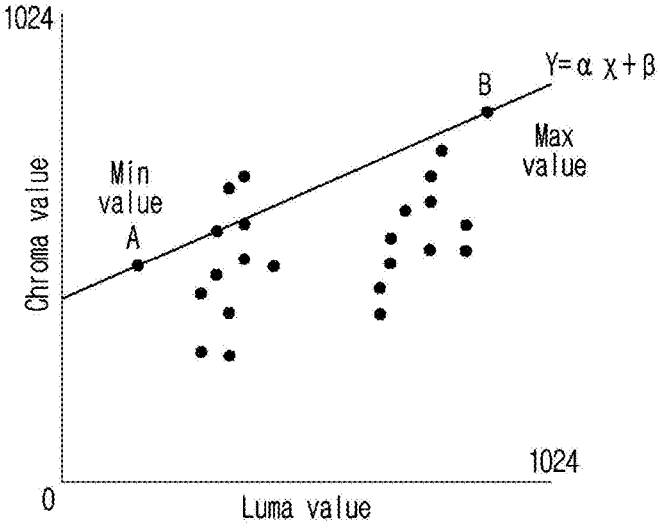

In this case, as in FIG. 33, $x_A$ represents the smallest value among subsampled luma neighboring samples (i.e., a luma neighboring template image), and $x_B$ represents the largest value among subsampled luma neighboring samples. $y_A$ represents a chroma neighboring sample corresponding to $x_A$, and $y_B$ represents a chroma neighboring sample corresponding to $x_B$.

Figure 34:
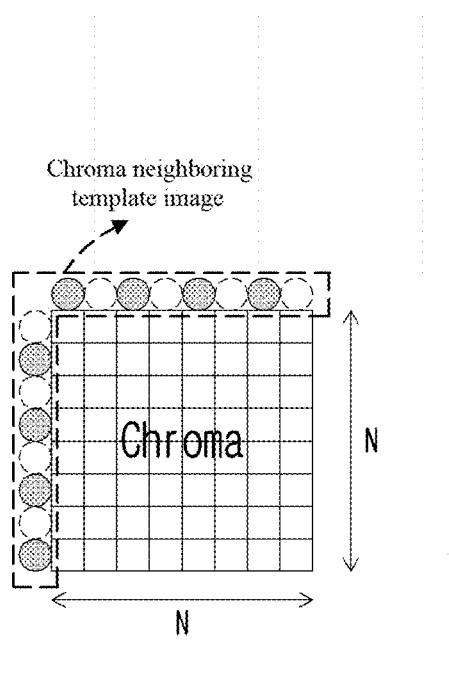
Figure 34:
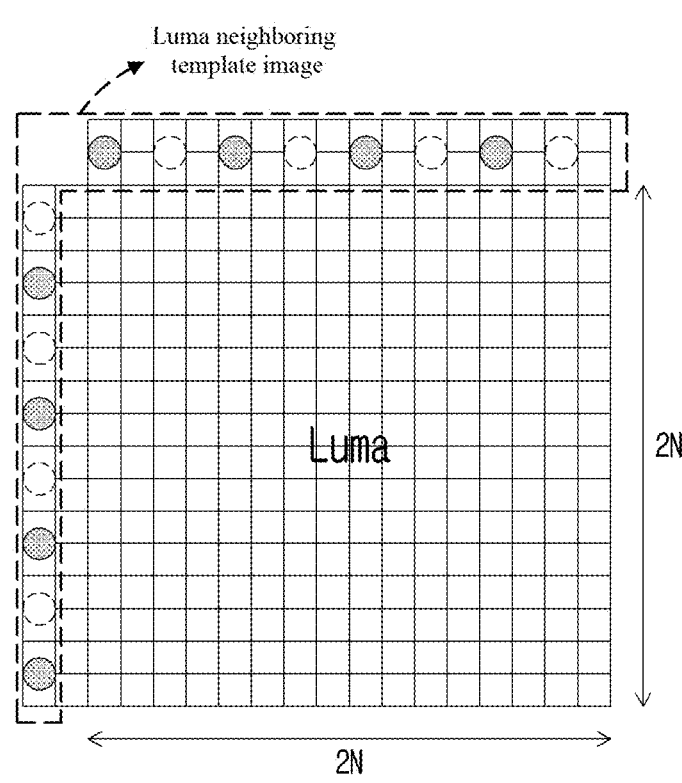

Alternatively, as in FIG. 34, the Max and min value may be derived by subsampling a luma neighboring template image. n samples obtained by subsampling may be classified into 2 groups. For example, a first group may be a group of a sample which has a relatively large value among n samples and a second group may be a group of other samples excluding a sample of a first group among n samples. In other words, a second group may be a group of a sample which has a relatively small value. In this case, n may be 4, 8, 16 or more. An average value of samples belonging to a first group may be set as the maximum value (Max) and an average value of samples belonging to a second group may be set as the minimum value (Min).

In the case of an isolated sample with a Min or Max value far away from other samples, prediction performance is highly likely to be lowered if chroma prediction is performed by using Equation 29.

As a luma neighboring template image is subsampled, there are fewer cases in which an isolated sample becomes the maximum value or the minimum value, and there is an advantage that prediction performance may be improved. In addition, a comparison operation should be performed to find the maximum value and the minimum value, and the number of operations may be reduced from 4N (the maximum value 2N and the minimum value 2N) to 2N (the maximum value N and the minimum value N) times.

A luma neighboring template image may be derived from i lines adjacent to a top boundary of a luma block and j lines adjacent to a left boundary. i and j may be 2, 3, 4 or more. i may be the same as j, or i may be set as a value greater than j.

Figure 35:
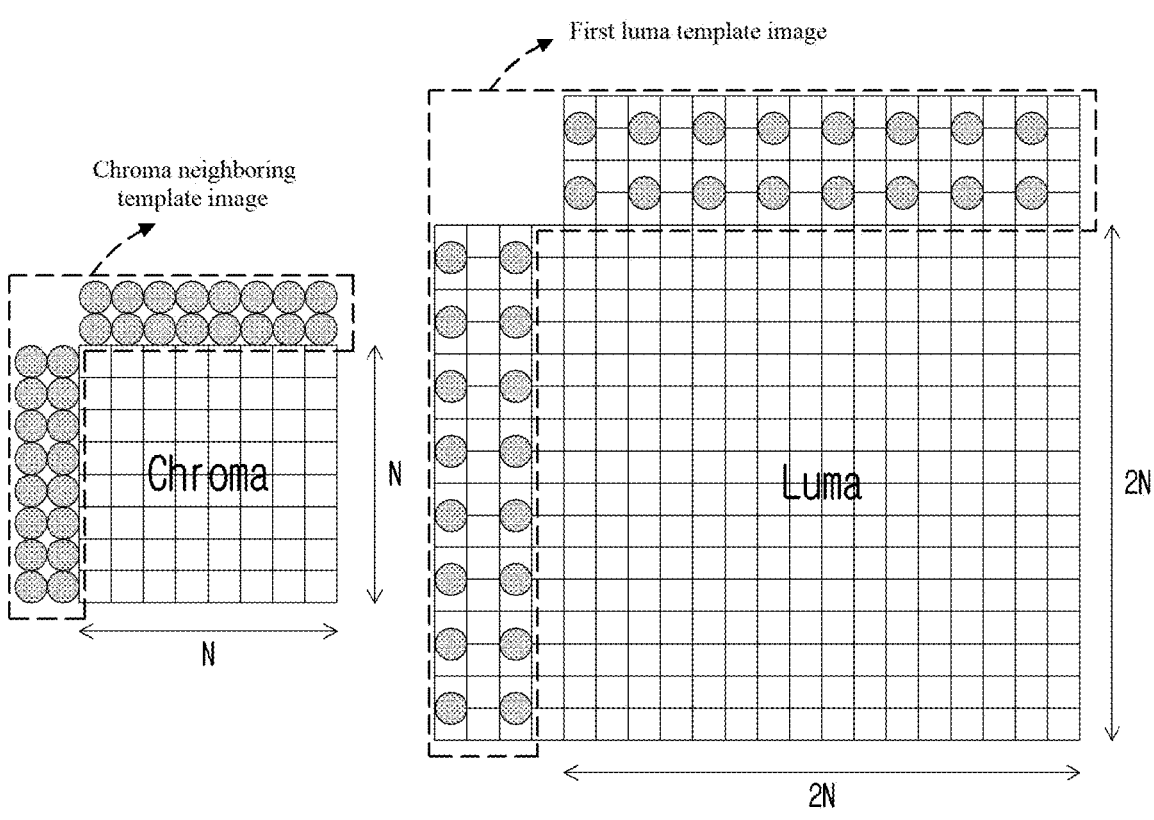

As in FIG. 35, subsampling/downsampling may be performed to be 2 lines from 4 lines adjacent to a top boundary and subsampling/downsampling may be performed to be 2 lines from 4 lines adjacent to a left boundary, which is referred to as a first luma template. Linear prediction chroma parameters α and β may be derived by deriving the Max and min value of a first luma template. Linear prediction chroma prediction for a chroma block may be performed by using derived linear prediction chroma parameters and a reconstructed sample of a luma block. In this case, a reconstructed sample of a luma block may be a sample which is downsampled to correspond to resolution of a chroma block.

Figure 36:
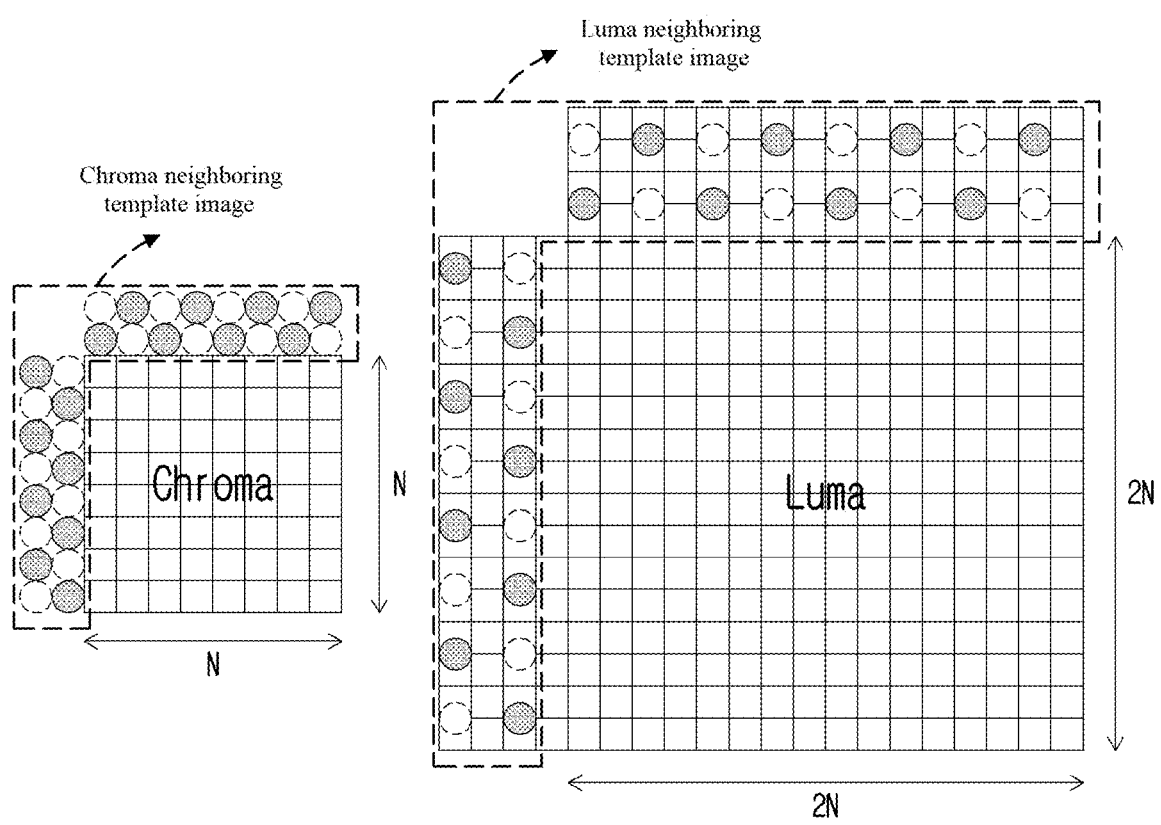
Figure 37:
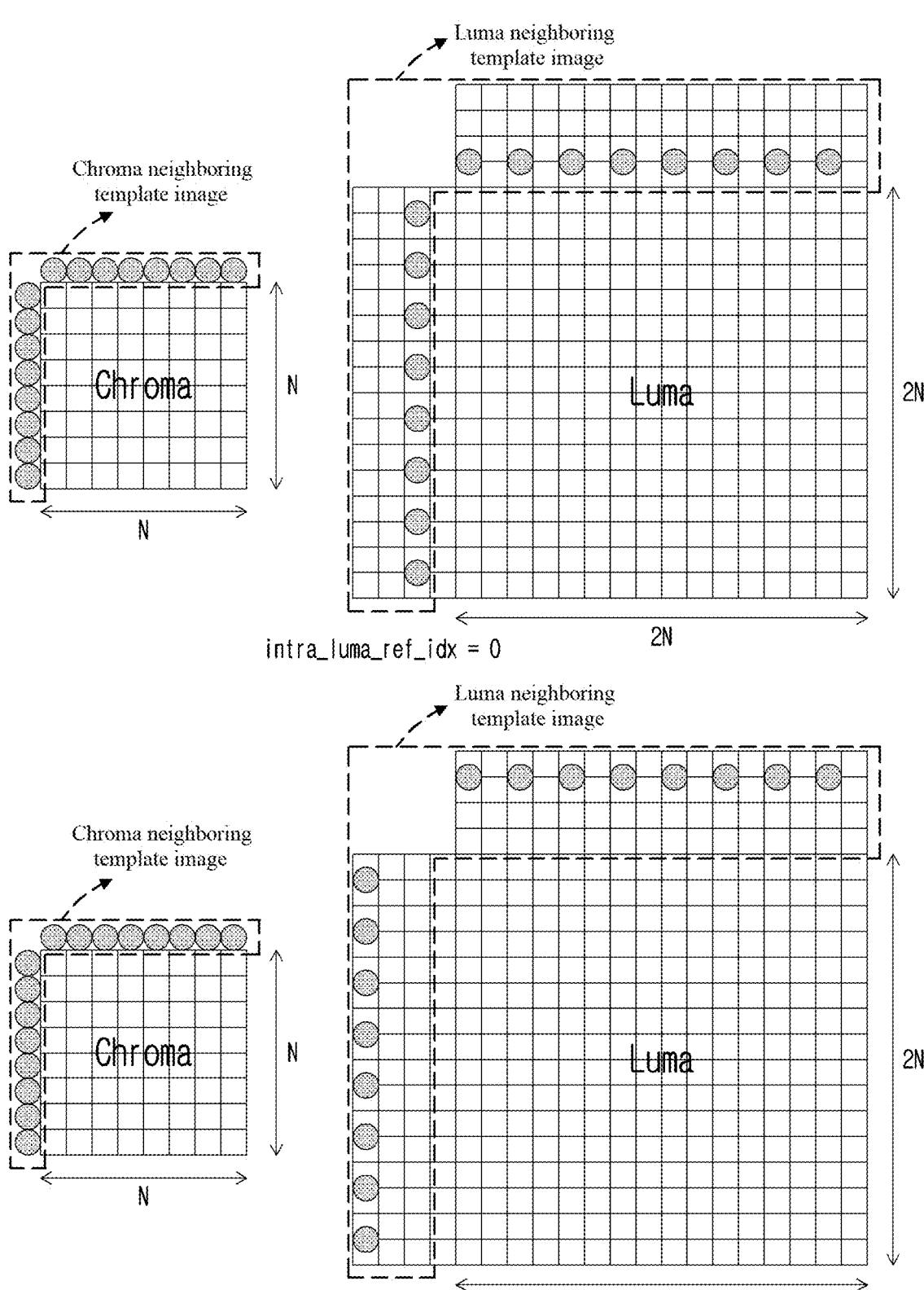

As in FIG. 36, a luma neighboring template image may be generated by performing subsampling in a first luma template generated by downsampling.

In an example, samples with the same x-axis coordinate may be configured not to be subsampled at the same time on a top line in a first luma template. Likewise, samples with the same y-axis coordinate may be configured not to be subsampled at the same time on a top line in a first luma template.

Alternatively, when a multi-line intra prediction method is used in a luma block, a luma neighboring template image may be differently configured according to an intra reference line index (intra_luma_ref_idx). Concretely, for example, when a value of intra_luma_ref_idx is 0, a luma neighboring template image adjacent to a luma boundary may be configured as in the left picture of FIG. 37, and when a value of intra_luma_ref_idx is not 0, a luma neighboring template image which is non-adjacent to a luma boundary may be configured as in the right picture.

Alternatively, when a multi-line intra prediction method is used in a luma, the maximum value and the minimum value of a luma neighboring template image may be derived by performing weighted prediction of samples in a luma neighboring template image according to an intra reference line index (intra luma_ref_idx). Concretely, for example, weighted prediction may be performed between samples with the same x-axis coordinate in 2 top lines and weighted prediction may be performed between samples with the same y-axis coordinate in 2 left lines to generate a second neighboring template sample. The max and min value of a second neighboring template sample may be calculated, linear prediction chroma parameters α and β may be derived by using it, and linear prediction chroma prediction may be performed.

Figure 38:
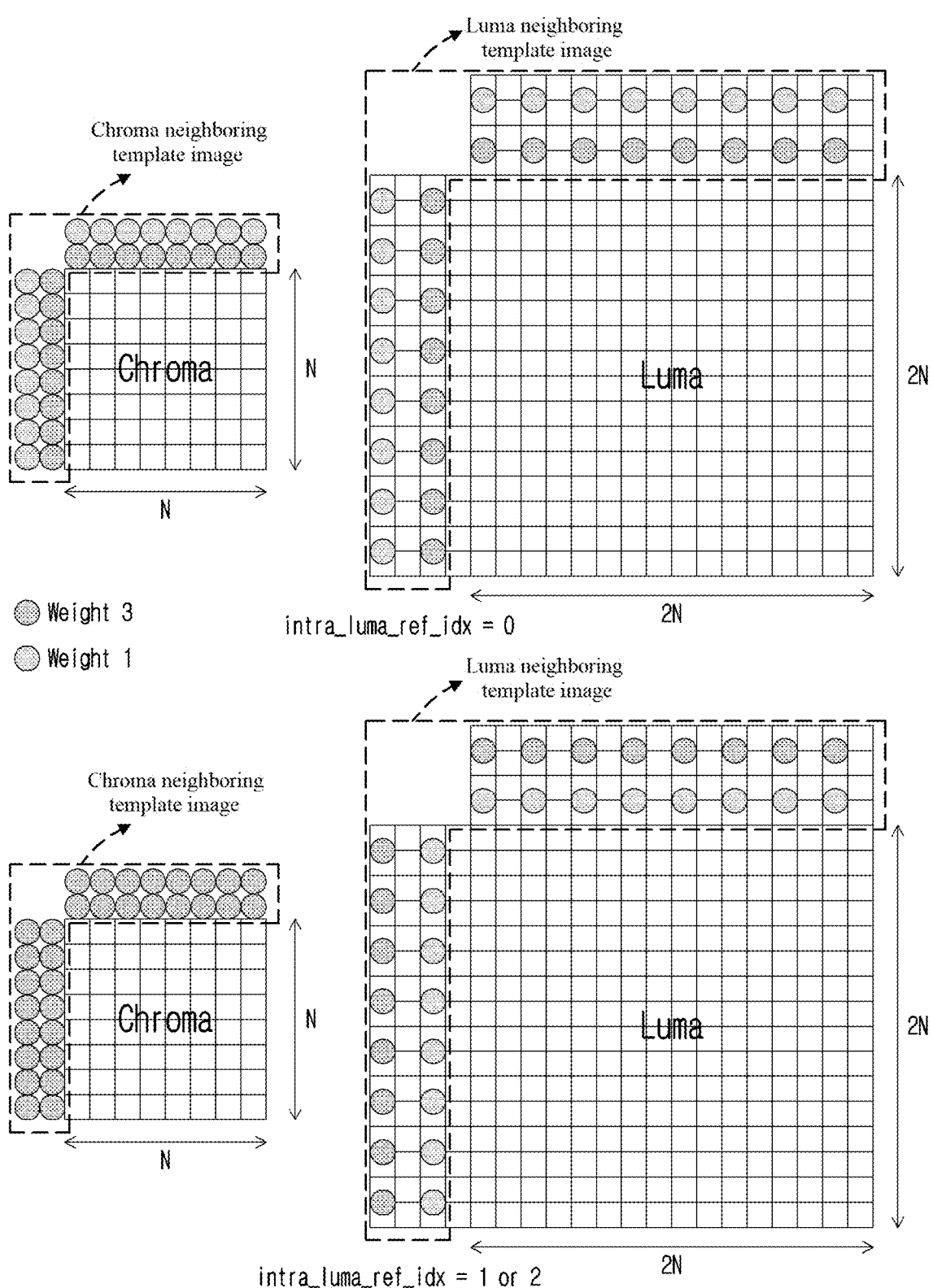

Values of weighted prediction parameters used in generating a second neighboring template sample may be differently set according to a value of intra_luma_ref_idx as in FIG. 38. Concretely, for example, when a value of intra_lu-ma_ref_idx is 0, a large weight may be set for a sample belonging to a line adjacent to a block boundary, and when a value of intra_luma_ref_idx is not 0, a large weight may be set for a sample belonging to a line which is non-adjacent to a block boundary.

FIGS. 39 and 40 show a method in which an in-loop filter is applied to a reconstructed block as an embodiment to which the present disclosure is applied.

In-loop filtering is a technology which adaptively performs filtering for a decoded image to reduce loss of information generated in a process of quantization and encoding. A deblocking filter, a sample adaptive offset filter(SAO) and an adaptive loop filter(ALF) are an example of in-loop filtering.

A second reconstructed image may be generated by performing at least any one of a deblocking filter, a sample adaptive offset filter(SAO) or an adaptive loop filter(ALF) for a first reconstructed image.

After applying a deblocking filter to a reconstructed image, SAO and ALF may be applied.

Transform and quantization are performed in a unit of a block in a video encoding process. Loss generated in a quantization process is generated and discontinuity is generated on a boundary of an image reconstructing it. A discontinuous image generated on a block boundary is referred to as blocking artifact.

A deblocking filter is a method which alleviates blocking artifact generated on a block boundary of a first image and improves encoding performance.

Blocking artifact may be alleviated by performing filtering on a block boundary, and a value of a blocking strength (hereinafter, BS) may be determined based on at least any one of whether a block is encoded by an intra prediction mode, whether a difference of an absolute value of a motion vector of a neighboring block is greater than a predefined predetermined threshold value, or whether reference pictures of neighboring blocks are the same each other as in FIG. 39. When a value of BS is 0, filtering may not be performed, and when a value of BS is 1 or 2, filtering may be performed on a block boundary.

Because quantization is performed in a frequency domain, ringing artifact is generated on an edge of an object or a pixel value gets larger or smaller by a certain value compared to an original. SAO may effectively reduce ringing artifact by adding or subtracting a specific offset in a unit of a block by considering a pattern of a first reconstructed image. SAO is configured with an edge offset (hereinafter, EO) and a band offset (hereinafter, BO) according to a feature of a reconstructed image. An edge offset is a method which differently adds an offset to a current sample according to a neighboring pixel sample pattern. A band offset is to reduce an encoding error by adding a certain value to a pixel set with a similar pixel brightness value in a region. Pixel brightness may be divided into 32 uniform bands to set a pixel with a similar brightness value as one set. For example, 4 adjacent bands may be combined into one category. The same offset value may be set to be used in one category.

ALF (Adaptive Loop Filter) is a method which generates a second reconstructed image by using any one of predefined filters for a first reconstructed image or a reconstructed image that deblocking filtering is performed for a first reconstructed image as in Equation 30.

$$R'(i, j) = \sum_{k=-\frac{N}{2}}^{\frac{N}{2}} \sum_{l=-\frac{N}{2}}^{\frac{N}{2}} f(k, l) \cdot R(i + k, j + l) \qquad \text{[Equation 30]}$$

In this case, a filter may be selected in a unit of a picture or in a unit of a CTU.

For a luma component, any one of a 5×5, 7×7 or 9×9 diamond shape may be selected as in the following FIG. 40. For a chroma component, there may be a limit that only a 5×5 diamond shape is used.

A variety of embodiments of the present disclosure do not enumerate all possible combinations, but are to describe the representative aspect of the present disclosure, and matters described in various embodiments may be independently applied or may be applied by two or more combinations.

In addition, a variety of embodiments of the present disclosure may be implemented by a hardware, a firmware, a software their combination, or the like. For implementation by a hardware, implementation may be performed by one or more ASICs(Application Specific Integrated Circuits), DSPs(Digital Signal Processing Devices), DSPDs (Digital Signal Processing Devices), PLDs(Programmable Logic Devices), FPGAs(Field Programmable Gate Arrays), general processors, controllers, microcontrollers, microprocessors, etc.

A range of the present disclosure includes software or machine-executable instructions (e.g., an operating system, an application, a firmware, a program, etc.) which execute an action according to a method of various embodiments in a device or a computer and a non-transitory computer-readable medium that such software, instructions, etc. are stored and are executable in a device or a computer.

INDUSTRIAL APPLICABILITY

The present disclosure may be used for encoding/decoding a video.

The invention claimed is:

1. An image decoding method, comprising:
determining an intra prediction mode of a chroma block;
determining a neighboring region for inter-component reference of the chroma block based on the intra prediction mode, the neighboring region including at least one of a top neighboring region or a left neighboring region adjacent to a luma block corresponding to the chroma block;
deriving down-sampled neighboring luma samples by down-sampling neighboring luma samples in the neighboring region,
deriving a parameter for the inter-component reference of the chroma block based on the down-sampled neighboring luma samples; and
predicting the chroma block based on the parameter for the inter-component reference,
wherein deriving the parameter for the inter-component reference comprises:
classifying the down-sampled neighboring luma samples into a first group and a second group, the first group including down-sampled neighboring luma samples having relatively large values and the second group including down-sampled neighboring luma samples having relatively small values; and
calculating a maximum value by averaging the down-sampled neighboring luma samples included in the first group and a minimum value by averaging the down-sampled neighboring luma samples included in the second group,
wherein the parameter for the inter-component reference is derived based on a difference between the maximum value and the minimum value,
wherein the parameter for the inter-component reference includes at least one of a weight or an offset,
wherein when the top neighboring region belongs to a different coding tree unit from the luma block, only three neighboring luma samples are used to derive one down-sampled neighboring luma sample, and
wherein when the top neighboring region belongs to a same coding tree unit as the luma block, five or six neighboring luma samples are used to derive the one down-sampled neighboring luma sample.

2. The method of claim 1, wherein the intra prediction mode of the chroma block is derived based on an index and a predetermined group configured with inter-component reference-based prediction modes, and
wherein the inter-component reference-based prediction modes includes a first mode which refers to both left and top neighboring regions adjacent to the chroma block, a second mode which refers to only the left neighboring region adjacent to the chroma block and a third mode which refers to only the top neighboring region adjacent to the chroma block.

3. The method of claim 1,
wherein the top neighboring region includes N sample lines and the left neighboring luma region includes M sample lines, and
wherein N is set to a different value than M.

4. The method of claim 1, wherein the down-sampling is performed by using only a neighboring luma sample at a specific position and neighboring samples adjacent to the neighboring luma sample.

5. The method of claim 4, wherein the specific position is determined based on a position of one or more samples selected among a plurality of samples belonging to a neighboring region of the chroma block.

6. The method of claim 5, wherein the selected one or more pixels are representative of one or more samples positioned at every predetermined interval in the neighboring region of the chroma block.

7. The method of claim 4, wherein the neighboring samples include a sample positioned in at least one of a left, right, top, bottom, top-left, bottom-left, top-right, or bottom-right direction of the neighboring luma sample at the specific position.

8. An image encoding method, comprising:
determining an intra prediction mode for a chroma block;
determining a neighboring region for inter-component reference of the chroma block based on the intra prediction mode, the neighboring region including at least one of a top neighboring region or a left neighboring region adjacent to a luma block corresponding to the chroma block;
deriving down-sampled neighboring luma samples by down-sampling neighboring luma samples in the neighboring region,
deriving a parameter for the inter-component reference of the chroma block based on the down-sampled neighboring luma samples; and
predicting the chroma block based on the parameter for the inter-component reference,
wherein deriving the parameter for the inter-component reference comprises:
classifying the down-sampled neighboring luma samples into a first group and a second group, the first group including down-sampled neighboring luma samples having relatively large values and the second group including down-sampled neighboring luma samples having relatively small values; and
calculating a maximum value by averaging the down-sampled neighboring luma samples included in the first group and a minimum value by averaging the down-sampled neighboring luma samples included in the second group,
wherein the parameter for the inter-component reference is derived based on a difference between the maximum value and the minimum value,
wherein the parameter for the inter-component reference includes at least one of a weight or an offset,
wherein when the top neighboring region belongs to a different coding tree unit from the luma block, only three neighboring luma samples are used to derive one down-sample neighboring luma sample, and
wherein when the top neighboring region belongs to a same coding tree unit as the luma block, five or six neighboring luma samples are used to derive the one down-sample neighboring luma sample.

9. The method of claim 8, wherein the intra prediction mode of the chroma block is derived based on an index and a predetermined group configured with inter-component reference-based prediction modes, and wherein the inter-component reference-based prediction modes includes a first mode which refers to both left and top neighboring regions adjacent to the chroma block, a second mode which refers to only the left neighboring region adjacent to the chroma block and a third mode which refers to only the top neighboring region adjacent to the chroma block.

10. The method of claim 8, wherein the top neighboring region includes N sample lines and the left neighboring region includes M sample lines, and wherein N is set to a different value than M.

11. The method of claim 8, wherein the down-sampling is performed by using only a neighboring luma sample at a specific position and neighboring samples adjacent to the neighboring luma sample.

12. The method of claim 11, wherein the specific position is determined based on a position of one or more samples selected among a plurality of samples belonging to a neighboring region of the chroma block.

* * * * *